United States Patent
Nagenthiraja et al.

(10) Patent No.: US 9,036,878 B2
(45) Date of Patent: May 19, 2015

(54) METHOD FOR DELINEATION OF TISSUE LESIONS

(75) Inventors: Kartheeban Nagenthiraja, Aarhus N (DK); Kim Mouridsen, Hjortshøj (DK); Lars Riisgaard Ribe, Risskov (DK)

(73) Assignees: Aarhus Universitet, Aarhus C (DK); Region Midtjylland, Viborg (DK)

( * ) Notice: Subject to any disclaimer, the term of this patent is extended or adjusted under 35 U.S.C. 154(b) by 44 days.

(21) Appl. No.: 13/994,064

(22) PCT Filed: Dec. 16, 2011

(86) PCT No.: PCT/DK2011/050493
§ 371 (c)(1),
(2), (4) Date: Jun. 13, 2013

(87) PCT Pub. No.: WO2012/079593
PCT Pub. Date: Jun. 21, 2012

(65) Prior Publication Data
US 2013/0266197 A1    Oct. 10, 2013

(30) Foreign Application Priority Data

Dec. 17, 2010  (DK) ................................ 2010 70558
Feb. 7, 2011   (DK) ................................ 2011 70070

(51) Int. Cl.
*G06K 9/00*   (2006.01)
*G06T 11/00*  (2006.01)
*G06T 7/00*   (2006.01)

(52) U.S. Cl.
CPC ............. *G06T 11/003* (2013.01); *G06T 7/0012* (2013.01); *G06T 7/0089* (2013.01);
(Continued)

(58) Field of Classification Search
CPC ... G06T 11/003; G06T 7/0091; G06T 7/0012; G06T 2207/10088; G06T 7/0089; G06T 2207/20036; G06T 2207/30016
USPC .......................................... 382/100, 128–131
See application file for complete search history.

(56) References Cited

U.S. PATENT DOCUMENTS 8,064,664 B2 * 11/2011 Suri et al. ....................... 382/128
2006/0122492 A1 * 6/2006 Kucharczyk et al. .......... 600/420
(Continued)

FOREIGN PATENT DOCUMENTS

WO   WO 2007/058632 A1   5/2007
WO   WO 2008/041946 A1   4/2008
WO   WO 2009/105530 A2   8/2009

OTHER PUBLICATIONS

Kidwell, Chelsea S., Jeffry R. Alger, and Jeffrey L. Saver. "Beyond mismatch evolving paradigms in imaging the ischemic penumbra with multimodal magnetic resonance imaging." Stroke 34.11 (2003): 2729-2735. APA.*

(Continued)

*Primary Examiner* — Shefali Goradia
(74) *Attorney, Agent, or Firm* — Knobbe Martens Olson & Bear LLP

(57) ABSTRACT

The present invention relates to a method for estimating a measure of a penumbra size of a penumbra in biological tissue wherein first and second images obtained respectively by perfusion weighted imaging (PWI) and diffusion weighted imaging (DWI) are analyzed, and wherein the analysis of the first image includes application of a level set method, and the analysis of the second image includes application of a grayscale morphological operation. In a further embodiment of the invention, a connected component labeling algorithm maybe applied on any one of the first and second image. The invention further relates to a system, a computer program product and use of a corresponding method.

20 Claims, 30 Drawing Sheets

(52) U.S. Cl.
CPC ..... *G06T 7/0091* (2013.01); *G06T 2207/10088* (2013.01); *G06T 2207/20036* (2013.01); *G06T 2207/30016* (2013.01)

(56) References Cited

U.S. PATENT DOCUMENTS

| | | | |
|---|---|---|---|
| 2007/0014489 | A1 | 1/2007 | Sun et al. |
| 2007/0081710 | A1 | 4/2007 | Hong et al. |
| 2008/0317314 | A1 | 12/2008 | Schwartz et al. |
| 2010/0014727 | A1* | 1/2010 | Hu .............................. 382/128 |

OTHER PUBLICATIONS

Wu, Ona, et al. "Predicting tissue outcome in acute human cerebral ischemia using combined diffusion-and perfusion-weighted MR imaging." Stroke 32.4 (2001): 933-942.*

Bardera, A. et al., "A Framework to Assist Acute Stroke Diagnosis" Vision, Modeling, and Visualization, Nov. 16-18, 2005.

Chan, Tony F. et al., "Active Contours without Edges for Vector-Valued Images" Journal of Visual Communication and Image Representation, 2000, pp. 130-141, vol. 11.

Datta, Sushmita et al., "Segmentation of Gadolinium-Enhanced Lesions on MRI in Multiple Sclerosis" Journal of Magnetic Resonance Imaging, 2007, pp. 932-937, vol. 25.

Hachaj, Tomasz et al., "Automatic Detection and Lesion Description in Cerebral Blood Flow and Cerebral Blood Volume Perfusion Maps" J Sign Process Syst, 2010, pp. 317-328, vol. 61.

He, Renjie et al., "Automatic delineation of Gd enhancements on magnetic resonance images in multiple sclerosis" Med. Phys., Jul. 2002, pp. 1536-1546.

Neimark, Matthew A. et al., "Sequential Acquisition and Processing of Perfusion and Diffusion MRI Data for a Porcine Stroke Model" Proceedings of the 2005 IEEE, Engineering in Medicine and Biology 27th Annual Conference, Shanghai, China, Sep. 1-4, 2005, pp. 5782-5785.

Vincent, Luc "Morphological Grayscale Reconstruction in Image Analysis: Applications and Efficient Algorithms" Transactions on Image Processing, Apr. 1993, pp. 176-201, vol. 2, No. 2.

Wu, Ona et al., "Tracer Arrival Timing-Insensitive Technique for Estimating Flow in MR Perfusion-Weighted Imaging Using Singular Value Decomposition With a Block-Circulant Deconvolution Matrix" Magnetic Resonance in Medicine, 2003, pp. 164-174, vol. 50.

Liu, Sheena Xin et al., "Asymmetry Analysis in Rodent Cerebral Ischemia Models" Academic Radiology, vol. 15, No. 9, Sep. 2008, pp. 1181-1197.

* cited by examiner

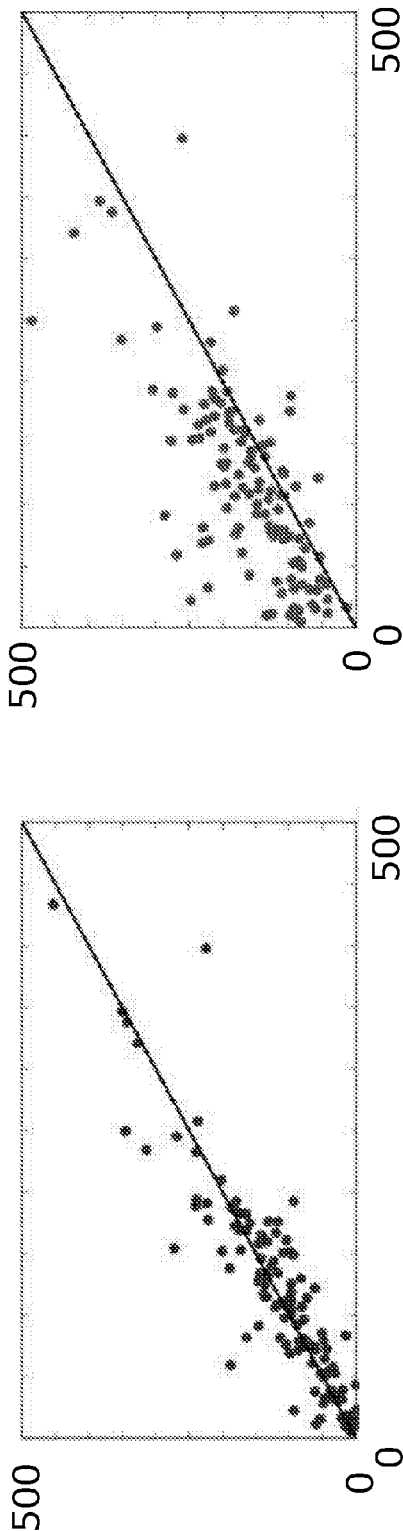
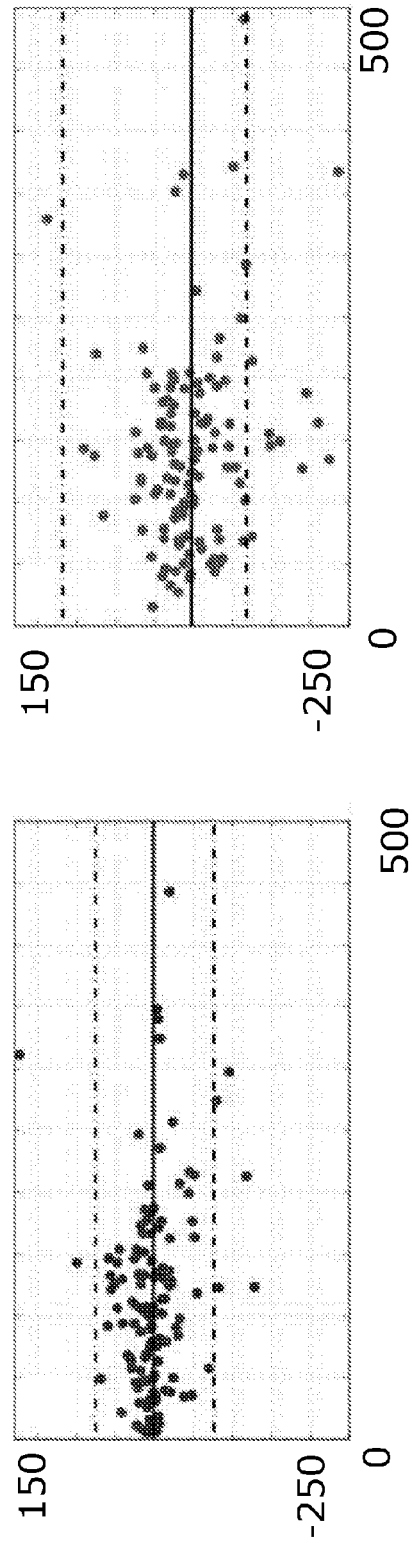
FIG. 2A  FIG. 2B  FIG. 2C  FIG. 2D

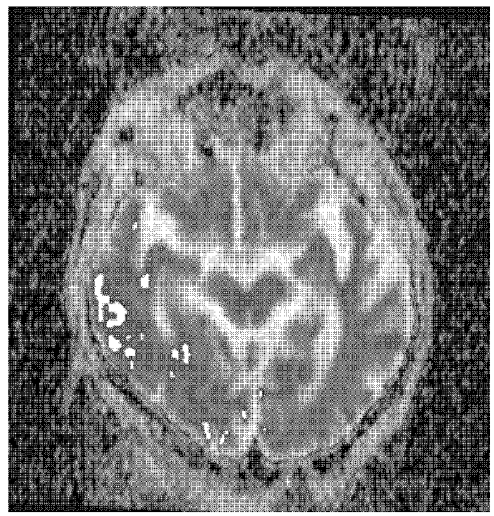 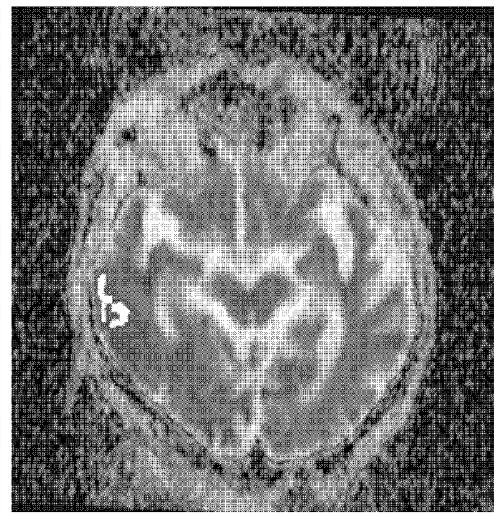
FIG. 12A    FIG. 12B
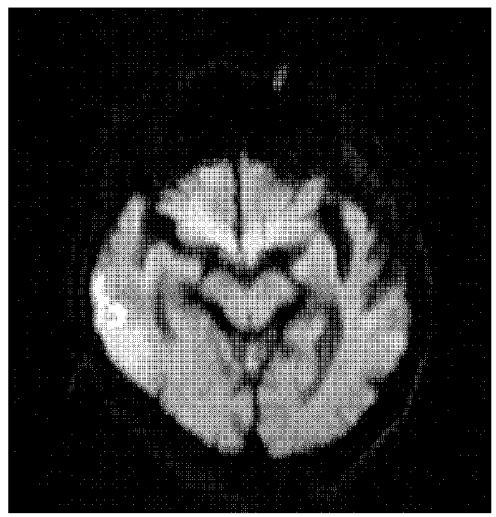 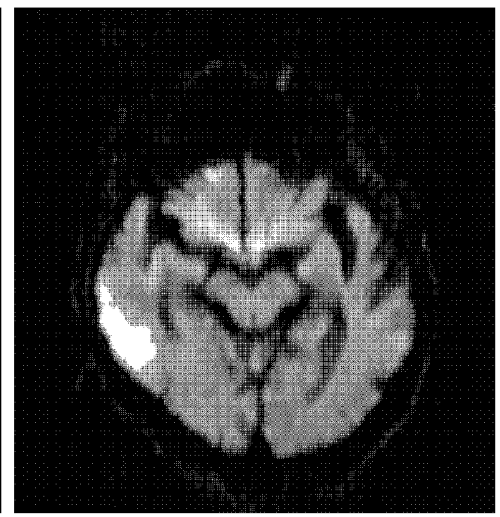
FIG. 12C    FIG. 12D

METHOD FOR DELINEATION OF TISSUE LESIONS

CROSS REFERENCE TO RELATED APPLICATIONS

This application is a U.S. National Phase Application of PCT International Application Number PCT/DK2011/050493, filed on Dec. 16, 2011, designating the United States of America and published in the English language, which is an International Application of and claims the benefit of priority to Danish Patent Application No. PA 2010 70558, filed on Dec. 17, 2010, and Danish Patent Application No. PA 2011 70070, filed on Feb. 7, 2011. The disclosures of the above-referenced applications are hereby expressly incorporated by reference in their entireties.

FIELD OF THE INVENTION

The present invention relates to a method of computer assisted delineation of tissue lesions, in particular the invention relates to computer assisted delineation of tissue lesions in the brain of a stroke patient. The invention further relates to a system, a computer program product and use of a corresponding method.

BACKGROUND OF THE INVENTION

In the case of an acute stroke in the brain of a patient, the reduction of blood supply causes a part of the brain tissue to suffer from ischemia, i.e., suffer from inadequate oxygen and nutrient supply, which part is known as the perfusion lesion. A sub-part of the perfusion lesion may be irreversibly damaged, which part is known as the core lesion or diffusion lesion. The remaining part of the perfusion lesion, the so-called ischemic penumbra, may be salvaged if blood supply is restored within a short time-frame, such as within a few hours. Identification of the volume and location of the penumbra is critical in deciding therapeutic strategy for individual stroke patients. Since therapy, such as therapy with thrombolytic agents, must be initiated within a short time frame, rapid assessment is pivotal.

The size and location of the core and perfusion lesions is typically determined by manual inspection of diffusion weighted and perfusion weighted magnetic resonance imaging (DWI/PWI) modalities. This requires intervention by highly skilled experts, such as stroke neuroradiologists. Such manual determination of DWI/PWI mismatch can be time consuming and costly.

WO2007/058632A1 describes that brain images are processed and analyzed with the aid of a computer for stroke diagnosis or therapeutic decision making, where multiple stroke-related images are superimposed.

Such automated image processing methods may not be reliable since they may not be able to distinguish between a lesion volume and a volume outside of the lesion.

Simple thresholding has been attempted in order to automatically define hypoperfused tissue. This approach, however, suffers from the lack of established thresholds, such as perfusion thresholds, applicable across individuals. Furthermore, studies have shown that thresholds depend on numerous factors including time from symptom onset and post-processing methodology.

Hence, an improved method for computer assisted delineation of tissue lesions would be advantageous, and in particular a method being faster and/or more reliable would be advantageous.

SUMMARY OF THE INVENTION

It may be seen as an object of the present invention to provide a method for computer assisted delineation of tissue lesions that solves the above mentioned problems of the prior art with the methods not being fast and reliable.

Furthermore, it may be seen as an advantage of the invention that it may yield reproducible results. Another advantage may be that the method may be implemented so as to operate in a fully automated manner.

It is a further object of the present invention to provide an alternative to the prior art.

Thus, the above described object and several other objects are intended to be obtained in a first aspect of the invention by providing a method for estimating a measure of a penumbra size of a penumbra in biological tissue, the method comprising the steps of receiving a first image, the first image comprising data representative of a spatially resolved perfusion parameter, receiving a second image, the second image comprising data representative of a spatially resolved diffusion parameter, identifying a first area on the first image, which first area corresponds to a perfusion lesion, identifying a second area on the second image, which second area corresponds to a diffusion lesion, and estimating the measure of the penumbra size based on the first and the second area, wherein the method further comprises applying a first image processing method on the perfusion weighted image, the first image processing method comprising a level set method, and applying a second image processing method on the diffusion weighted image, the second image processing method comprising a grayscale morphological operation.

The invention is particularly, but not exclusively, advantageous for improving speed and/or reproducibility and/or minimizing user intervention. The method produces lesion estimates with smooth boundaries. The invention provides a method for outlining the first area and the second area, and thereby the location and area of potentially salvageable tissue. An advantage of the invention may be that it enables fast estimation of a measure of a penumbra size of a penumbra in biological tissue. Another potential advantage may be that it enables reproducible estimates of a measure of a penumbra size of a penumbra in biological tissue. Another advantage may be that it enables estimation of a measure of a penumbra size of a penumbra in biological tissue, where the measure correlates well with estimates provided manually, such as manually by trained experts.

The penumbra size may be determined based on the first and second area, such as the penumbra is being determined as the difference between the first area and a third area, the third area being an area comprised by both the first area and the second area. In another embodiment, the penumbra is given as the difference between the first area and the second area.

By an image is understood a set of data points representative of a spatially resolved parameter, such as a set of spatially resolved values, where each data point corresponds to a value of a parameter in a position. It is understood that the positions may be comprised within a plane, corresponding to a two-dimensional image, or they may be distributed across more dimensions, for example three dimensions. It is further understood that each data-point may correspond to a finite area or volume, such as having a finite area or finite volume being assigned to each data point, although the position is described as a mathematically ideal point in space. In the present application 'map' is used interchangeably with 'image'.

It is understood, that even in the case of identification of an area in two-dimensional images, a corresponding volume may be derived, since it is understood that the two-dimensional image is assigned an extension, such as a depth, in the third spatial dimension being orthogonal to the two image dimensions. In other words, each pixel in the image represents a voxel. Hence it is understood that an area may correspond to a volume.

The images may represent slices of biological tissue, for example a human brain may be represented by approximately 20 images.

By first image is understood an image comprising data points representative of a spatially resolved perfusion parameter, such as a set of spatially resolved values, where each value corresponds to a value of a perfusion parameter in a given position. The first image may be an image obtained by perfusion weighted imaging (PWI). PWI is commonly known in the art.

By perfusion parameter is understood a measure which quantifies, represents or relates to the passage of fluid through an element, such as a biological tissue, such as a biological organ, in particular the delivery of arterial blood to the capillaries.

By second image is understood an image comprising data points representative of a spatially resolved diffusion parameter, such as a set of spatially resolved values, where each value corresponds to a value of a diffusion parameter in a given position. The second image may be an image obtained by diffusion weighted imaging (DWI). DWI is commonly known in the art.

The first image and/or second image may be provided by means of Nuclear Magnetic Resonance NMR imaging. Alternatively, other imaging techniques such as Positron Emission Tomography (PET), ultrasound or X-ray computed tomography (CT) may be applicable for obtaining the first and/or second image.

By diffusion parameter is understood a measure which quantifies, represents or relates to the mobility of molecules in their microenvironment, such as the dynamic displacements of water molecules.

By a first area is understood an area in the first image, which area corresponds to a perfusion lesion.

By a perfusion lesion is understood a severely ischemic, functionally impaired tissue region (or regions) at risk of infarction.

By a second area is understood an area in the second image, which area corresponds to a diffusion lesion.

By a diffusion lesion is understood a tissue region (or regions) representing irreversibly injured tissue.

By lesion is understood an acute damage to the biological tissue. By infarct is understood permanent damage of the biological tissue.

By a penumbra is understood an area which is comprised within the first area, but which is not comprised within the second area. The penumbra area thereby signifying severely ischemic, functionally impaired tissue at risk of infarction, that will be saved if reperfused before it is irreversibly damaged, but that otherwise will be progressively recruited into the diffusion lesion until maximum infarct extension is reached.

By a penumbra size is understood the size of the penumbra. For example, if the penumbra is given as an area corresponding to a number of data points in an image, the size of the penumbra may be given as a size corresponding to the sum of the size assigned to each of these data points.

By an image processing method is understood a method which takes an input image, such as the first image or the second image, as input, and outputs a new image, such as a processed image. The processed image may differ with respect to the input image in that one or more values have been altered and/or one or more positions have been altered. The image processing method may take as input a single image and output a single image, but it may however also take as input a plurality of images and output one or more images. For example, the image processing method may involve 3D kernels, thereby including information from other images, such as images representing neighboring slices in a biological tissue.

By a level set method (LSM) is understood a method which represents the boundary between regions in an image implicitly by the set of points for which a function, known as the level set function, defined on the image, takes on a fixed value. This may be the zero level set. Furthermore the method may comprise a differential equation describing the evolution over time of the level set function. The LSM may be used as an iterative technique for minimizing an energy functional, such that an image is segmented optimally into a number of regions. For instance, we may seek to separate an image into two regions, a method for which includes identifying a curve which divides the image into two regions, and where the position and shape of the curve or surface may correspond to a position and shape which minimizes an energy functional representing the error corresponding to a sum of the difference between the values of each of the data points in each of the two regions and a average of the values within each region respectively. The level-set method is in general a procedure for evolving curves according to a differential equation (initially Jacobi-Hamilton type). The 'driving force' of the evolution can either be inherent to properties of the contour itself (e.g. local curvature), but to be of value to image segmentation it may advantageously be tied to local image properties. A choice of force may advantageously be (inverse) image gradient, i.e., evolution is slowed at object boundaries. This requires calculation of image gradients, or more generally, edge detection (examples known in the field, in addition to the image gradient, include Canny edge detection, Sobel edge detection). In some images, such as in MTT images, there is often only a vague gradient between ischemic and normal tissue, which makes edge detection inefficient. In one embodiment a variational formulation is utilized in order to circumvent (Mumford-Shah type: minimization of heterogeneity) direct reference to edges, enabling identification of 'fuzzy' boundaries (sometimes called cognitive boundary).

Morphological grayscale opening and closing is commonly known in the art and refers to combinations of grayscale erosion $\ominus$ and dilation $\oplus$.

By a morphological grayscale reconstruction is understood any combination of opening- and closing-by-reconstruction. Reconstruction is successive (grayscale) dilation or erosion of marker image within the original image. Let $h_1$=marker image.

$$h_{k+1}=(h_k \oplus B) \cap g$$

or $$h_{k+1}=(h_k \ominus B) \cap g$$

until stability, $$h_{k+1}=h_k$$

where B is the structuring element and g is original image.

In one embodiment of the invention marker images may be obtained by grayscale erosion or grayscale dilation, or subtracting or adding a constant from/to the input image.

A morphological grayscale operation may be any combination of grayscale erosion, dilation, opening, closing, opening- and closing-by-reconstruction.

Morphological grayscale reconstruction may be advantageous in that it uniquely truncates high peaks, such as pixels with particularly high data values, in an image while tending to preserve original edges of coherent areas, as determined by the kernel size. Morphological Grayscale Reconstruction is described in "Morphological Grayscale Reconstruction in Image Analysis: Applications and Efficient Algorithms", Vincent, L, IEEE Trans. Image Processing Vol. 2, No. 2, pp. 176-201, April 1993, which is hereby included by reference.

Time-to-peak (TTP) images are commonly known in the art and a TTP image is understood to be an image where the spatially resolved parameter corresponds to a length of a time interval from a start time to a time corresponding to a maximum of a tissue concentration curve measured in a given position.

Mean-transit-time (MTT) images are commonly known in the art and a MTT image is understood to be an image where the spatially resolved parameter corresponds to the mean lead time of a fluid, such as blood, through the capillaries of biological tissue. This may be determined by the ratio of the maximum height of the tissue concentration curve deconvolved with the arterial input function, and the cerebral blood volume, determined using the area under the tissue concentration curve.

By connected component labeling (CCL) is understood a method wherein an image may be processed in order to identify data points which are connected with at least one other data point in terms of both values and positions. CCL is described in the reference Algorithms in C, 3rd Ed., Sedgewick, Robert, Addison-Wesley, 1998, pp. 11-20, which is hereby included by reference.

By a mask is understood a set of data points which delineates a region in an image. In the present context, the mask is understood to comprise information on the delineation, and it is encompassed that the mask is a set of data denoting a line which itself denotes the delineation, or that the mask is a set of data denoting the region which is delineated or a set of data denoting the surrounding region. It is further encompassed that the mask is a mathematical expression describing the delineation border or the delineated area or volume.

By opening, closing and filling are understood commonly known image processing methods, such as various combinations of morphological binary and/or grayscale morphological operations, such as erosion and dilation By regularization is understood an imposition of a penalty to image intensities and a subsequent modification of the image based on the penalty imposed on the image intensities. This may yield a soft constraint on the image intensities.

By seed point is understood a data point which is comprised within a lesion. For example, a seed point in a first image is understood to be a data point which is comprised within the perfusion lesion. For example, a seed point in a second image is understood to be a data point which is comprised within the diffusion lesion. It is further understood, that the seed point may be a data point which is defined as being comprised within a lesion.

Apparent Diffusion Coefficient (ADC) images are commonly known in the art and an ADC image is understood to be an image where the spatially resolved parameter corresponds to a measure which quantifies, represents or relates to the mobility of molecules in their microenvironment, in particular the dynamic displacements of water molecules. The ADC image intensities are in absolute scale.

By CSF is understood cerebrospinal fluid which is fluid that occupies the ventricular system in the brain and spinal cord.

Dynamic Susceptibility Contrast (DSC) MRI is commonly known in the art and refers to the measurements of the passage of a bolus of non-diffusible, paramagnetic contrast agent through the brain, typically using T2/T2* weighted MRI.

Cerebral Blood Flow (CBF) is commonly known in the art and refers to the rate of delivery of blood to tissue. In DSC MRI, CBF is typically calculated for each volume element (voxel) by the maximum function value of the deconvolved tissue curve.

Cerebral blood volume (CBV) is commonly known in the art and refers to the volume fraction of blood in a tissue region. In DSC MRI, CBV is often calculated as the area under the contrast agent concentration curve, and normalized by the area under the arterial input function.

Diffusion Weighted Imaging is commonly known in the art and refers to measurement of mobility of molecules in their microenvironment.

Diffusion weighted image (DWI) is commonly known in the art and refers to images acquired with an experimentally varied, so-called b factor, which depends on the applied gradient pulses amplitude and timing and has the effect of changing the sensitivity of images towards diffusion characteristics (diffusion weighting)

Apparent Diffusion Coefficient (ADC) is commonly known in the art and refers to measurement of the diffusion coefficient as opposed to simply obtaining a diffusion weighted image. ADC is typically obtained using a number of diffusion weighted images with varying values of the b-factor.

By MCA is understood the Middle Cerebral Artery which arises from carotis interna and provides blood supply to the frontal, the parietal and the temporal lobes, commonly known as the MCA territory By STM is understood an image processing technique to convert a grayscale or RGB images into binary image according to a predefined threshold.

By a structural map is understood a map differentiating (by image intensity) the diverse tissue components in the brain e.g. white matter, gray matter bone.

Voxel is commonly known in the art and is understood to be an entity representing a given volume, such as a volume within a biological tissue. A voxel may be assigned a value of a parameter, such as a perfusion parameter or a diffusion parameter. One or more voxels may constitute an image.

'Algorithm' is understood to be correspond to a 'method' and may as such be used interchangeably with 'method'. It is further understood, that an algorithm may be implemented in a computer program product, such as a program adapted to carry out a particular method.

In an embodiment of the invention, there is provided a method further comprising applying connected-component-labeling on any one image chosen from the group of: the first image and the second image. An advantage of using CCL may be that is it less sensitive to noise compared to, for example, thresholding. STM does not constrain the search within a certain cluster of voxel according to a seed point, but consider all voxels which are exceeding a certain threshold as lesion voxels regardless of their anatomical position or neighbourliness in reference to the actual lesion's position.

In another embodiment of the invention, there is provided a method wherein the method further comprising applying morphological binary reconstruction on any one image chosen from the group of: the first image and the second image. Morphological binary reconstruction may be applicaple for determining which voxels are connected to the seed point. An advantage of using morphological reconstruction may be that is it less sensitive to noise compared to, for example, thresholding. STM does not constrain the search within a certain cluster of voxels according to a seed point, but consider all voxels which are exceeding a certain threshold as lesion voxels regardless of their anatomical position or neighbourliness in reference to the actual lesion's position. Another possible advantage of morphological reconstruction is that it is fast.

By 'morphological binary reconstruction' is understood a morphological transformation involving two images and a structuring element. One image (the marker) is the starting point for the transformation. The other image (the mask), constrains the transformation. The structuring element used defines connectivity. Morphological binary reconstruction for the purpose of extracting connected components is further described in the reference "Morphological Grayscale Reconstruction in Image Analysis: Applications and Efficient Algorithms", Vincent, L., IEEE Transactions on Image Processing, 1993. 2(2): p. 176-201 which is hereby incorporated by reference in its entirety, In an embodiment of the invention, there is provided a method wherein the second image processing method further comprises receiving a parameter determined by the first image processing method, and wherein the step of identifying the second area is based on the parameter. This may be advantageous in that automatic segmentation algorithms for certain image modalities, e.g. MTT and DWI may advantageously take as input a parameter obtained from analysis of another image modality, such as a TTP image. The parameter may be a region of interest or a mask. Receiving such parameter may be beneficial for reducing the time needed for running the algorithm, and for avoiding false positive lesions.

In another embodiment of the invention there is provided a method wherein the first image processing method comprises
  identifying a primary mask on a primary first image,
  identifying the first area on the first image as an area on a
    secondary first image, based on the secondary first
    image and the primary mask,
wherein the primary first image is not corrected for arterial input function, and the secondary first image is corrected for arterial input function.

In yet another embodiment of the invention, there is provided a method wherein the step of
  identifying a primary mask on the primary first image,
comprises applying a level-set method on the primary first image.

In another embodiment of the invention, there is provided a method wherein the first image processing method comprises identifying a primary mask on a primary first image, and wherein the step of identifying a first area on the first image, takes as input a secondary first image, and the primary mask, wherein the primary and the secondary first image are dissimilar in that the secondary first image has been processed based on an arterial input function. It is understood, that the primary first image may be a first image not corrected for arterial input function, and that the secondary first image may be a first image corrected for arterial input function. An advantage of this may be that it facilitates fast convergence of the steps in the segmentation procedure, such as the level set iterations. Another advantage may be that it minimizes the effects of noise which is typically more evident in the secondary first image than in the primary first image. In a specific embodiment, the primary first image is a TTP image. In a specific embodiment, the secondary first image is a MTT image. The TTP lesion may be considered a reasonable initial estimate of the perfusion lesion, and the search for the lesion represented by abnormal MTT should consequently be initiated at this 'first guess'. A non-informed initialization of the MTT algorithm may pose a risk of the contour being attracted to artificially hyperintense regions far away from the region of interest.

In another embodiment of the invention, there is provided a method wherein the first image processing method further comprises applying a grayscale morphological operation. An advantage of applying a grayscale morphological operation may be that the influence of noise in an image may be reduced and the edges of lesions may be preserved.

In another embodiment of the invention, there is provided a method wherein the second image processing method further comprises applying a level set method. The ADC lesion and the DWI lesion does not necessarily match spatially, therefore it may be advantageous to use a level set method to adjust the DWI lesion boundaries.

In another embodiment of the invention, there is provided a method wherein the level set method of the first image processing method is a level set implementation of Mumford-Shah segmentation. This embodiment may adaptively segment an image into two regions with different average image intensity, such as values of parameters, such that the values within each region are (optimally) homogenous in the sense of varying closely around the respective averages. Mumford-Shah segmentation may thus include minimization of heterogeneity. In another embodiment, a curvature penalty ensures that the boundary is a smooth curve. An advantage of this embodiment may be that it conforms to expert outlines of lesion volumes. The problem posed above, i.e., the problem of segmenting an image into two regions with different average image intensity, such as values of parameters, such that the values within each region are (optimally) homogenous in the sense of varying closely around the respective averages may be related to minimization of a cost function (or energy), embodied by the sum of intensity homogeneity in the two regions, over all possible contours. This is effectively a variational calculus problem, and it has been shown that an effective iterative solution can be formulated by recasting the problem in terms of a level set function, and calculating the associated Euler-Lagrange equation. In a particular embodiment, there is provided a method wherein the level set method of the first image processing method is an implementation of a Chan-Vese model. A Chan-Vese Model is known in the art, and may be seen as a simplification of the level set implementation of a Mumford-Shah model, where a piecewise-constant function is estimated.

Areas of artificially prolonged mean transit time, such as the ventricles, represent a challenge to fully automatic delineation of MTT lesions. In another embodiment, a concurrent DWI image may be utilized as a convenient means of excluding CSF voxels at no extra cost in the form of user intervention or speed. Alternatively, ventricles could be identified on the initial raw T2 weighted DSC image, or by using a CBV criteria.

In another embodiment of the invention, there is provided a method further comprising applying a binary morphological operation on any one image chosen from the group of: the first image and the second image. Binary morphological operation is commonly known in the art. An advantage of applying a binary morphological operation may be, that the step of identifying a first area on the first image and/or the step of identifying a second area on the second image may be improved, such as carried out faster, such as leading to a quantitatively better result with respect to expert identifications of first and/or second area. In yet another embodiment, the method further comprises applying a binary morphological reconstruction. A binary morphological reconstruction is commonly known in the art.

Examples of binary morphological operations may include: Filling "holes" within a lesion that arise from signal drop out, removing small artifacts which show connectivity to the lesion and smoothening the lesion boundaries e.g. morphological opening and closing. Applying a binary morphological operation may be advantageous in order to mediate boundary irregularities and/or reduce number of false positive lesions.

In another embodiment of the invention, there is provided a method wherein the binary morphological operation includes any one of image processing techniques chosen from the group of: Opening, closing, filling.

In another embodiment of the invention, there is provided a method further comprising identifying a seed point in any one image chosen from the group of: the first image and the second image. An advantage may be that by combining CCL with determination of a seed point, such as by automatic or manual determination, the segmentation of an image without including false positive objects is enabled. By implementing the seed point feature from region growing in CCL, a fast and less noisy segmentation of TTP lesions is obtained.

In another embodiment of the invention, there is provided a method wherein the step of identifying the seed point comprises identification of a primary point in the image, which primary point corresponds to a point in the image which has a data value which is higher or lower with respect to other points in the image. An advantage of this may be that it enables implementation of automated determination of seed point.

In another embodiment of the invention, there is provided a method wherein the step of identifying the seed point comprises detection of lesion laterality, such as the detection of lesion laterality comprising determining an average voxel value for each hemisphere within a single imaging modality, such as such as the detection of lesion laterality comprising extracting one or more features for each hemisphere from a plurality of different imaging modalities, such as the different modalities being a TTP image and an ADC image. The seed point may be confined to be in the lesion laterality. In another particular embodiment, there is provided a method wherein the step of identifying the seed point comprises detection of lesion laterality, wherein the determination of the lesion laterality comprises the steps of determining a first feature for each hemisphere based on a first imaging modality, and determining a second feature for each hemisphere based on a second imaging modality, the second imaging modality being different from the first imaging modality. In another particular embodiment, the lesion laterality may be determined based on one or more features, such as features extracted on either hemisphere on the filtered TTP map, such as the features of: 1) mean intensity value of left and right hemisphere, 2) laterality of maximum intensity voxel on TTP map and 3) the amount of ADC voxels with intensity <600*10−6 mm2/sec. For each feature the "winning" hemisphere may be assigned the value 1 and ultimately the hemisphere with at least two positive outcomes may be considered as the ipsi-laterale hemisphere. An advantage of determining one or more features for each hemisphere from a plurality of different imaging modalities, may be that determination of the lesion laterality may thus be achieved with a higher certainty, i.e., with less risk of choosing the wrong hemisphere. In consequence, when confining the seed point to be in the determined hemisphere, the certainty of having the seed point in the correct hemisphere is larger, i.e., with less risk of choosing the wrong hemisphere.

According to a second aspect of the invention, the invention further relates to a system for estimating a measure of a penumbra size of a penumbra in a subject, the system comprising
  an input for receiving a first image, the first image comprising data representative of a spatially resolved perfusion parameter,
  an input for receiving a second image, the second image comprising data representative of a spatially resolved diffusion parameter,
  an image processing unit arranged for identifying a first area on the first image, which first area corresponds to a perfusion lesion,
  an image processing unit arranged for identifying a second area on the second image, which second area corresponds to a diffusion lesion, and
  a processor arranged for estimating the measure of the penumbra size as the difference between the first area and a third area, the third area being an area comprised by both the first area and the second area,
  wherein the method further comprises
  an image processing unit arranged for applying a first image processing method on the perfusion weighted image, the first image processing method comprising a level set method, and
  an image processing unit arranged for applying a second image processing method on the diffusion weighted image, the second image processing method comprising a grayscale morphological operation.

In another embodiment, there is provided a system for estimating a measure of a penumbra size of a penumbra in a subject, the system comprising an imaging unit, such as a nuclear magnetic resonance scanner.

According to a third aspect of the invention, the invention further relates to a computer program product enabled to carry out the method according to the first aspect. By employing a computer program product, the method may be carried out fast and reliably with minimal or no user intervention.

According to a fourth aspect of the invention, the invention further relates to use of a method according to the first aspect for estimating a measure of a penumbra size of a penumbra in biological tissue, wherein the biological tissue is a brain tissue.

The first, second, third and fourth aspect of the present invention may each be combined with any of the other aspects. These and other aspects of the invention will be apparent from and elucidated with reference to the embodiments described hereinafter.

BRIEF DESCRIPTION OF THE FIGURES

The method for computer assisted delineation of tissue lesions according to the invention will now be described in more detail with regard to the accompanying figures. The figures show one way of implementing the present invention and is not to be construed as being limiting to other possible embodiments falling within the scope of the attached claim set.

FIG. 2 shows volumetric comparison of the algorithm according to Example 1, STM and manual outlining at optimum threshold, FIG. 12 shows determination of DWI threshold.

DETAILED DESCRIPTION OF AN EMBODIMENT

Figure 1:
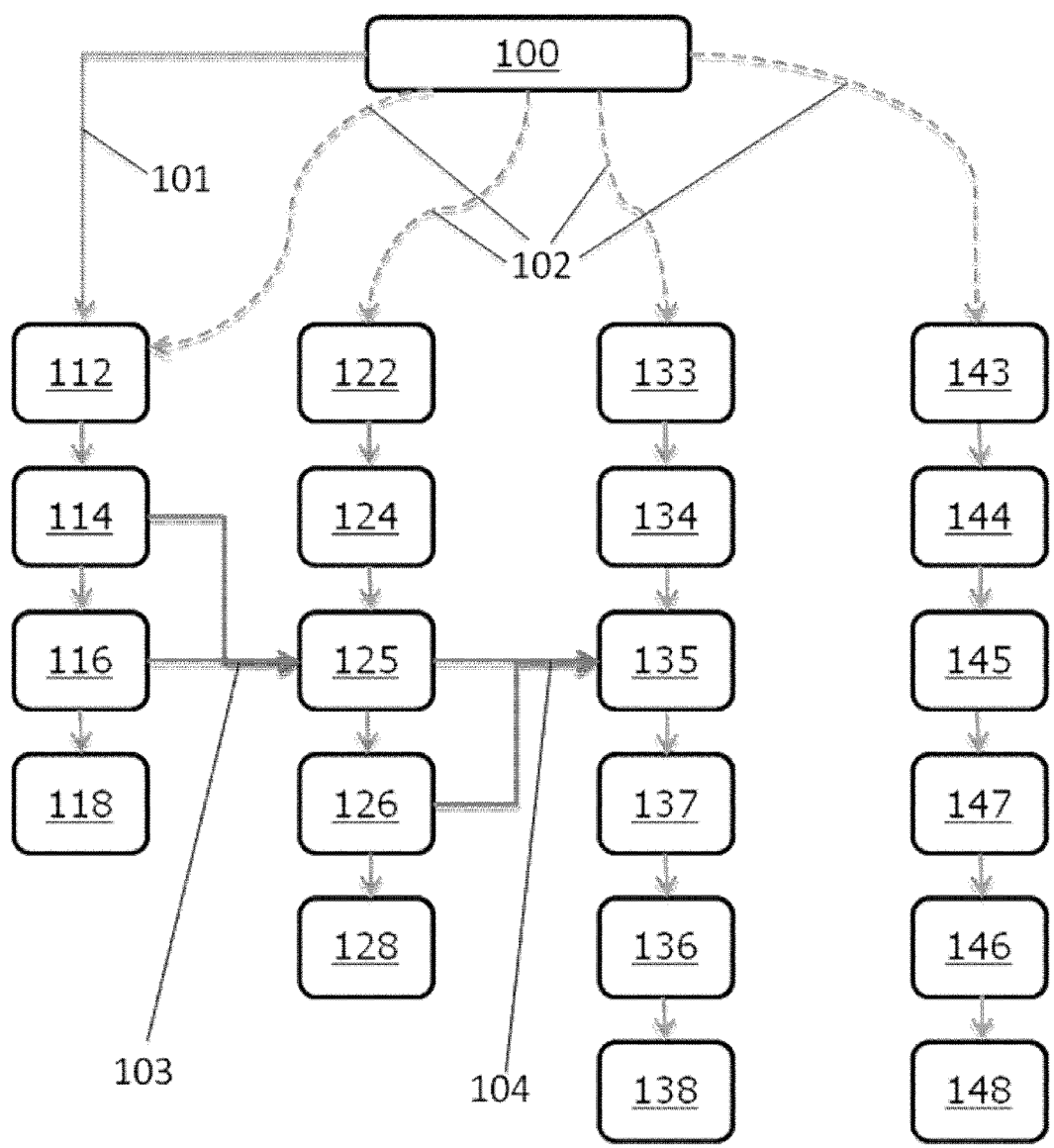
FIG. 1 shows a flow chart of an embodiment according to the invention.

FIG. 1 shows a flow chart of a method according to an embodiment of the invention. FIG. 1 shows the step of receiving an input 100, such as from a graphical user interface (GUI) for providing input to a processor, which processor controls the procedure. The graphical user interface may be a main graphical user and it handles the segmentation procedures, such as segmentation of a first image and second image and/or subtypes thereof, and it contains data relating to lesion volumes returned from the segmentation procedures. Due to the input 100 one or more segmentation procedures (such as segmentation of images of type TTP, MTT, DWI and FU) may be initiated individually, as indicated by dashed arrows 102, or sequentially (such as in the temporal order TTP, MTT and DWI) as indicated by arrows 101, 103, 104. In FIG. 1, the steps in each column represent steps carried out for a certain image type. The arrows 103, 104 indicate that data obtained in a method step for one image type may serve as input in a method step on another image type.

For a TTP image the method steps include determining 112 a seed point, applying 114 connected components labeling and a level set method for generating a mask on the TTP image. The method also includes tuning 116 by a user, such as via the GUI, and sending 118 the volumes obtained in the previous steps 112, 114, 116 to the processor.

For a MTT image the method steps include determining 122 a seed point in the TTP image, applying 124 determination of seed point and connected components labeling and a level set method on the TTP image for generating a mask on the TTP image. The TTP mask is then used as an input for applying 125 an algorithm for carrying out a level set method on the MTT image. The method also includes tuning 126 by a user, such as via the GUI, and sending 128 the statistics obtained in the previous steps 122, 124, 125, 126 to the processor.

For a DWI image the method steps include applying 133 a regularization and a grayscale morphological operation, applying 134 determination of a seed point and connected components labeling and a level set method on the TTP image for generating a TTP mask, determining 135 a DWI threshold, applying 137 connected components labeling for obtaining a DWI mask. The method also includes tuning 136 by a user, such as via the GUI, and sending 138 the statistics obtained in the previous steps 133, 134, 135, 137, 136 to the processor.

Each image type may be analysed individually as described above, however, for estimating a measure of a penumbra size of a penumbra in biological tissue, it may be advantageous to analyse the images sequentially, and use statistics, such as a mask, obtained for on image type serve as input for analysis of another image type, such as indicated by arrow 103 where statistics related to TTP mask and tuning by user is provided as input to the step of applying a level set method on the MTT image.

The method according to this embodiment also features steps for obtaining a follow-up mask, i.e., a mask on an image which is obtained a relatively long period of time after a stroke, such as 3 month, which represents the permanent infarct. This includes the steps of applying 143 a regularization and a grayscale morphological operation on a structural map, applying 144 CCL and a level set method on the TTP image and using the TTP mask to determine 145 a threshold in the structural image, applying 147 connected components labeling on the structural image. The method also includes tuning 146 by a user, such as via the GUI, and sending 148 the statistics obtained in the previous steps 143, 144, 145, 147, 146 to the processor.

EXAMPLES

Example 1

Segmentation of an Image Comprising TTP Data

Materials & Methods
Morphological Grayscale Reconstruction

Finding a voxel within perfusion lesions, so-called seed point, appear easily discernible by eye, however, searching for the maximum of the image intensities often leads to a false positive seed point e.g. high intensities in regions of the image corresponding to irrelevant regions, such as eyes, cerebrospinal fluid (CSF), intensities outside the brain etc. To automatically detect a seed point, we use morphological grayscale reconstruction to truncate small spikes while preserving the edges of TTP lesion and homogenize the background of TTP maps. Compared with conventionally smoothing e.g. with a Gaussian kernel, morphological grayscale reconstruction is less sensitive to spikes and for that reason more suitable for seed point detection. In the present context, spikes are understood to be areas which are relatively small compared to a lesion, and which comprise data points with extreme values, such as extreme values which differ with respect to the average values in the image in the same direction, such as polarity, as the data points of the lesion. In other words, if the lesion comprises bright pixels, spikes may be seen as small areas of bright pixels.

Connected Components Labeling

The connected component labeling (CCL) algorithm examines an image to find clusters of pixels, where the pixels in each cluster are connected in order to the given connectivity path. In an exemplary embodiment, the CCL algorithm comprises four steps. For simplicity a binary image with a searching path of 4-connectivity is considered. Step 1: The algorithm walks through all pixels from left to right. Step 2: When it reaches a pixel (p) with intensity=1, it examines the neighbours which have already been encountered (for 4-connectivity [−1,0; 0,1]): i) If both neighbours are=0, give p a new label. ii) If one of the neighbours=1, assign that label to p. iii) If both neighbours=1, assign one of the labels to p and note equivalence to several pixels. Step 3: Equivalent pairs are sorted in equivalent clusters. Step 4: The CCL algorithm runs through all pixels assigning the new labels. In this study we perform CCL in three dimensions and use a path of 6-connectivity.

Algorithm According to Example 1

An automatic generated CSF mask removes the ventricles in TTP maps. The CSF mask is obtained by using clustering analysis. The input image to k-means clustering is an image combined by a structural image (T2-weigthed) and an image obtained by diffusion weighted imaging (apparent diffusion coefficient, ADC). Co-registering a MNI (Montreal Neurological Institute) template to PWI maps automatically generates left and right hemisphere masks. Non-brain tissue (e.g. eyes, bone, air, etc.) and veins (transverse sinuses and sigmoid sinus) contributes with noise components in the inferior slices in PWI volume and increases the false-positive rate. We therefore, remove the inferior slices by analyzing the variance of the intensities in each slice.

TTP maps are filtered by morphological grayscale reconstruction for automatic detection of lesion laterality and seed point. By evaluating the mean intensities on either hemisphere on the filtered TTP map the laterality of the TTP lesion is determined. The seed point is defined as the voxel with the highest intensity in the filtered TTP maps.

The unfiltered TTP map's values are normalized with respect to mean TTP delay in the contra-lateral hemisphere. The contra-lateral hemisphere, which is the non-affected side has "normal" time-to-peak. Ipsi-lateral TTP maps are thresholded at >4 seconds and connected components are found by CCL algorithm. The connected component, which contains the seed point, is considered as the TTP lesion. Finally, small objects (<5 mL) are removed from the lesion mask, holes are filled and lesion boundaries are smoothened.

The TTP segmentation algorithm according to Example 1 is implemented in Matlab® R2010a by MathWorks®, but it is understood by the skilled person that the segmentation algorithm according to Example 1 may be implemented in other programming languages as well.

It is understood, that the algorithm according to Example 1 may be replaced with a corresponding method.

Patients and Image Acquisition

The study includes 119 patients (♀=49) and they are admitted in hospitals in four different countries (England, France, Germany, Spain and Denmark). These hospitals are members of the I-KNOW consortium. The median age of the patients is 71 years and the median time from onset of symptoms to initial MRI scan is 148 minutes (Table I in Annex 1).

Table I describes pooled patient characteristics. The range denotes first and third quartile.

The median acute TTP lesion is 107 mL and median National Institute of Health Stroke Scale (NIHSS) is 11. I-KNOW protocol defines seven stroke-subtypes where cardiac source of emboli is the leading stroke sub-type followed by large vessel disease with significant carotid stenosis and undetermined subtype. Standard dynamic susceptibility contrast MRI is performed on different models of scanners (GE Signa Excite 1.5, GE Signa Excite 3, GE Signa HDx 1.5, Siemens TrioTim 3, Siemens Avanto 1.5, Siemens Sonata 1.5, Philips Gyroscan NT 1.5, Philips Intera 1.5).

Comparison of the Algorithm According to Example 1 and Manual TTP Lesion Outlining A neuroradiologist with extensive clinical experience semi-automatically outlines the TTP lesions using in-house developed software. The software utilize standard thresholding method, which roughly identify the TTP lesion and subsequently the neuroradiologist can manually adjust the lesion boundary and the neuroradiologist is blinded to any intensity scale and other brain maps. We conduct an optimization trial to estimate the optimum TTP threshold for the current neuroradiologist by minimizing the total sum of squared error for the whole data set. Finally, TTP lesions at >4 seconds are also estimated using Standard Thresholding Method STM. To quantify the geometric and volumetric similarity between the algorithm according to Example 1/STM and manually outlined lesions we use Dice coefficient, which is a ratio between 0 and 1. A value of 1 indicates complete overlap and a value of 0 indicates no overlap. The sensitivity and specificity are determined on the ipsi-lateral hemisphere.

Results

Volumetric Comparison

The best performance of the algorithm according to Example 1 is obtained at TTP>2.8 seconds. The Spearman correlation between TTP lesion volumes obtained from manual outlining and the algorithm according to Example 1 approach is $R^2$=0.89, see FIG. 2A.

FIG. 2 shows volumetric comparison of the algorithm according to Example 1, STM and manual outlining at optimum threshold.

FIG. 2A: The optimum threshold for the current neuroradiologist was estimated to >2.8 seconds ($R^2$=0.89). FIG. 2A shows data for the algorithm according to Example 1, the first axis shows manually determined mask volume [mL] while the second axis shows lesion volume [mL] determined by the algorithm according to Example 1.

FIG. 2B: STM overestimates TTP lesion compared with manual outlining ($R^2$=0.7). FIG. 2B shows data for the STM approach, the first axis shows manually determined mask volume [mL] while the second axis shows lesion volume [mL] determined by the STM approach.

FIG. 2C: Bland-Altman plot for the manual approach compared with the algorithm according to Example 1 and FIG. 2D: Bland-Altman plot for manual approach compared with STM. The Solid line indicates the mean between the two compared methods and dashed lines indicate mean difference±2 standard deviations (SD). The first axis shows mean lesion volume [mL] and the second axis shows the difference [mL] between manually determined volume and volume determined according to the algorithm according to Example 1 and the STM approach, respectively, in FIG. 2C and FIG. 2D.

At optimum TTP threshold the mean difference between manual outlining and algorithm according to Example 1 is 1.6 mL (±2 SD: 74.5 mL), see FIG. 2C.

At TTP>4 seconds the algorithm according to Example 1 slightly underestimates the lesion volumes compared with the manual outlining. The correlation between TTP lesion volumes using the manual and the algorithm according to Example 1 at TTP>4 seconds is $R^2=0.87$ and the mean difference between manual outlining and algorithm according to Example 1 at TTP>4 seconds is 35.3 mL (±2 SD: 76.1 mL), see FIG. 3.

Figure 3:
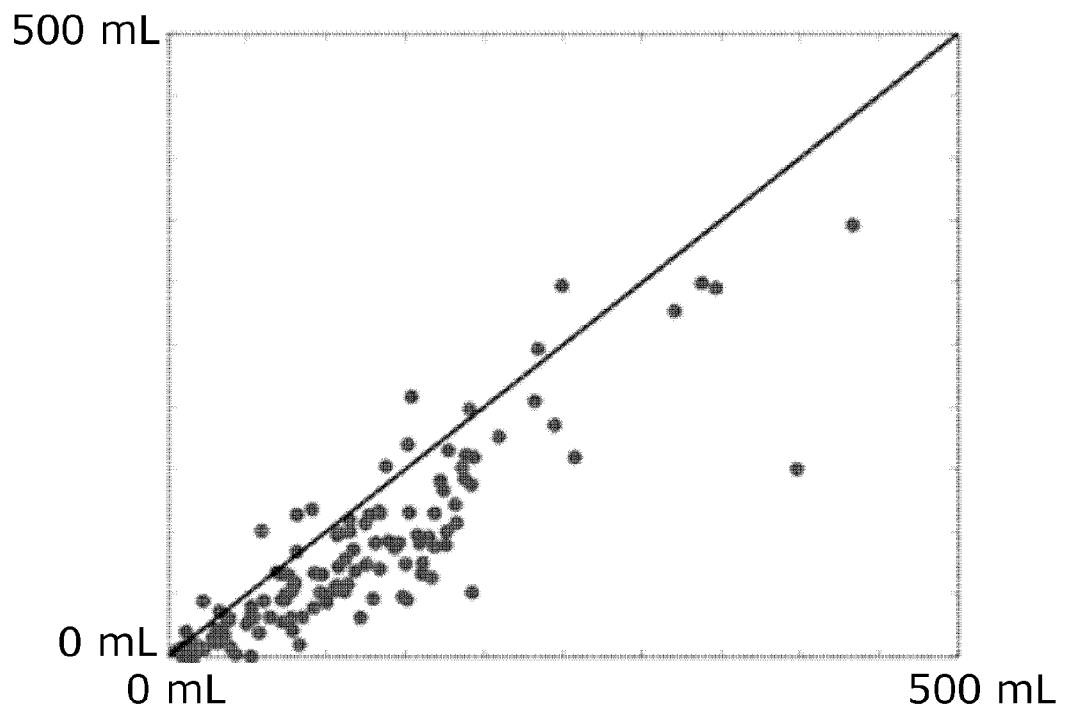
FIG. 3 shows that at TTP>4 seconds the algorithm according to Example 1 underestimates the lesion volume compared with expert (Spearman correlation $R^2$=0.87)

FIG. 3 shows that at TTP>4 seconds the algorithm according to Example 1 underestimates the lesion volume compared with expert (Spearman correlation $R^2=0.87$).

The STM at TTP>2.8 seconds overestimates TTP lesion volumes compared with the manual outlining, see FIG. 2B. The mean difference between manual outlining and STM is −47.5 mL (±2 SD: 115 mL), see FIG. 2D, and the correlation is $R^2=0.70$.

Figure 5:
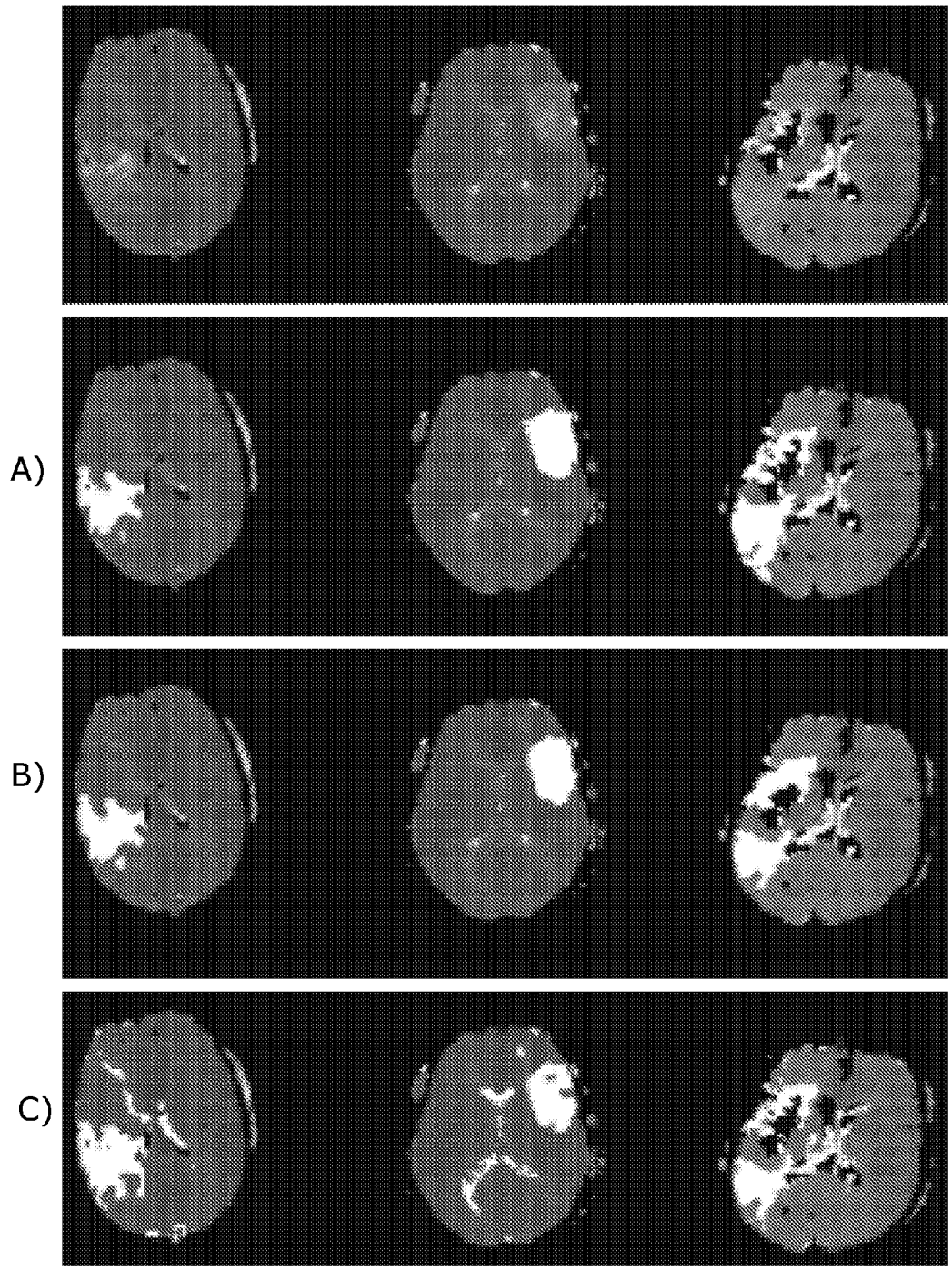
FIG. 5 shows examples of segmentations yielded by the algorithm according to Example 1 and STM.

FIG. 5 shows examples of segmentations yielded by the algorithm according to Example 1 and STM. In the upper row the TTP maps and the following rows show a) manual mask, b) mask obtained from the algorithm according to Example 1 and c) mask obtained from STM overlaid (white) on TTP map. Both non-manual maps are obtained at TTP>2.8 seconds. In general, the algorithm according to Example 1 estimates the boundaries as smooth curves compared with the threshold method. Furthermore the algorithm according to Example 1 is highly able to avoid false positive lesions (FIG. 5).

Performance of Classification

At optimum TTP threshold, the median sensitivity for the algorithm according to Example 1 (median: 80% and $25^{th}$-$75^{th}$ quartile: 64-88%) is not significantly (p=0.22) higher than median sensitivity for STM (median: 74% and $25^{th}$-$75^{th}$ quartile: 57-83), however, there is significant difference between the specificities for the algorithm according to Example 1 and STM (p<0.001). For the algorithm according to Example 1 the median specificity is 95% ($25^{th}$-$75^{th}$ quartile: 92-98%) and for STM median specificity is 91% ($25^{th}$-$75^{th}$ quartile: 88-95%), see table II in Annex 1.

Table II describes sensitivity and specificity in percent for the algorithm according to Example 1 and STM at optimum TTP threshold. In parentheses the first and third quartile is given and furthermore the statistics from a rank sum test are also given.

Figure 4:
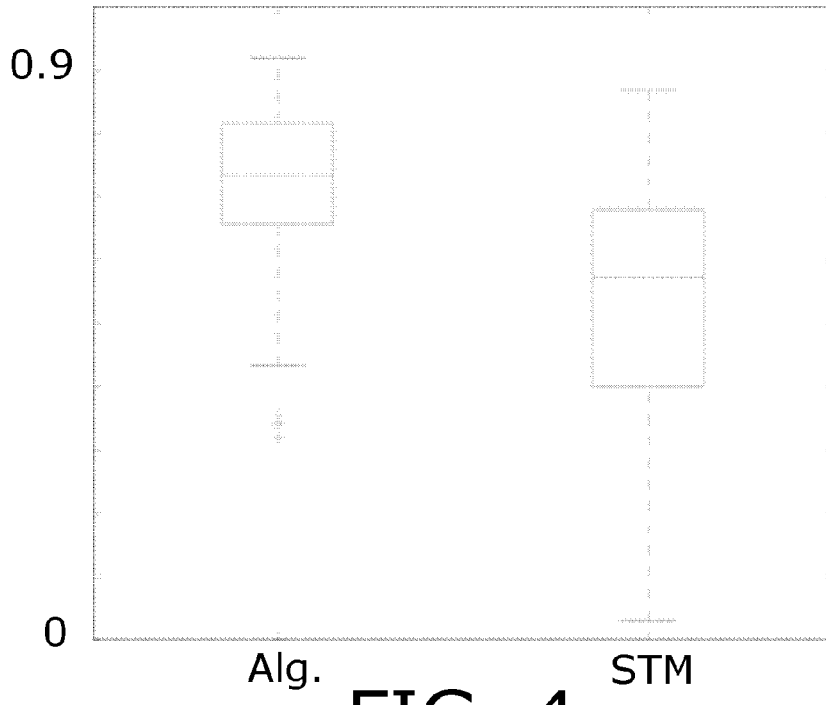
FIG. 4 shows a box plot of Dice coefficients for the algorithm according to Example 1 and STM.

Furthermore the Dice coefficient analysis indicates that the mask (median Dice coefficient: 0.73) produced by the algorithm according to Example 1 has significantly (p<0.001) higher similarity with the manually outlined TTP lesion mask than the mask generated by STM (median Dice coefficient: 0.57), see FIG. 4.

FIG. 4 shows a box plot of Dice coefficients for the algorithm according to Example 1 and STM.

Example 2

Segmentation of an Image of Type MTT Data

Materials and Methods
Level Sets

The approach emerges from the assumption that the average MTT value, $M_{hypo}$, in a hypoperfused region is higher than the average normal MTT value, $M_{norm}$. In the hypoperfused area, MTT values will vary around $M_{hypo}$, while in normal tissue they are close to $M_{norm}$. This corresponds to low mean squared errors between image MTT values, MTT(x,y), and the respective averages. Identifying the lesion, such as the ischemic lesion, can then be formulated as finding a smooth, closed curve C, which minimizes the total variation (Eq. (1))

$$E=\int_{Inside\ C}(MTT(x,y)-M_{hypo})^2 dxdy+\int_{Outside\ C}(MTT(x,y)-M_{norm})^2 dxdy$$

Since ischemic regions are not necessarily coherent, for instance in cases with occlusions causing lesions in the watershed areas, it is important that C can represent multiple curves. This can be ensured by defining C implicitly as the zero-level set of a function φ which assigns a value to each point the plane, C={φ(x,y)=0}. The function φ is called the level set function.

If we let H(z) denote the Heaviside function, which is zero except when z≥0, and its derivative δ(z)=dH(z)/dz, then (1) can be written as (Eq. (2))

$$E = \lambda_1 \int (MTT(x,y) - M_{hypo})^2 H(\phi) dxdy + \lambda_2 \int (MTT(x,y) - M_{norm})^2 (1 - H(\phi)) dxdy + \alpha \int \delta(\phi)|\nabla \phi| dxdy$$

The last term measures the length of the contour, and in effect controls the smoothness. We have also introduced parameters $\lambda_1$ and $\lambda_2$ to control the weight of the two error terms. It can be shown that E can be minimized by iteratively solving the differential equation (Eq. (3))

$$\frac{d\phi}{dt} = |\nabla \phi|\left[\alpha \nabla \cdot \left(\frac{\nabla \phi}{|\nabla \phi|}\right) + \lambda_1 (MTT(x,y) - M_{hypo})^2 - \lambda_2 (MTT(x,y) - M_{norm})^2\right]$$

Therefore, by evolving an initial contour according to Eq. (3) we obtain a smooth boundary separating the MTT image into two homogenous regions. Values of $M_{hypo}$ and $M_{norm}$ are estimated adaptively as the averages inside and outside the contour in each iteration.

The Algorithm According to Example 2

To minimize intersubject variation in global image intensity, images must be standardized before applying the level set procedure. In this approach, we delineate a small contralateral region of normal appearing white matter and subtract the corresponding mean MTT value from all voxels. In order to avoid spurious outlining of ventricles (some postprocessing algorithms generate areas with long MTTs corresponding to CSF voxels), these are automatically segmented based on DWI acquired as part of the stroke protocol. Following linear co-registration of PWI and DWI images, ventricular voxels are identified by their apparent diffusion coefficient (ADC), such that voxels with ADC values exceeding average normal white matter ADC by a factor of $ADC_r=2.9$ are set to zero in the normalized MTT image. The initial lesion estimate(s) used in the level-set algorithm according to Example 2 is defined as regions with relative ADC less than $ADC_r$ and relative MTT exceeding 1.2.

After initial assessment, the weight parameters in Eqs (3-4) are fixed at $\lambda_1=1.0$, $\lambda_2=1.25$ and $\alpha=0.5$. This corresponds to a slightly higher penalty for MTT heterogeneity in normal tissue than in the lesion. The sensitivity to changes in the weight parameters is described below (see also FIG. 6).

Figure 6:
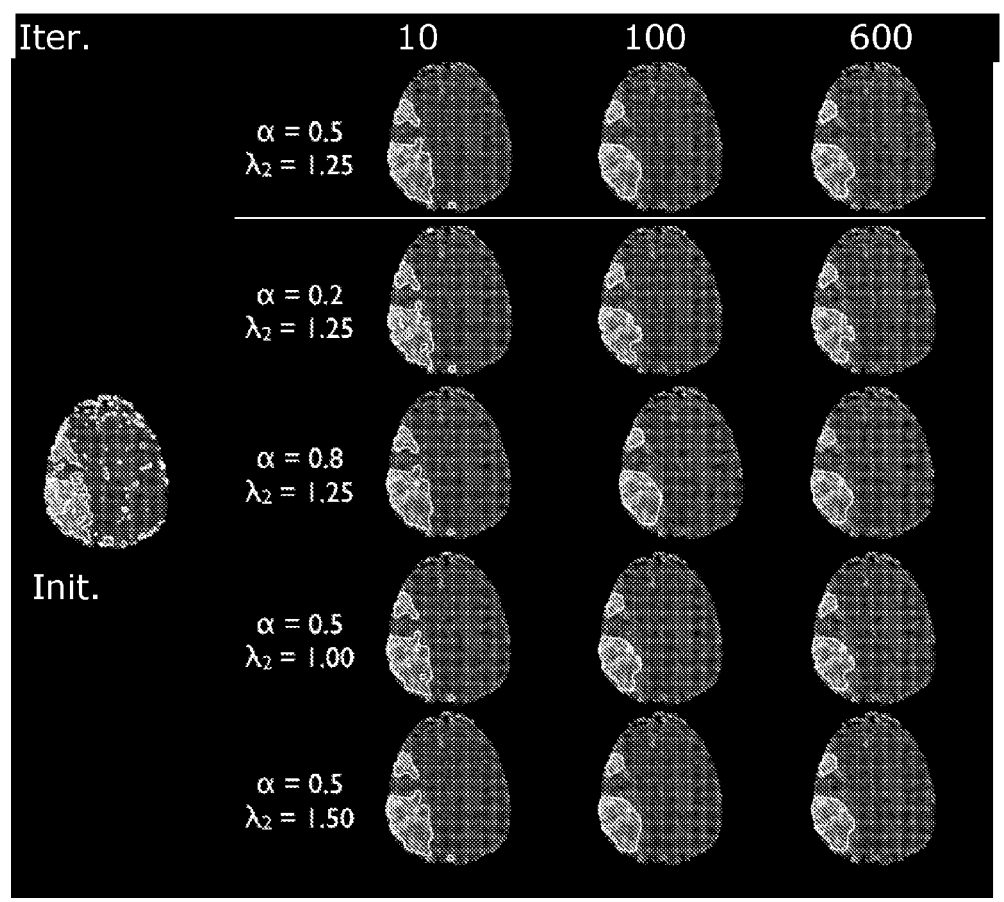
FIG. 6: Examples of estimated lesion boundaries obtained at certain iterations, FIG. 7 compares level set lesion volumes to those of experts.

FIG. 6 shows examples of estimated lesion boundaries obtained at certain iterations during evolution according to Eq (3) for different values of the smoothing parameter $\alpha$ and heterogeneity penalty $\lambda_2$. The top row shows the evolution with the parameters used in this study. At initialization the normalized MTT image is thresholded, yielding holes in the main lesions and identification of many small 'false' lesions. Using the study parameters these are resolved after 10 iterations and after 100 iterations the contour approximates the lesion well. Only minor contour changes are observed after 600 iterations indicating convergence. Applying a lower degree of smoothing ($\alpha=0.2$) the estimated contour is more sensitive to irregularities in the image along the lesion border, whereas further restriction of the boundary length ($\alpha=0.8$) leads to more circular contours. Decreasing $\lambda_2$ allows more heterogeneity among non-lesion voxels and some high-intensity voxels may consequently be included in this group leading to smaller lesion estimates ($\lambda_2=1.00$). Conversely, high values ($\lambda_2=1.50$) leads to larger and more heterogeneous lesion estimates.

A total of 600 iterations are performed in each slice. All algorithms are implemented in Matlab® R2007a by MathWorks®. The implementation of Eq (3) is adapted from www.shawnlankton.com/2007/05/active-contours/. Details can also be found in the reference "Active contours without edges" by Chan T F, Vese L A, in IEEE Transactions on Image Processing, vol. 10, issue 2, p. 266-277, 2001, which is hereby incorporated by reference.

It is understood, that the algorithm according to Example 2 may be replaced with a corresponding method.

Patients and Image Acquisition

We include 14 patients presenting symptoms of acute ischemic stroke (NIHSS 12.5±5.64). Standard dynamic susceptibility contrast MRI is performed within 3 hours of onset with a 3.0 T MR scanner (Signa Excite HDx, General Electric Medical Systems, Milwaukee, Wis., USA). Mean transit time is calculated by block-circulant singular value decomposition (oSVD), with an automatic arterial input function search algorithm, using the perfusion analysis software PENGUIN (www.cfin.au.dki/software/penguin). Block-circulant SVD proceeds by forming a block-circulant (Töplitz) matrix using observations of the arterial input function, and thresholding the eigenvalues based on an oscillation index (as in the reference Wu O, Østergaard L, Weisskoff R M, Benner T, Rosen B R, Sorensen A G. Tracer arrival timing-insensitive technique for estimating flow in mr perfusion-weighted imaging using singular value decomposition with a block-circulant deconvolution matrix. *Magnetic resonance in medicine: official journal of the Society of Magnetic Resonance in Medicine/Society of Magnetic Resonance in Medicine.* 2003; 50:164-174, which is hereby incorporated by reference).

Manual Lesion Outlining

Four neuroradiologists with extensive clinical experience with MTT map assessment manually outlined acute MTT lesions using freely available image analysis software ("MRIcro" by Chris Rorden, 2005, www.sph.sc.edu/comd/rorden/mricro.html). Readers are asked to delineate the extent of hypoperfused tissue based on their best clinical judgment. In order for lesion outlines to reflect 'true' inter-rater agreement among independent clinical experts, no further criteria or instructions are given prior to the study. Raters can freely adjust window/level settings according to preference. No automatic pre-processing, such as thresholding, is applied. Readers are blinded to all clinical and other imaging data.

Comparison of the Algorithm According to Example 2 and Manual Lesion Outlines

Previous studies indicate considerable inter-rater variability in lesion outline. In the absence of gold-standard lesion outline, we therefore compare the proposed, algorithm according to Example 2 to the extent of lesion outline confidence, as assessed by varying extent of consensus among experts. Consequently, four lesion-estimates are generated, with the largest corresponding to voxels classified as being hypoperfused by at least one expert, and the most conservative including only voxels classified as being hypoperfused ischemic by all experts. We then compare the lesion outlines estimated by the algorithm according to Example 2 to these four graded consensus volumes.

Finally, we compare the performance of the level set technique to a standard thresholding technique, labeling tissue voxels ischemic if the MTT exceeds the average value in normal appearing contralateral white matter by more than two standard deviations. As for the level set algorithm according to Example 2, this technique is applied to relative MTT maps pre-processed to remove ventricular voxels Results Convergence FIG. 6 illustrates the convergence of the initial contours towards the lesion boundary in a patient with elevated MTT in the two watershed territories of the right hemisphere. The initial estimate (Init.) shown in FIG. 6 shows a number of disconnected regions, with small areas of 'normal' tissue within extended lesions, as expected by the underlying thresholding approach. After 10 iterations (Iter.) (corresponding to 0.2 sec), two large coherent regions emerge while most small regions have disappeared. Further iterations mainly result in a smoothing of the estimated contour (100 iterations, 1.8 sec) due to the curve length penalty term in Eq (3). Only minor changes are observed between 100 and 600 iterations (10.0 sec), indicating rapid convergence. The median single-slice computation time across all patients in this study using 600 iterations is 10.0 sec [9.9, 10.1].

Comparison with Experts

Figure 7:
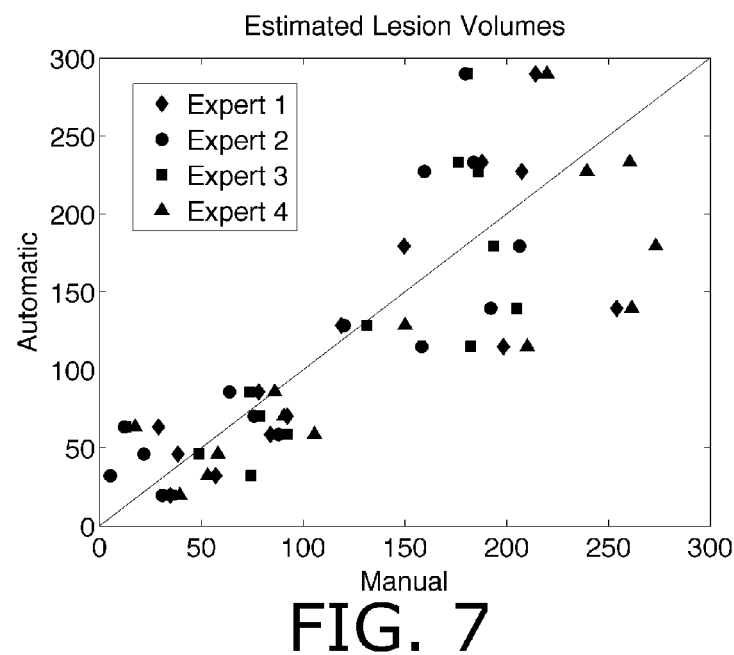

FIG. 7 compares level set lesion volumes to those of each expert and shows agreement between lesion volumes estimated by manual and MTT lesion outlining according the algorithm of Example 2. Although we note considerable variation in expert volumes, no systematic deviation from the identity line is observed indicating good overall agreement between manually estimated lesion volumes and lesion volumes estimated according to the algorithm of Example 2. Among experts, trends can be observed, with raters 2 and 3 typically outlining smaller hypoperfused volumes than raters 1 and 4.

FIG. 7 also demonstrates substantial variation in lesion volume estimated by the four experts. In all patients, the difference between the largest and smallest expert-estimated volume is greater than 10% of the average lesion size, and in 6 of 14 cases this difference exceeds 30%. This variation is dominated by the location of the lesion boundary outline.

Figure 8:
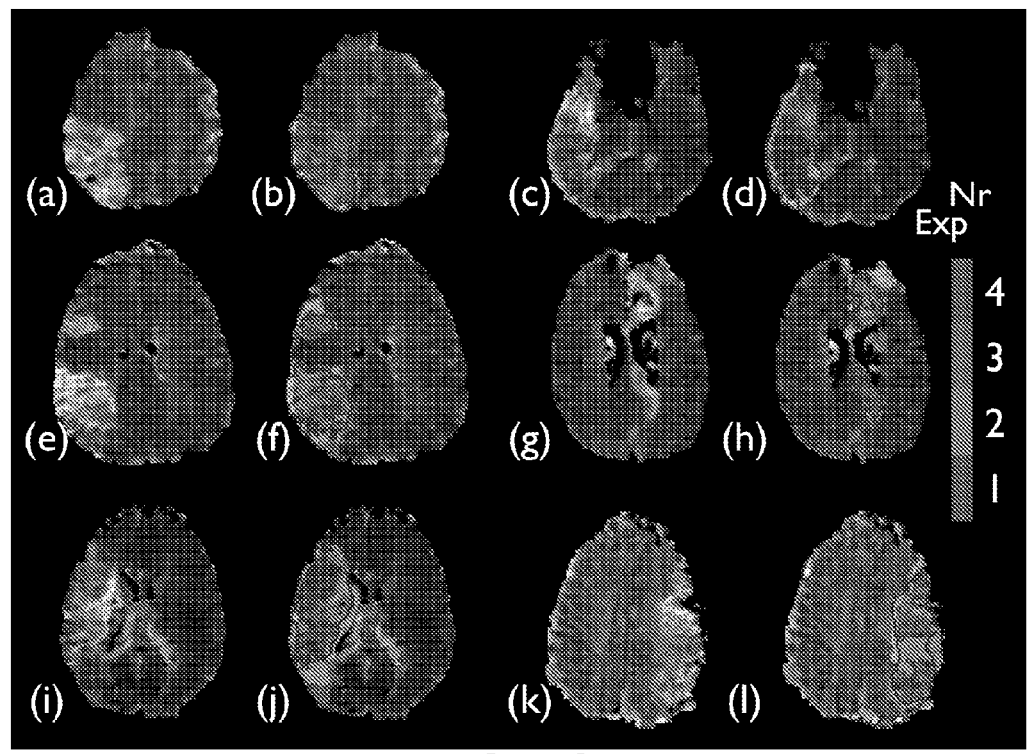
FIG. 8: Examples of lesion boundaries estimated by the algorithm according to Example 2 as well as inter-expert agreement for six patients with typical lesions.

FIG. 8 shows examples of lesion boundaries estimated by the algorithm according to Example 2 (red contour line) as well as inter-expert agreement for six patients with typical lesions. A patient with an MTT lesion in the posterior MCA territory is shown in FIG. 8(a), and FIG. 8(b) indicates excellent agreement among experts as well as between the algorithm according to Example 2 and experts. FIG. 8(c) shows an example where the exact location of the posterior border between normal and hypoperfused tissue is difficult to define. The algorithm according to Example 2, however, outlined the area in close agreement with experts, FIG. 8(d). FIG. 8 also shows the ability of the algorithm according to Example 2 to identify discrete lesions, in this case in a patient with hypoperfused areas within the Middle Cerebral Artery territory (FIG. 8(e-f)), and a patient with a lesion in the anterior carotid artery territory (FIG. 8(g)). FIG. 8(i,k) again represent cases with unclear borders between hypoperfused and unaffected tissue, resulting in variations in expert lesion delineation. In both cases the algorithm according to Example 2 matches the regions with consensus between more than 2 experts. We also note that the algorithm according to Example 2 correctly avoids MTT hyperintensities in the ventricles, FIG. 8(d,f,h,j). In all cases the algorithm according to Example 2 estimates the boundary as a smooth curve, avoiding the scatter of small 'false' lesions observed with thresholding (see FIG. 6). We note that the algorithm according to Example 2 identifies boundaries matching lesions of consensus between more than two experts, even in cases where there is no clear border between hypoperfused and normal tissue such as (c-d), (i-j), (k-l). However, in some cases the algorithm according to Example 2 falsely detects small lesions along the boundary of the brain (j,l), which could potentially be removed with further post-processing.

Figure 9:
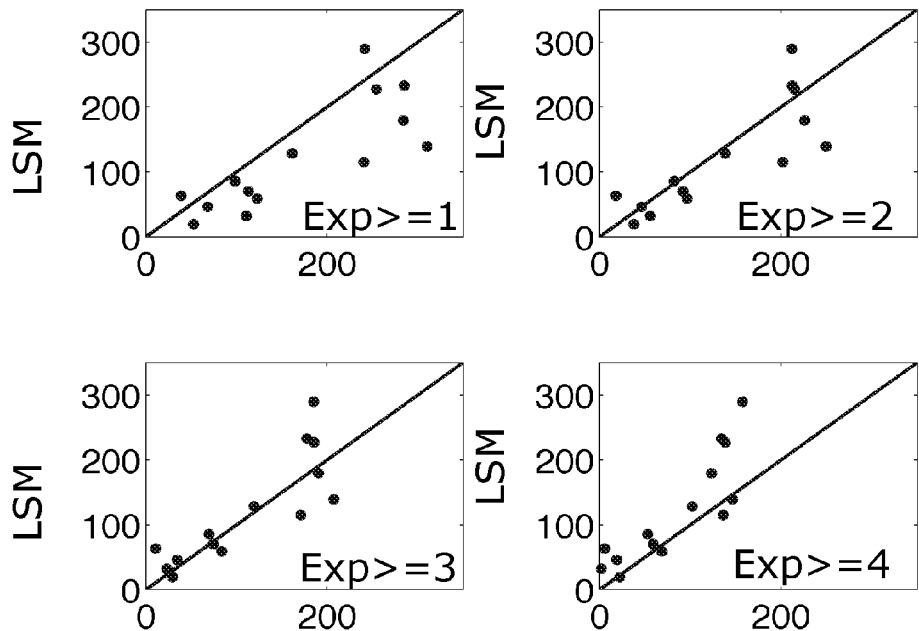
FIG. 9 shows agreement between the four expert consensus regions and the level set algorithm.

FIG. 9 shows the correlations between lesion volumes estimated by the algorithm according to Example 2 and the experts according to their consensus. Estimated volumes correlate well with lesions determined as the consensus between at least two experts. Some overestimation is observed compared to full expert consensus in large lesions. In contrast, lesion volumes detected by the algorithm according to Example 2 are smaller than lesions defined as the union of all voxels outlined by the experts. The lesions that result as tissue identified as hypoperfused by just one expert are larger than the MTT lesions determined by the algorithm according to Example 2. However, good agreement is observed between the algorithm according to Example 2 and lesions defined as consensus between 2 or more experts.

We use the difference in volumes between manually and algorithm according to Example 2 delineated MTT consensus lesions as a measure of agreement. Table 1 shows the average and standard deviation of the volume differences for both the level set technique and thresholding. The smallest difference −9.3±45.2 ml (manual-algorithm according to Example 2) is observed between the level set technique and lesions of consensus between at least three experts. The thresholding approach has lower bias than the level set technique only in the case where lesions are defined as the union of all expert selected voxels, but demonstrates larger standard deviations in all cases. A single data point is outside the 95% limits of agreement, as calculated from Table III in Annex 2, for each consensus degree and technique (however corresponding to different patients).

Table III shows average volume differences (in ml) between expert consensus lesions and the STM approach and the level set approach corresponding to the algorithm according to Example 3 (in ml). The level set technique algorithm according to Example 2 demonstrates low bias relative to regions of consensus between two or three experts. The STM (thresholding) approach has lower bias than the level set technique only in the case where lesions are defined as the union of all expert selected voxels, but demonstrates larger standard deviations in all cases.

Figure 10:
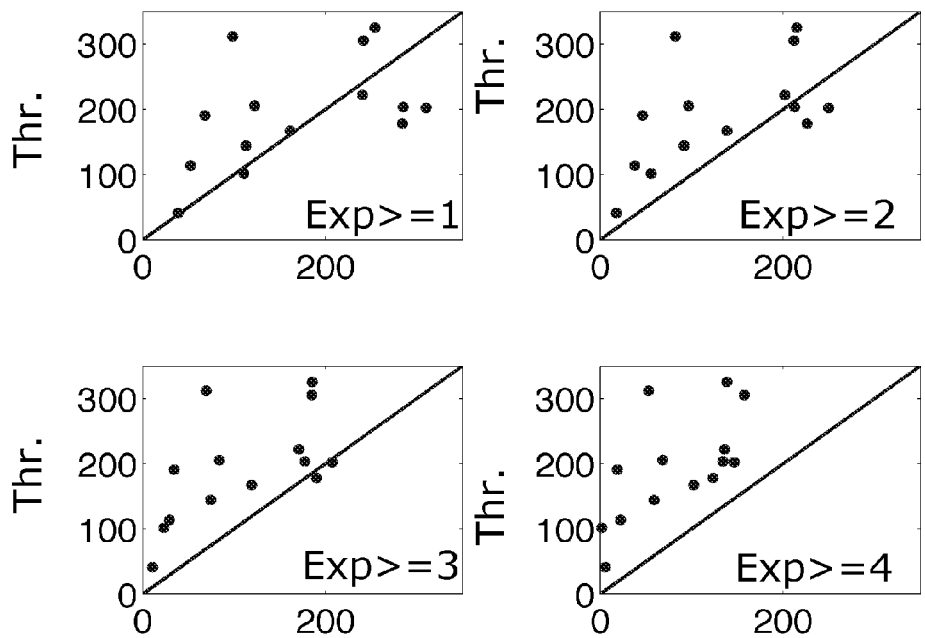
FIG. 10 shows agreement between the four expert consensus lesions and thresholding.

FIG. 10 shows the correlation between four expert consensus lesions and the thresholding technique where voxels are identified as hypoperfused when the MTT value exceeds two standard deviations from the average value in contralateral white matter. Note that thresholding systematically overestimations hypoperfused tissue volume relative to the consensus region. In contrast to the level set technique (see FIG. 9), the thresholding approach shows some agreement with lesions obtained as the union of all voxels selected by the experts, while it consistently overestimates the volume compared to regions of consensus between two or more experts.

The median sensitivity of the algorithm according to Example 2 in detecting the full consensus region is 0.74 [0.60; 0.89]. Lower sensitivity is observed in small lesions where this measure is numerically unstable. Considering the largest 75% of the lesions (above 22 ml), sensitivity is 0.82 [0.73; 0.90]. As indicated in FIG. 8(l), spurious hyperintensities may be falsely detected as ischemic tissue by the algorithm according to Example 2. The overall specificity is 0.95 [0.93; 0.98], and 0.96 [0.91; 0.98] when disregarding lesions less than 22 ml.

Discussion

Areas of artificially prolonged MTT, such as the ventricles, represent a critical challenge to fully automatic delineation of MTT lesions. We propose to utilize concurrent DWI imaging as a convenient means of excluding CSF voxels at no extra cost in the form of user intervention or speed. Alternatively, ventricles could be identified on the initial (infinite TR) raw T2 weighted DSC image, or by using a CBV criteria.

Although most voxels with high MTT values in CSF are removed during pre-processing, spurious 'high MTT' voxels remain, typically near the pons and along the cortical surface (cf. FIGS. 8(k) and 8(l)). Such regions may falsely be segmented by the proposed algorithm according to Example 2, thereby decreasing specificity. Further post processing could be applied to exclude for example voxels contralateral to the main lesions. Increasing the $\lambda_1$ term in Eqs (3-4) leads to smaller and more homogenous groups of voxels being outlined as hypoperfused. While this minimizes the false positive rate, voxels with more subtle MTT elevations may be missed, increasing false negative classification rate. Alternatively, isolated false positive voxels are easily identified, and limited user intervention is required to remove such regions for accurate volume quantification.

Example 3

Segmentation of an Image Obtained by DWI

Materials & Methods
Morphological Grayscale Reconstruction

Figure 11A:
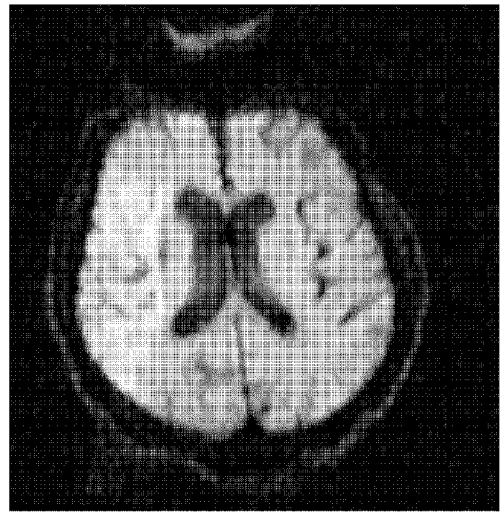
FIG. 11 shows pre-processing of DWI maps.
Figure 11B:
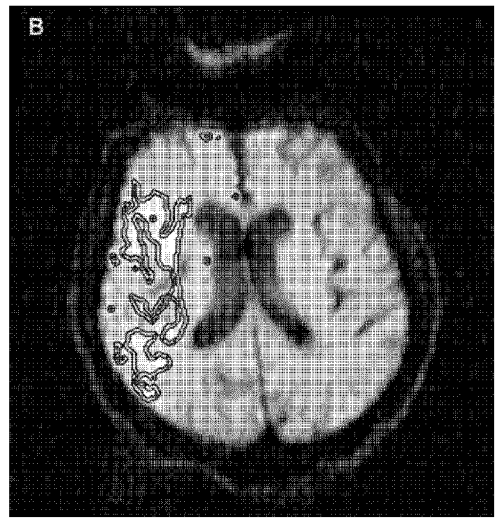
Figure 11C:
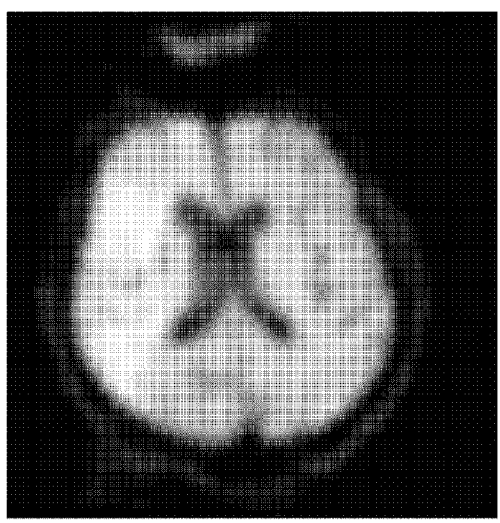
Figure 11D:
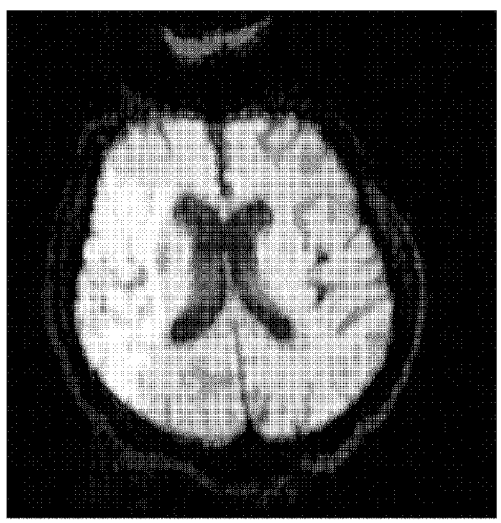

DWI lesion appears easily discernible by eye as a hyperintense region, although the diffusion lesion contains artefactual hypointensities and hyperintensities are present throughout the image due to anatomy and noise artifacts. Therefore simple thresholding of the image intensities leads to both high false positive and false negative rates as indicated in FIG. 11B. Typical image blurring, such as convolution by Gaussian kernel, remedies artifacts to some extent, although at the potential cost of 'moving' the lesion boundary. Morphological grayscale reconstruction uniquely truncates high peaks in the image while tending to preserve original edges of coherent areas, as determined by the kernel size. We use morphological grayscale reconstruction to enhance the contrast between the DWI lesion and the background. Compared with conventional blurring filter, morphological grayscale reconstruction preserves edges, see FIGS. 11C and 11D, and is therefore suitable for automatic DWI lesion segmentation.

The Algorithm According to Example 3

An automatically generated CSF mask removes the ventricles in DWI maps. The CSF mask is obtained by using clustering analysis. The input image to k-means clustering is an image combined by a structural (BZERO) and diffusion-weighted image (apparent diffusion coefficient, ADC). Co-registering a MNI (Montreal Neurological Institute) template to PWI maps automatically generated left and right hemisphere masks. A whole brain mask is generated by thresholding CBV>0 and sparsely connected isles in the whole brain mask are removed by morphological thinning. Non-brain tissue in the inferior slices in DWI volume (e.g. eyes, bone, air, etc.) contributes with noise components and increases the false-positive rate. We therefore, remove the inferior slices by analyzing the variance of the intensities in each slice.

TTP lesion mask is generated automatically using the algorithm according to Example 1. ADC maps are thresholded at 550 $mm^2/sec$ and ADC lesions outside TTP mask are removed, see FIGS. 12A and 12B. Furthermore small isles of a size less than 0.25 mL on each slice are removed.

DWI maps are filtered using morphological grayscale reconstruction. For each slice where an ADC lesion existed, a slice specific DWI lesion threshold is determined using the corresponding ADC mask, see FIG. 12C. Specifically, the slice specific threshold is determined by finding the edge of the ADC lesion mask and apply it on the gray-scale morphology processed DWI map and average the DWI intensities contained in the edge of the ADC mask. An advantage of this may be that a robust estimation of the DWI threshold is obtained. ADC lesion and DWI lesion does not necessarily match spatially. In order to determine the DWI lesions, each of the DWI slices are thresholded at the slice specific threshold and connected components are found by a Connected Component Labeling algorithm (CCL, described in Example 1). DWI lesion components, which are not connected to the TTP lesion, are removed. Mismatch is defined as: mismatch=$TTP_{area}$-($DWI_{area} \cap TTP_{area}$), consequently DWI lesion which is not contained in the TTP lesion is irrelevant in mismatch determination and is disregarded. Finally, holes in DWI lesions are filled and boundaries are smoothened. The segmentation algorithm according to Example 3 is implemented in Matlab® R2010a by MathWorks®.

It is understood, that the algorithm according to Example 3 may be replaced with a corresponding method.

Patients and Image Acquisition

Identical to Example 1.

Comparison of Lesion Outlining with the Algorithm According to Example 3 and Manual DWI Lesion Outlining A neuroradiologist with extensive clinical experience semi-automatically outlines the DWI lesions using in-house developed software. The software utilize standard thresholding method, which roughly identify the DWI lesion and subsequent the neuroradiologist can manually adjust the lesion boundary and the neuroradiologist is blinded to any intensity scale and other brain maps. Manual penumbra masks are determined based on the manually outlined DWI and TTP lesion masks and likewise automatic penumbra masks are based on the automatically generated DWI and TTP lesion masks. For penumbra the sensitivity and specificity are determined in the ipsi-lateral hemisphere and for DWI lesion the sensitivity and specificity are determined in the TTP lesion.

Results

DWI lesions outlined by the algorithm according to Example 3 have better spatial and volumetric agreement with manually outlined DWI lesion compared with DWI lesion outlined by STM. The overall Spearman correlation for algorithm according to Example 3 is $R^2$=0.79, see FIG. 13A. The median difference between manual outlining and the algorithm according to Example 3 is −1.4 mL (±2 SD: 20 mL). The penumbra volumes determined with the algorithm according to Example 3 have good correlation with the manually outlined penumbra volumes $R^2$=0.86, see FIG. 14A. The median difference in penumbra volume between manual outlining and the algorithm according to Example 3 is −0.07 mL (±2 SD: 73.5 mL). The median sensitivity is 71% ($25^{th}$-$75^{th}$ quartile: 59-83%) and the median specificity is 95% ($25^{th}$-$75^{th}$ quartile: 92-98%). The median difference in penumbra volume between manual outlining and STM is −41.1 mL (±2 SD: 116.2 mL). The median sensitivity is 64% ($25^{th}$-$75^{th}$ quartile: 49-77%) and the median specificity is 92% ($25^{th}$-$75^{th}$ quartile: 88-95%). Finally, an analysis of Dice coefficients showed that the penumbras estimated by algorithm according to Example 3 (median=0.67, $25^{th}$-$75^{th}$ quartile: 0.51-0.75) were more similar to the manually outlined penumbras (p<0.001) in contrast to the penumbra estimated by STM (median=0.46, $25^{th}$-$75^{th}$ quartile: 0.27-0.60).

FIG. 11: Pre-processing DWI maps. FIG. 11A shows the original DWI map, FIG. 11B shows the original DWI map segmented by using STM, this yields the DWI lesion and false positive areas in the medial part of the brain. Using a blurring filter, such as convolution by Gaussian kernel, remedies artifacts to some extent, but also blurs the lesion boundary (FIG. 11C), whereas morphological grayscale reconstruction enhances the contrast between lesion and background with clear edges (FIG. 11D).

FIG. 12: Determining DWI threshold.

FIG. 12A: ADC maps were thresholded at 550 $mm^2/sec$.

12B) ADC lesions, which were not contained in TTP lesion, were removed. FIG. 12C: ADC masks were applied on the morphological grayscale reconstructed DWI maps to determine slice specific threshold.

FIG. 12D shows the automatic segmented DWI lesion segmented by the algorithm according to Example 3 superimposed on original DWI map.

Figure 13:
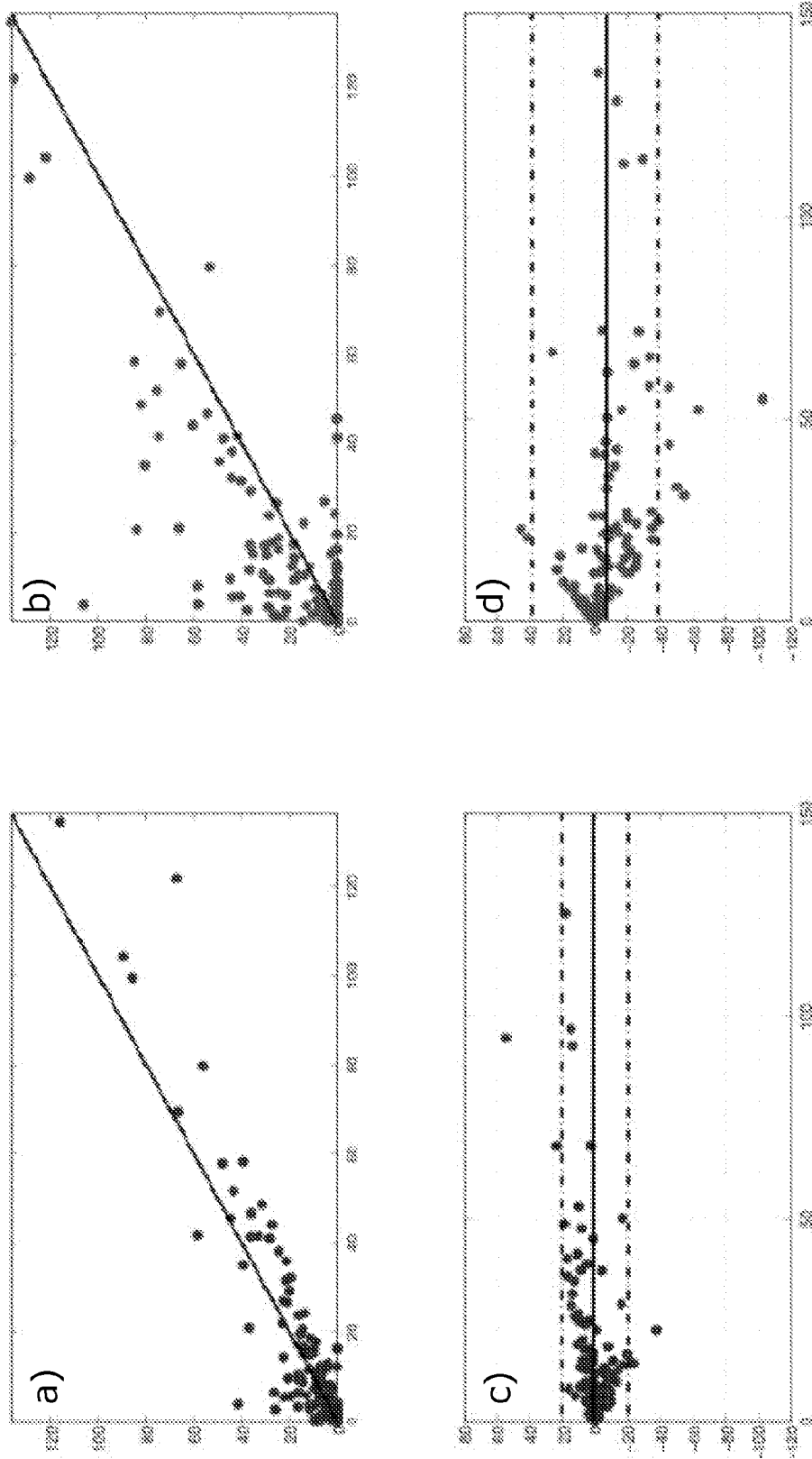
FIG. 13: Volumetric comparison of DWI lesions estimated by various methods.

FIG. 13: Volumetric comparison of DWI lesions estimated by the algorithm according to Example 3, STM and manual outlining within TTP lesion. Overall Spearman correlation for the algorithm according to Example 3 was $R^2$=0.79, and for STM $R^2$=0.62. Subfigures show: FIG. 13A: Volumetric comparison of DWI lesions, first axis show manually determined mask volume (the tick marks span 0-120 mL), second axis show volume determined according to the algorithm according to example 3 (the tick marks span 0-120 mL), FIG. 13B: Volumetric comparison of DWI lesions, first axis show manually determined mask volume (the tick marks span 0-120 mL), second axis show volume determined according to STM approach (the tick marks span 0-120 mL), FIG. 13C: Bland-Altman plot for manually determined volume compared with volume determined according to the algorithm according to example 3, the first axis shows mean lesion volume (the tick marks span 0-150 mL) and the second axis shows difference (the tick marks span −120-80 mL), FIG. 13D: Bland-Altman plot for manually determined volume compared with volume determined according to the STM approach, the first axis shows mean lesion volume (the tick marks span 0-150 mL) and the second axis shows difference (the tick marks span −120-80 mL). In FIG. 13C-D the solid line indicates the mean between the two compared methods and dashed lines indicate mean difference±2 SD.

Figure 14:
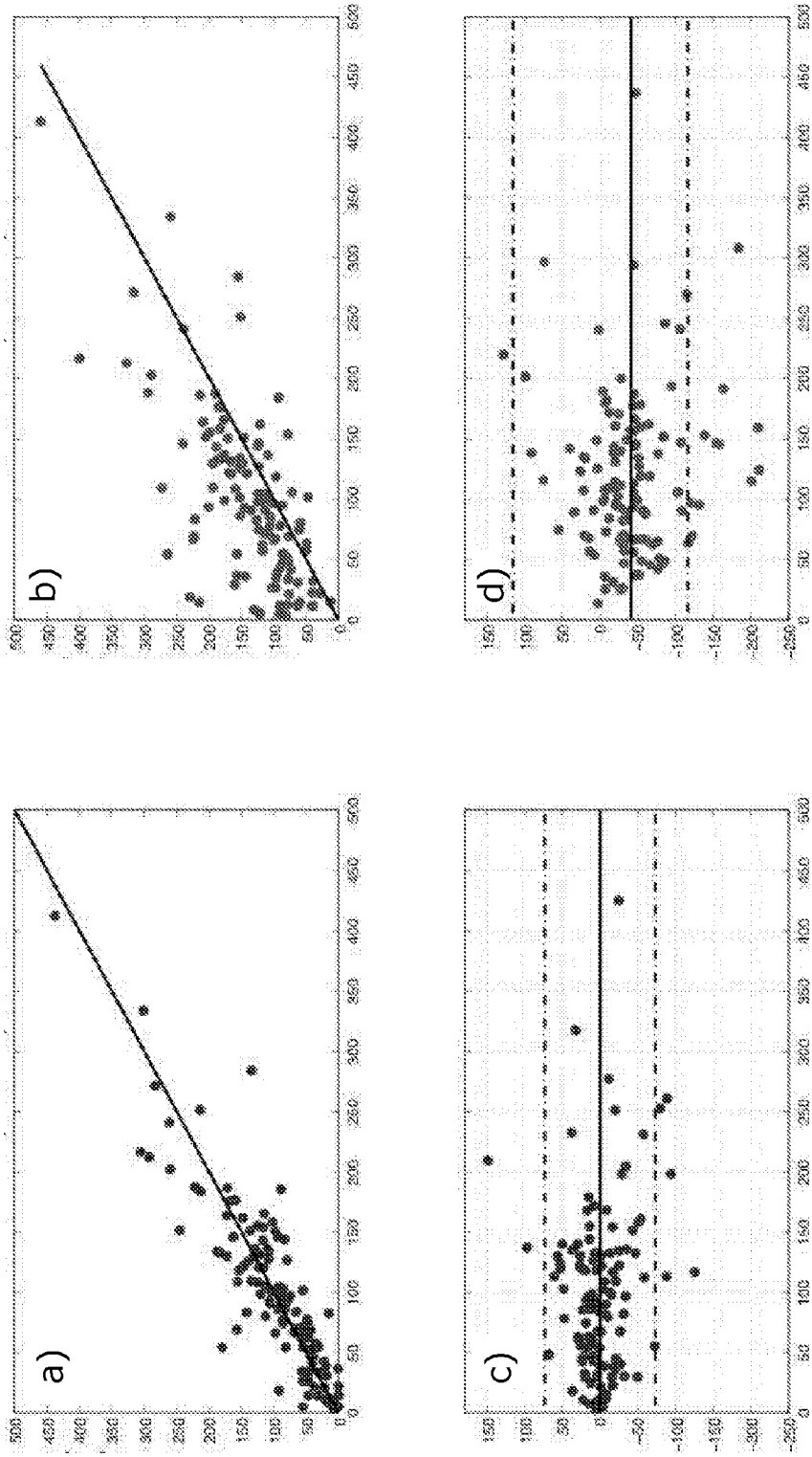
FIG. 14: Volumetric comparison of penumbras estimated by various methods.

FIG. 14: Volumetric comparison of penumbra estimated by the algorithms according to Example 1 and Example 3, STM and manual outlining at optimum threshold. FIG. 14A: The optimum threshold for the current neuroradiologist was estimated to >2.8 seconds ($R^2$=0.86). FIG. 14B: STM overestimates TTP lesion compared with manual outlining ($R^2$=0.62). FIG. 14C) Bland-Altman plot for manual compared with algorithm and FIG. 14D) Bland-Altman plot for manual compared with STM. Solid line indicates the mean between the two compared methods and dashed lines indicate mean difference±2 SD. FIG. 14A: Volumetric comparison of penumbras, first axis show manually determined mask volume (the tick marks span 0-500 mL), second axis show volume determined according to the algorithm according to example 1 (the tick marks span 0-500 mL), FIG. 14B: Volumetric comparison of penumbras, first axis show manually determined mask volume (the tick marks span 0-500 mL), second axis show volume determined according to STM approach (the tick marks span 0-500 mL), FIG. 14C: Bland-Altman plot for manually determined penumbra volume compared with volume determined according to the algorithm according to example 1, the first axis shows mean lesion volume (the tick marks span 0-500 mL) and the second axis shows difference (the tick marks span −250-150 mL), FIG. 14D: Bland-Altman plot for manually determined penumbra volume compared with volume determined according to the STM approach, the first axis shows mean lesion volume (the tick marks span 0-500 mL) and the second axis shows difference (the tick marks span −250-150 mL). In FIG. 14C-D the solid line indicates the mean between the two compared methods and dashed lines indicate mean difference±2 SD.

Figure 15A:
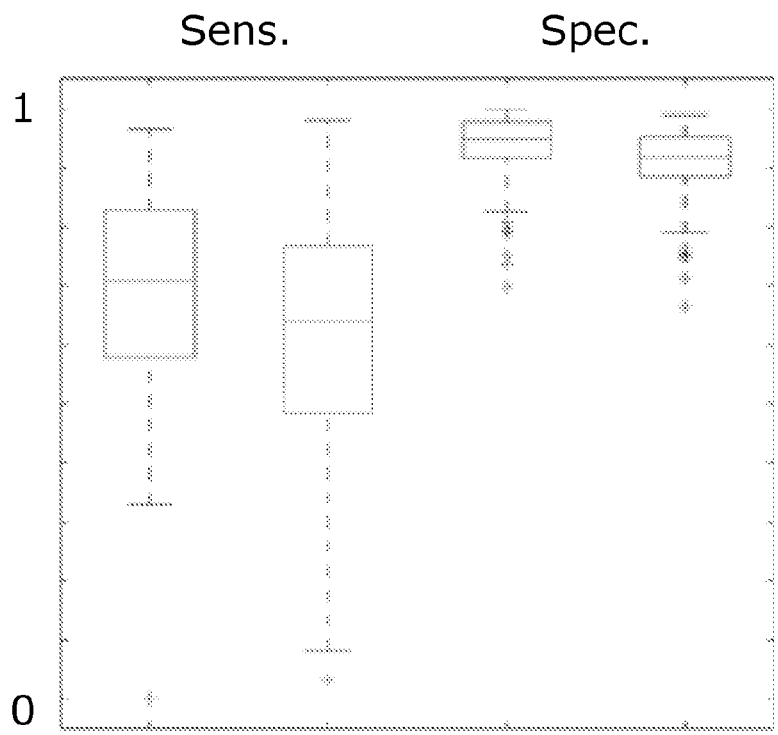
FIG. 15: Performance of classification.
Figure 15B:
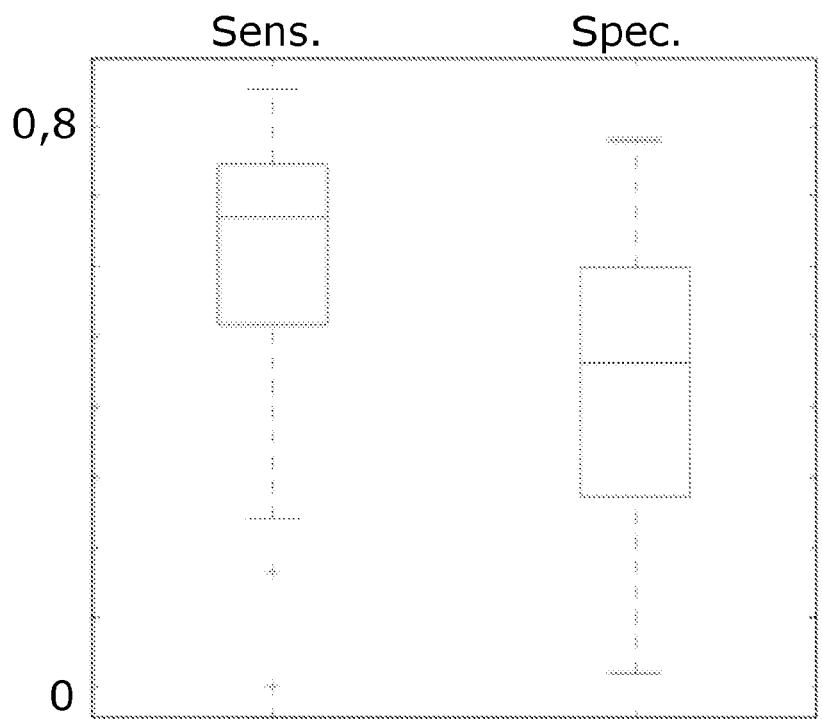

FIG. 15: Performance of classification. FIG. 15 A: Sensitivity and specificity plots for classification of penumbra by the algorithms according to Example 1 and Example 3 and STM. For the algorithms according to Example 1 and Example 3 the median sensitivity is 71% ($25^{th}$-$75^{th}$ quartile: 59-83%) and the median specificity is 95% ($25^{th}$-$75^{th}$ quartile: 92-98%). The median sensitivity for S™ is 64% ($25^{th}$-$75^{th}$ quartile: 49-77%) and the median specificity for S™ is 92% ($25^{th}$-$75^{th}$ quartile: 88-95%). FIG. 15 B: The Dice coefficients were significantly higher in penumbra estimated by the algorithms according to Example 1 and Example 3 (median=0.67) compared with penumbra estimated by STM (median=0.46) p<0.001

Figure 16:
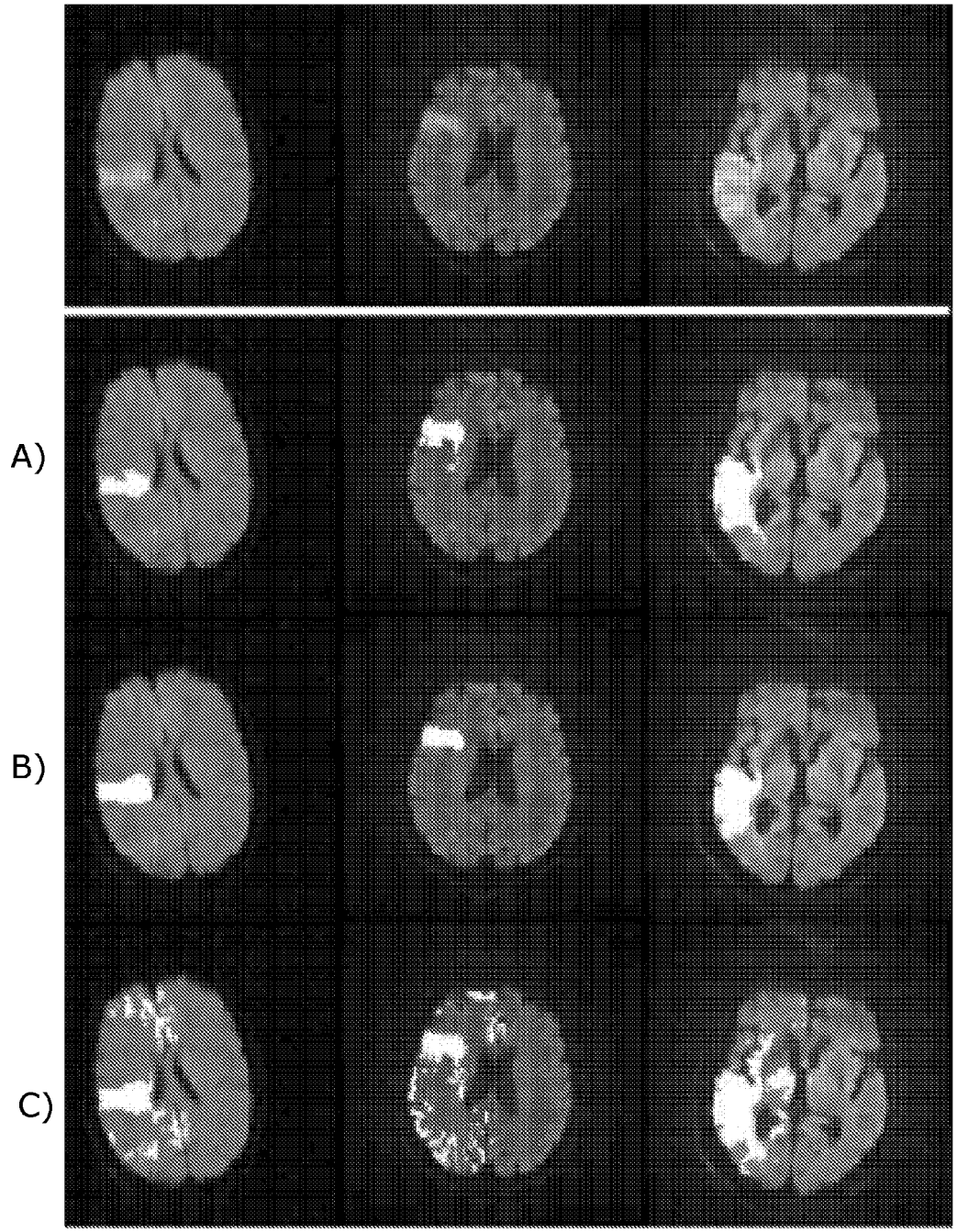
FIG. 16: Examples of DWI lesion outlined by various methods.

FIG. 16: Examples of DWI lesion outlined by a) expert, b) algorithm according to Example 3 and c) STM. We see that the DWI lesion outlined by the algorithm according to Example 3 is more consistent than the manually outlined DWI lesions. Whereas the DWI lesion estimated by STM are more scattered and contains false positive lesions.

Figure 17:
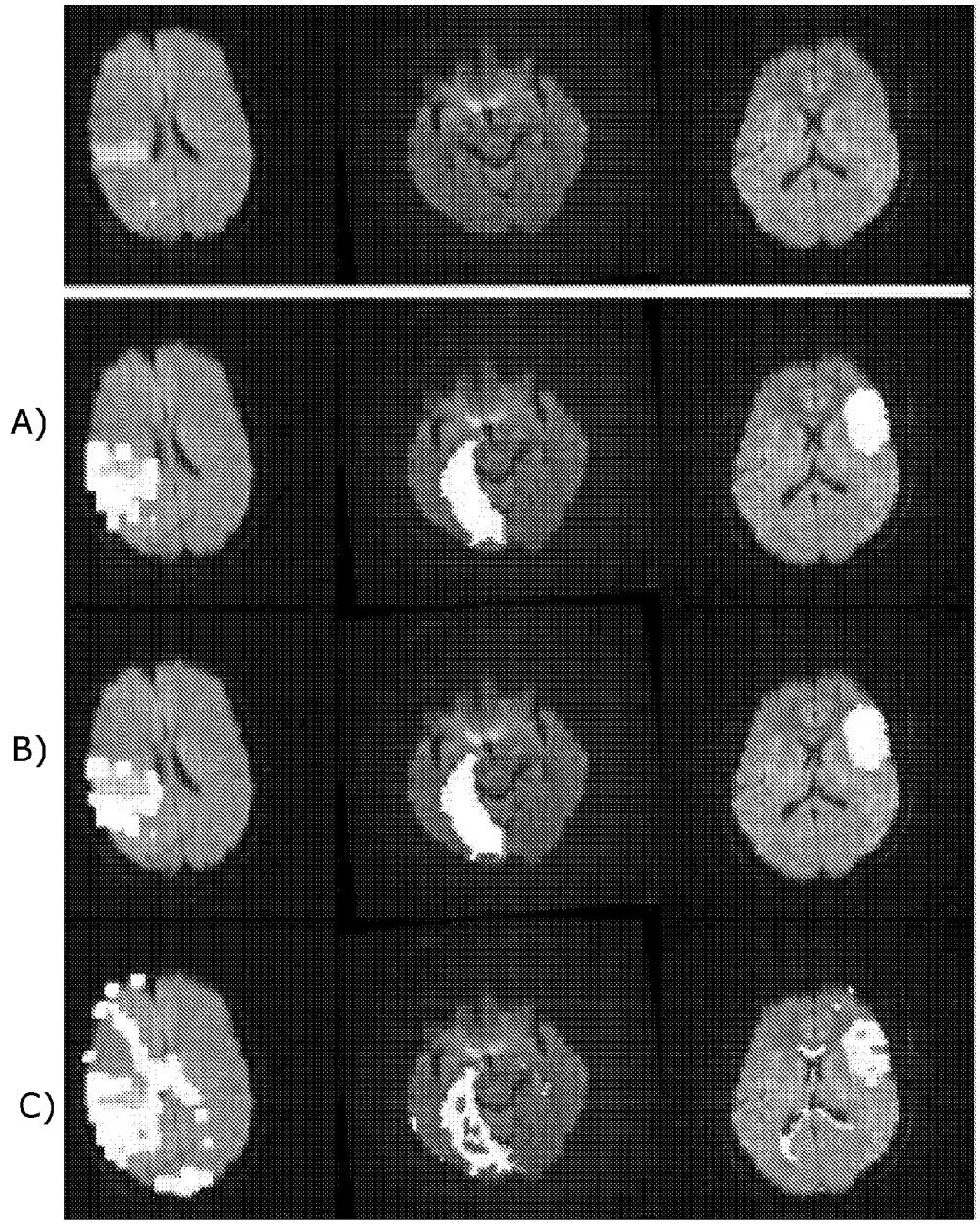
FIG. 17: Examples of penumbra outlined by various methods.

FIG. 17: Examples of penumbra outlined by a) expert, b) the algorithms according to Example 1 and Example 3 and c) STM. We see that the penumbra outlined by the algorithms according to Example 1 and Example 3 is more consistent to the manually outlined penumbra and shows coherent penumbras. Whereas the penumbra estimated by STM are more scattered and contains large areas of false positive penumbra.

Example 4

1$^{st}$ Alternative Segmentation of an Image Comprising TTP Data

Materials & Methods
Morphological Grayscale Reconstruction
  As in Example 1.
Connected Components Labeling
  As in Example 1.
Level Sets
  CCL generated lesion borders may be unsmooth compared to the manually outlined cognitive borders. We approximated the cognitive lesion borders indirectly by searching for a smooth curve C, which simultaneously minimizes TTP variation inside and outside the curve. We used the level-sets formulation of the Mumford-Shah energy minimization problem proposed by Chan-Vese. Details can also be found in the reference "Active contours without edges" by Chan T F, Vese L A, in IEEE Transactions on Image Processing, vol. 10, issue 2, p. 266-277, 2001, which is hereby incorporated by reference. The level set method of Example 4 is similar to the level set method of Example 2.

Algorithm According to Example 4

As in Example 1, except that the step of:
lesion boundaries are smoothened,
is replaced with
  applying a level-set algorithm, the level-set algorithm being initiated with the TTP lesion mask originated by CCL algorithm.

The mask resulting from this latter step may be considered as a TTP lesion mask which has been soft-thresholded at TTP>4 sec.

The TTP segmentation algorithm according to Example 4 is implemented in Matlab® R2010a by MathWorks®, but it is understood by the skilled person that the segmentation algorithm according to Example 4 may be implemented in other programming languages as well.

It is understood, that the algorithm according to Example 4 may be replaced with a corresponding method.
Patients and Image Acquisition We used a cohort of 168 acute ischemic stroke patients (♀=70) to evaluate the performance op APS. The patients were admitted in hospitals participating in the multicenter study I-KNOW. The median age of the patients was 70 years and the median time from onset of symptoms to initial MRI scan was 152 minutes (TABLE V).

TABLE V shows pooled patient characteristics. The range denotes first and third quartile.

The median acute TTP lesion was 58.2 mL and median NIHSS was 10. The I-KNOW protocol defines seven stroke-subtypes where cardiac source of emboli was the leading stroke sub-type followed by undetermined subtype and large vessel disease with significant carotid stenosis. Standard dynamic susceptibility contrast MRI was performed on different models of scanners (GE Signa Excite 1.5, GE Signa Excite 3, GE Signa HDx 1.5, Siemens TrioTim 3, Siemens Avanto 1.5, Siemens Sonata 1.5, Philips Gyroscan NT 1.5, and Philips Intera 1.5). The PWI sequence (TE 30-50 ms, TR 1500 ms, FOV 24 cm, matrix 128×128, slice thickness 5 mm) was obtained after a Gadolinium based contrast (0.1 mmol/kg) intravenous injection at rate of 5 ml/s followed by 30 ml of physiological saline at the same rate. The obtained signal-intensities were converted to time-concentration curves and a smoothing gamma-variate fitting procedure was applied to each time-concentration curve.

Comparison of the Algorithm According to Example 1 and Manual TTP Lesion Outlining Four raters (one neuroradiologist and three radiologists) with extensive clinical experience manually outlined the TTP lesions using in-house developed software. The raters were blinded to any intensity scale and other brain maps. No automatic pre-processing, such as thresholding, is applied. The automatic determined TTP lesion volumes were compared with manually outlined TTP lesion volumes with inter-rater agreement of one, two, three and four. Finally, TTP lesions at >4 seconds were also estimated using STM and compared with manually outlined TTP lesions. In this study we estimated the TTP lesion at TTP>4 seconds and this specific threshold has been evaluated in several studies to identify the tissue at risk of infarction, e.g., Sobesky, J., et al., "Which time-to-peak threshold best identifies penumbral flow? A comparison of perfusion-weighted magnetic resonance imaging and positron emission tomography in acute ischemic stroke". Stroke, 2004. 35(12): p. 2843-7, which is hereby incorporated by reference. To quantify the geometric and volumetric similarity between the algorithm/STM and manually outlined lesions we used Dice coefficient (definition: two times the intersection of two masks over the combined set of masks), which is a number between 0 and 1. One indicates complete overlap and 0 (zero) indicates no overlap. The sensitivity and specificity were determined on the ipsi-lateral hemisphere.

Results

Volumetric Comparison

The best volumetric correlation between manually and automatically outlined TTP lesions according to the algorithm of Example 4 were at an inter-rater agreement of three and the Spearman correlation was $R^2=0.89$, see FIG. 18A. At an inter-rater agreement of one and two the automatic approach according to the algorithm of Example 4 underestimated the TTP lesion volumes while at an inter-rater agreement of four the algorithm overestimated the TTP lesion volume compared to manual outlining (data not shown). At optimum volumetric correlation, the mean difference between manual outlining and the algorithm was −0.26 mL (±2 SD: 33 mL) see FIG. 18C.

TTP maps thresholded at TTP>4 seconds demonstrated the best correlation at an inter-rater agreement of three. The Spearman correlation was $R^2=0.73$, see FIG. 18B. The mean difference between manual outlining and STM was −281 mL (±2 SD: 46.64 mL) see FIG. 18D.

Figure 18:
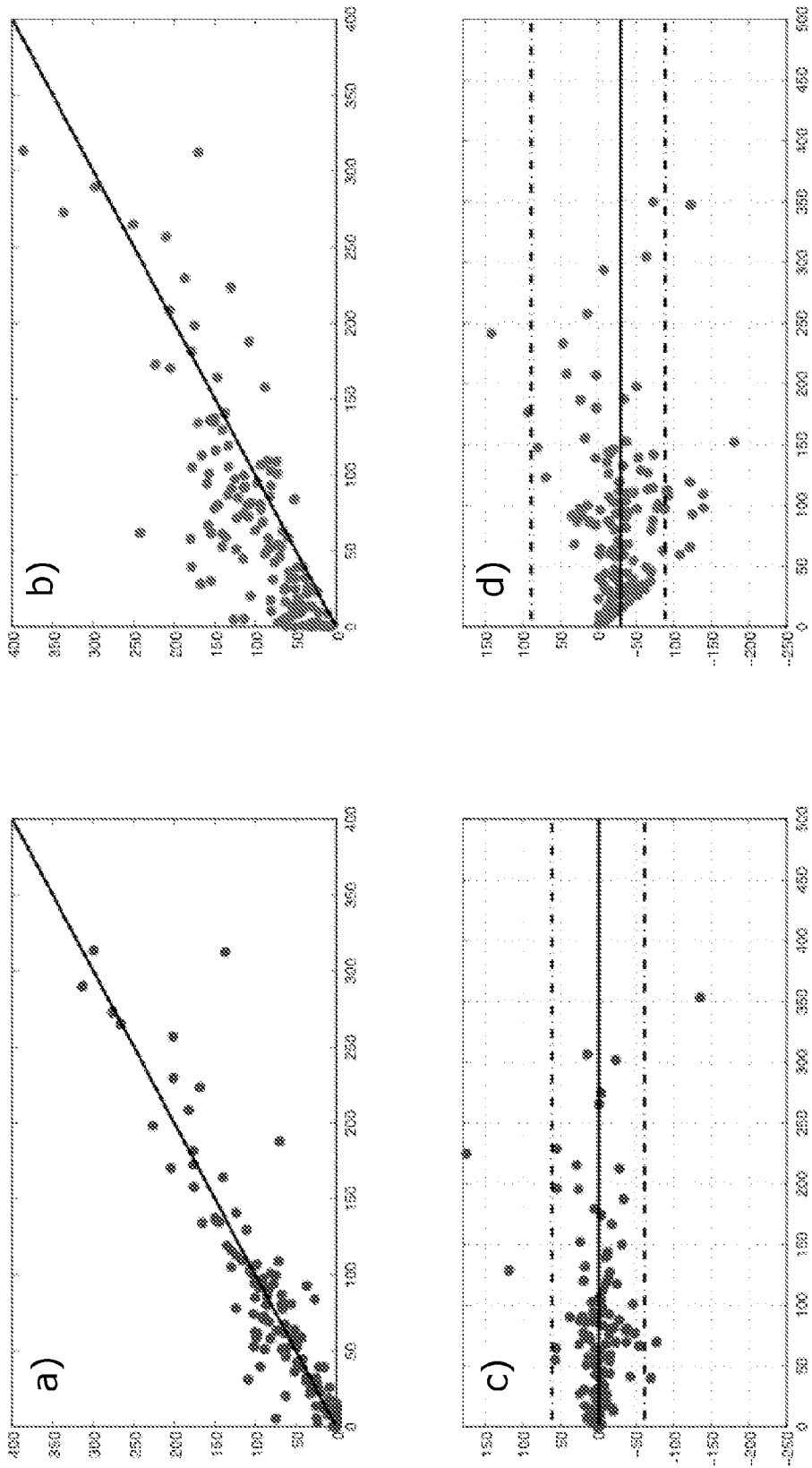
FIG. 18: Volumetric comparison of TTP lesions.

FIG. 18 shows volumetric comparison of TTP lesions estimated by the algorithm according to Example 4, STM at TTP>4 seconds and manual outlining. FIG. 18A shows volumetric correlation between the algorithm according to Example 4 and manual outlining ($R^2=0.89$). The first axis (tick marks span 0-400) shows manually determined mask volume [mL] while the second axis (tick marks span 0-400) shows lesion volume [mL] determined by the algorithm according to Example 4. FIG. 18B shows volumetric correlation between STM and manual outlining ($R^2=0.73$). The first axis (tick marks span 0-400) shows manually determined mask volume [mL] while the second axis (tick marks span 0-400) shows lesion volume [mL] determined by the STM approach.

Figure 20:
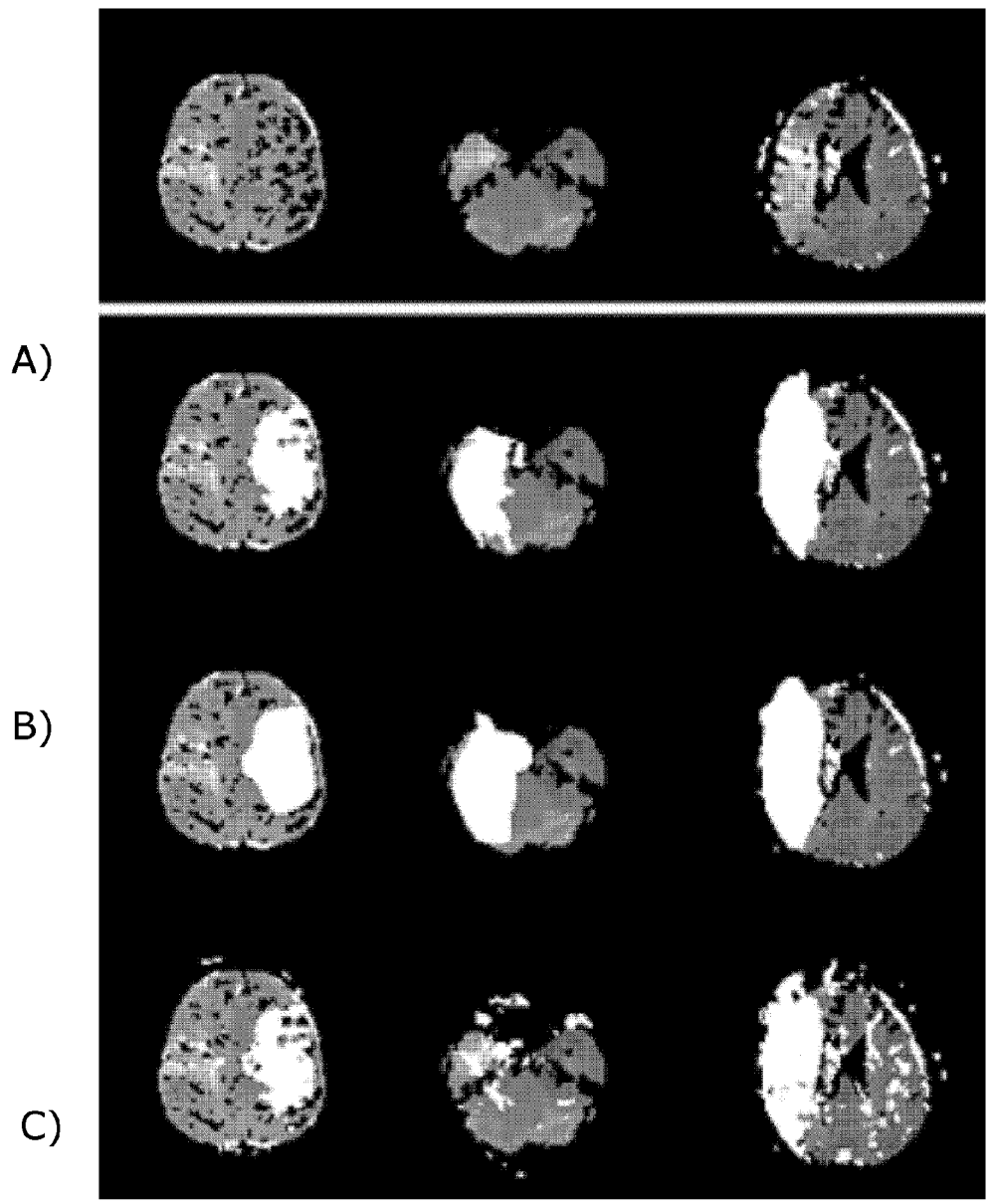
FIG. 20: Examples of segmentations.

FIG. 18C shows a Bland-Altman plot for manual outlining compared with the algorithm according to Example 4 and FIG. 18D shows a Bland-Altman plot for manual outlining compared with STM. The solid line indicates the mean between the two compared methods and dashed lines indicate mean difference±2 SD. The first axis (tick marks span 0-500) shows mean lesion volume [mL] and the second axis (tick marks span −250 to 400) shows the difference [mL] between manually determined volume and volume determined according to the algorithm according to Example 4 and the STM approach, respectively, in FIG. 18C and FIG. 18D FIG. 20 shows examples of segmentations yielded by the algorithm according to Example 4 and STM. In the upper row the TTP maps and the following rows show a) manual mask, b) mask obtained from the algorithm according to Example 4 and c) mask obtained from STM overlaid (white) on TTP map. Both non-manual maps are obtained at TTP>4 seconds. In general, the algorithm according to Example 4 estimates the boundaries as smooth curves compared with the threshold method. Furthermore the algorithm according to Example 4 is highly able to avoid false positive lesions (FIG. 20).

Performance of Classification

At an inter-rater agreement of three, the median sensitivity for the algorithm according to Example 4 (median: 79% and $25^{th}$-$75^{th}$ quartile: 40-85%) was not significantly (p=0.22) higher than sensitivity for S™ (median: 72% and $25^{th}$-$75^{th}$ quartile: 40-85). In contrast, the median specificity for the algorithm (95% $25^{th}$-$75^{th}$ quartile: 90-98%) was significantly higher (p<0.001) compared with STM 95% ($25^{th}$-$75^{th}$ quartile: 87-96%), see table IV in Annex 2. Furthermore the Dice coefficient analysis indicated that the TTP lesion mask (median Dice coefficient: 0.74, $25^{th}$-$75^{th}$ quartile: 0.52-0.82) estimated by the algorithm had significantly (p<0.001) higher similarity with the manually outlined TTP lesion mask compared to the mask generated by STM (median Dice coefficient: 0.54, $25^{th}$-$75^{th}$ quartile: 0.24-0.70), see FIG. 19.

Table IV describes sensitivity and specificity in percent for the algorithm according to Example 4 and STM at TTP>4 seconds. In parentheses the first and third quartile is given and furthermore the statistics from a rank sum test are also given.

Figure 19:
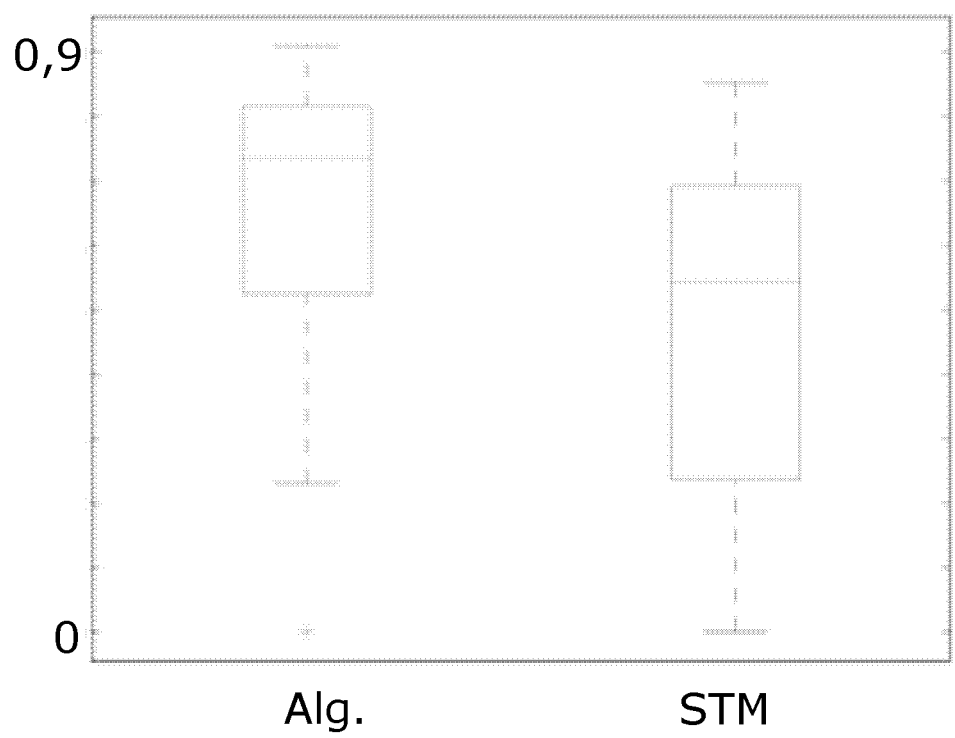
FIG. 19: Box plot of Dice coefficients.

FIG. 19 shows a box plot of Dice coefficients for the algorithm according to Example 4 and STM. The median Dice coefficient for the algorithm was 0.74 (0.52-0.82) and for S™ the median Dice coefficient was 0.54 (0.24-0.70).

Example 5

1st Alternative Segmentation of an Image Obtained by DWI

Materials & Methods

Morphological Grayscale Reconstruction

As in Example 3.

Level Sets

The image contrast between lesion and normal tissue is distinct in DWI images and is further enhanced by morphological grayscale reconstruction. However, simple thresholding suffers from the lack of established DWI thresholds applicable across individuals, and 'false' lesions due to the inherent noise in DWI images. Level-set algorithm estimates the DWI lesion borders indirectly by searching for a smooth curve C, which simultaneously minimizes DWI intensity variation inside and outside the curve. We used the level-sets formulation of the Mumford-Shah energy minimization problem proposed by Chan-Vese. Details can also be found in the reference "Active contours without edges" by Chan T F, Vese L A, in IEEE Transactions on Image Processing, vol. 10, issue 2, p. 266-277, 2001, which is hereby incorporated by reference. The level set method of Example 5 is similar to the level set method of Example 2.

The Algorithm According to Example 5

An automatically generated CSF mask removes the ventricles in DWI maps. The CSF mask is obtained by using clustering analysis. The input image to k-means clustering is an image combined by a structural (BZERO) and diffusion-weighted image (apparent diffusion coefficient, ADC). Co-registering a MNI (Montreal Neurological Institute) template to PWI maps automatically generated left and right hemisphere masks. A whole brain mask is generated by thresholding CBV>0 and sparsely connected isles in the whole brain mask are removed by morphological thinning. Non-brain tissue in the inferior slices in DWI volume (e.g. eyes, bone, air, etc.) contributes with noise components and increases the false-positive rate. We therefore, remove the inferior slices by analyzing the variance of the intensities in each slice. TTP lesion mask was generated automatically using the algorithm described in Example 4.

Level-sets algorithm has to be initiated with an initial mask, which were derived by thresholding ADC maps at 550 $mm^2/sec$. Small isles in ADC mask less than 0.25 mL on each slice was removed using morphological binary reconstruction with kernel size corresponding to 25 mL, which is analogue to morphological grayscale reconstruction.

DWI images were filtered using morphological grayscale reconstruction. The level-sets algorithm was initiated with morphological grayscale reconstruction processed DWI images and ADC mask.

Mismatch is defined as the TTP lesion minus the intersection of DWI and TTP lesion: mismatch=$TTP_{area}-(DWI_{area} \cap TTP_{area})$. The automatic penumbra segmentation algorithm was implemented in Matlab R2010a (MathWork, Natick, Mass.).

It is understood, that the algorithm according to Example 5 may be replaced with a corresponding method.

Patients and Image Acquisition

We used a cohort of 168 acute ischemic stroke patients (♀=70) to evaluate the performance of APS (automatic penumbra segmentation). The patients were admitted in hospitals participating in the multicenter study I-KNOW. The median age of the patients was 70 years and the median time from onset of symptoms to initial MRI scan was 152 minutes (Table V). The median acute DWI lesion was 2.4 mL and median NIHSS was 10. The I-KNOW protocol defines seven stroke-subtypes where cardiac source of emboli was the leading stroke sub-type followed by undetermined subtype and large vessel disease with significant carotid stenosis (Table V). MRI was performed on different models of scanners (GE Signa Excite 1.5, GE Signa Excite 3, GE Signa HDx 1.5, Siemens TrioTim 3, Siemens Avanto 1.5, Siemens Sonata 1.5, Philips Gyroscan NT 1.5, and Philips Intera 1.5). Echoplanar DWI was obtained at b-value=0 and b-value=1.000 $sec/mm^2$.

Comparison of Lesion Outlining with the Algorithm According to Example 5 and Manual DWI Lesion Outlining Four raters (one neuroradiologist and three radiologists) with extensive clinical experience manually outlined the DWI lesions using in-house developed software and the raters were blinded to any intensity scale and other brain maps. No automatic pre-processing, such as thresholding, is applied. The automatic determined DWI lesion volumes were compared with manually outlined DWI lesion volumes with inter-rater agreement of one, two, three and four. Manual penumbra masks are determined based on the manually outlined DWI and TTP lesion masks and likewise automatic penumbra masks are based on the automatically generated DWI and TTP lesion masks. For penumbra the sensitivity and specificity are determined in the ipsi-lateral hemisphere and Dice coefficient.

Results

Volumetric Comparison

The best volumetric correlation between the algorithm according to Example 5 and the manually outlined DWI lesions were demonstrated at an inter-rater agreement of three. The Spearman correlation was $R^2=0.61$ and the mean difference between manual and algorithm was 0.23 mL ((±2 SD: 25.6 mL), see FIGS. 22A and 22C. In contrast the volumetric correlation was poor between STM lesion volumes and manually outlined mask volumes. The Spearman correlation was $R^2=0.33$ and the mean difference between manual and automatic approach was −124.4 mL (±2 SD: 84.5 mL), see FIGS. 22B and 22D.

Figure 23:
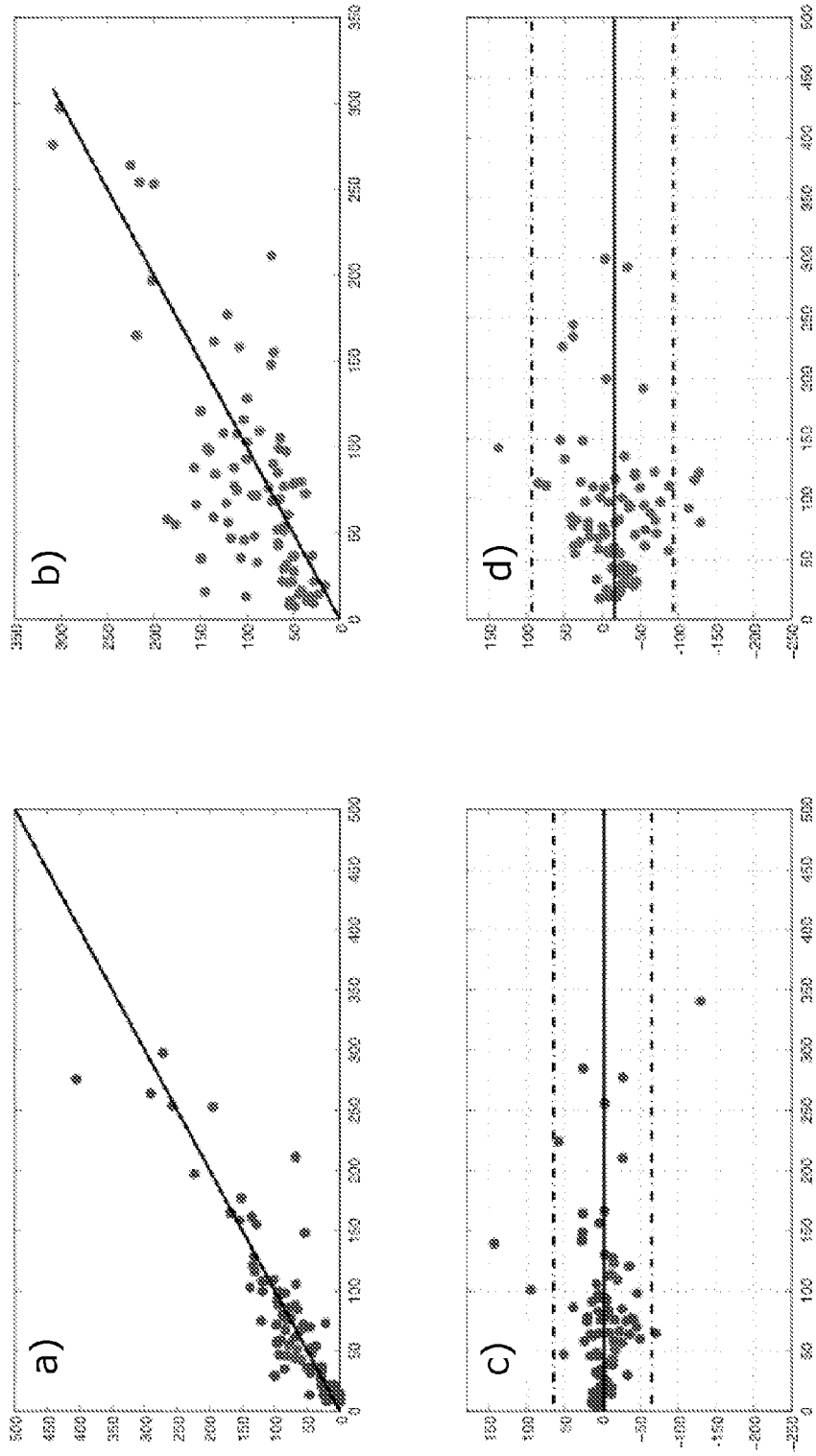
FIG. 23: Volumetric comparison of penumbra.

The penumbra volumes determined with the algorithm according to Example 5 demonstrated good correlation with the manually outlined penumbra volumes $R^2=0.84$, see FIG. 23. The median difference in penumbra volume between manual outlining and the algorithm was −2.1 mL (±2 SD: 64.7 mL).

The STM penumbra masks compared with manually outlined penumbra mask demonstrated a correlation of $R^2=0.62$ with mean difference of −15.6 mL (±2 SD: 93.6 mL).

Performance of Classification

The algorithm according to Example 5 (sensitivity: median=75%, $25^{th}$-$75^{th}$ quartile: 63-85%; DC: median=0.70, $25^{th}$-$75^{th}$ quartile: 0.57-0.78) outperformed STM (sensitivity: median=52%, $25^{th}$-$75^{th}$ quartile: 31-70%; DC: median=0.44, $25^{th}$-$75^{th}$ quartile: 0.26-0.60) in terms of sensitivity (p<0.001) and Dice coefficient (p<0.001). However, no significant difference in order to specificity (p=0.22) was observed between the two methods.

Figure 21:
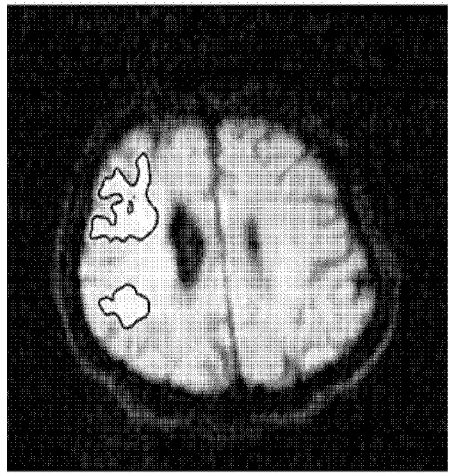
FIG. 21: The evolution of the initial mask to the final mask encircling the DWI lesion.
Figure 21:
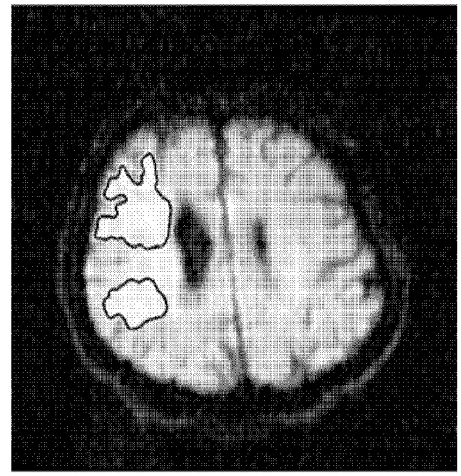
Figure 21:
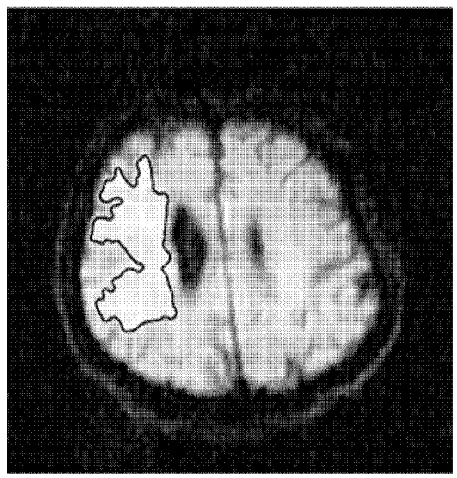
Figure 21:
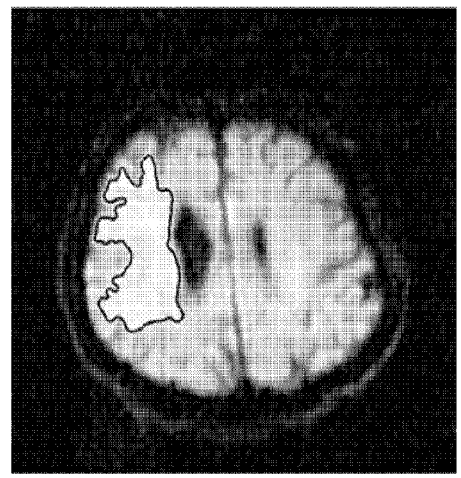

FIG. 21 shows the evolution of the initial mask (subfigure A) to the final mask encircling the DWI lesion (subfigure D). The subfigures A, B, C and D corresponds to respectively 0, 80, 160, and 200 iterations.

Figure 22:
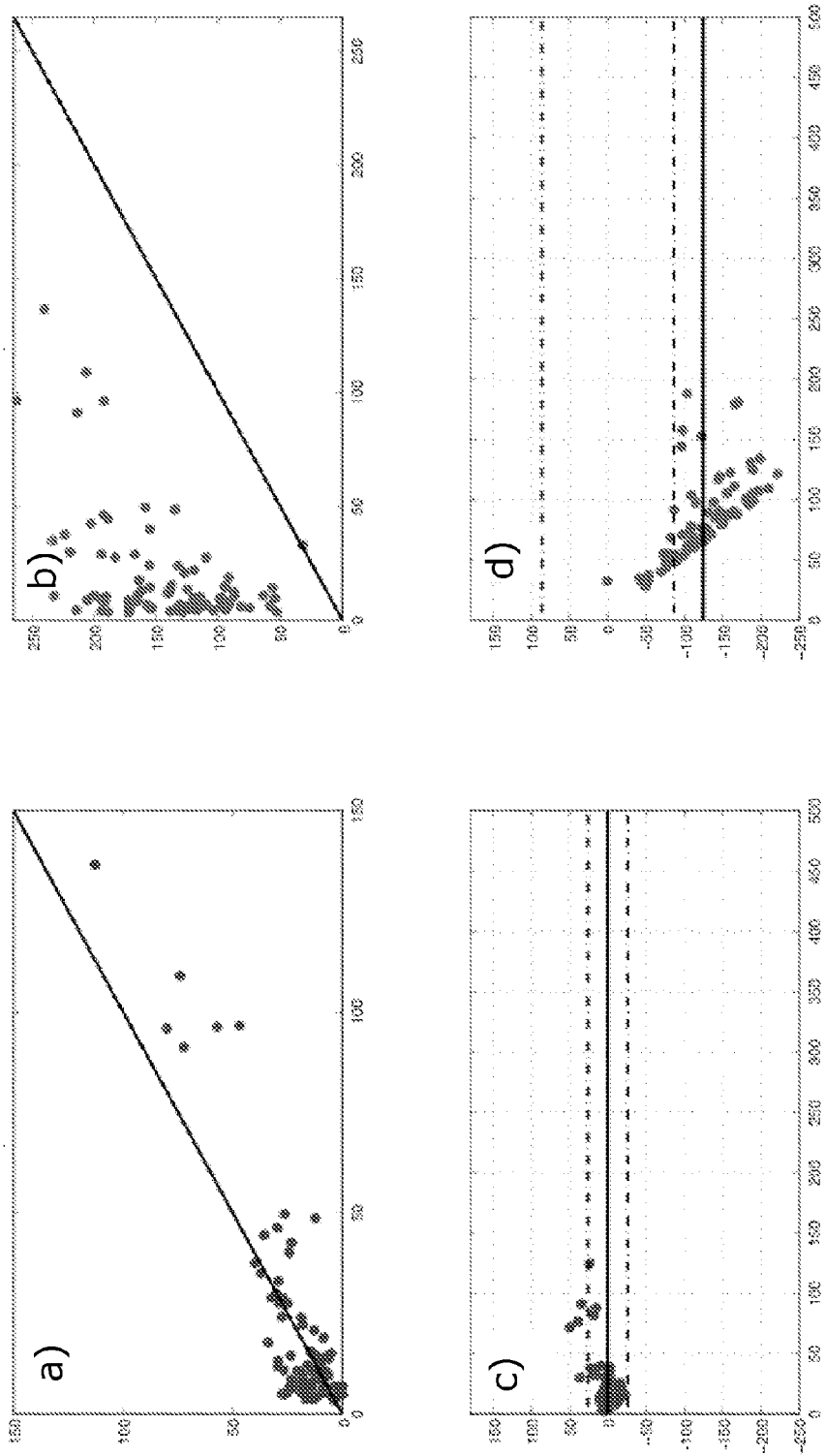
FIG. 22: Volumetric comparison of DWI lesions

FIG. 22: Volumetric comparison of DWI lesions estimated by the algorithm according to Example 5, STM and manual outlining within TTP lesion. The Spearman correlation for the algorithm according to Example 5 compared with manual outlining was $R^2=0.61$. Subfigures show: FIG. 23A: Volumetric comparison of DWI lesions, first axis show manually determined mask volume (the tick marks span 0-150 mL), second axis show volume determined according to the algorithm according to Example 5 (the tick marks span 0-150 mL), FIG. 22B: Volumetric comparison of DWI lesions, first axis show manually determined mask volume (the tick marks span 0-250 mL), second axis show volume determined according to STM approach (the tick marks span 0-250 mL), FIG. 22C: Bland-Altman plot for manually determined volume compared with volume determined according to the algorithm according to Example 5, the first axis shows mean lesion volume (the tick marks span 0-500 mL) and the second axis shows difference (the tick marks span −250 to 150 mL), FIG. 22D: Bland-Altman plot for manually determined volume compared with volume determined according to the STM approach, the first axis shows mean lesion volume (the tick marks span 0 to 500 mL) and the second axis shows difference (the tick marks span −250 to 150 mL). In FIG. 22C-D the solid line indicates the mean between the two compared methods and dashed lines indicate mean difference±2 SD. The mean difference was 0.23 mL (±2 SD: 25.6 mL). Outlining by STM yield a less favorable result. The Spearman correlation was $R^2=0.33$ and the mean difference was −124.4 mL (±2 SD: 84.5 mL).

FIG. 23: Volumetric comparison of penumbra estimated by the algorithms according to Example 4 and Example 5, STM and manual outlining. FIG. 23C) Bland-Altman plot for manual compared with algorithm and FIG. 23D) Bland-Altman plot for manual compared with STM. Solid line indicates the mean between the two compared methods and dashed lines indicate mean difference±2 SD. FIG. 23A: Volumetric comparison of penumbras, first axis show manually determined mask volume (the tick marks span 0-500 mL), second axis show volume determined according to the algorithm according to example 4 (the tick marks span 0-500 mL), FIG. 23B: Volumetric comparison of penumbras, first axis show manually determined mask volume (the tick marks span 0-500 mL), second axis show penumbra volume determined according to STM approach (the tick marks span 0-500 mL), FIG. 23C: Bland-Altman plot for manually determined volume compared with volume determined according to the algorithm according to example 4, the first axis shows mean lesion volume (the tick marks span 0-500 mL) and the second axis shows difference (the tick marks span −250-150 mL), FIG. 23D: Bland-Altman plot for manually determined volume compared with volume determined according to the STM approach, the first axis shows mean lesion volume (the tick marks span 0-500 mL) and the second axis shows difference (the tick marks span −250-150 mL). In FIG. 23C-D the solid line indicates the mean between the two compared methods and dashed lines indicate mean difference±2 SD. The Spearman correlation was $R^2=0.84$ for the algorithm compared with the manual outlining. The mean difference was −2.1 mL (±2 SD: 64.7 mL). Outlining penumbra by STM yield a less favorable result.

Figures 24A, 24B:
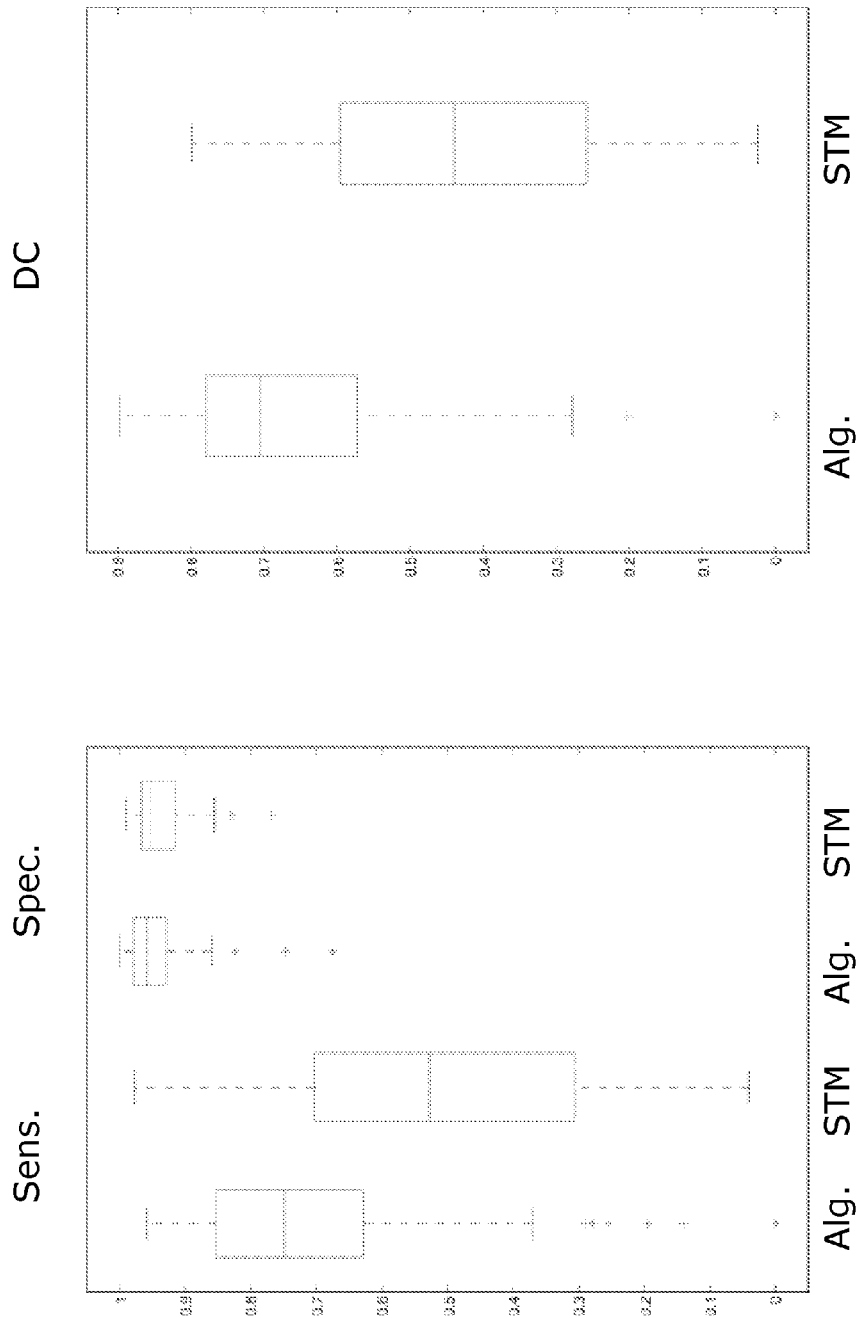
FIG. 24: Performance of classification.

FIG. 24A-B: Performance of classification. There was a significant difference between the algorithm and STM measured in terms of sensitivity (p<0.05) and Dice Coefficient (DC) (p<0.001); however, no significant difference was observed in order to specificity (p=0.26). FIG. 24A: Sensitivity and specificity plots for classification of penumbra by the algorithms according to Example 4 and Example and STM. FIG. 24B: The Dice coefficient (DC).

Figure 25:
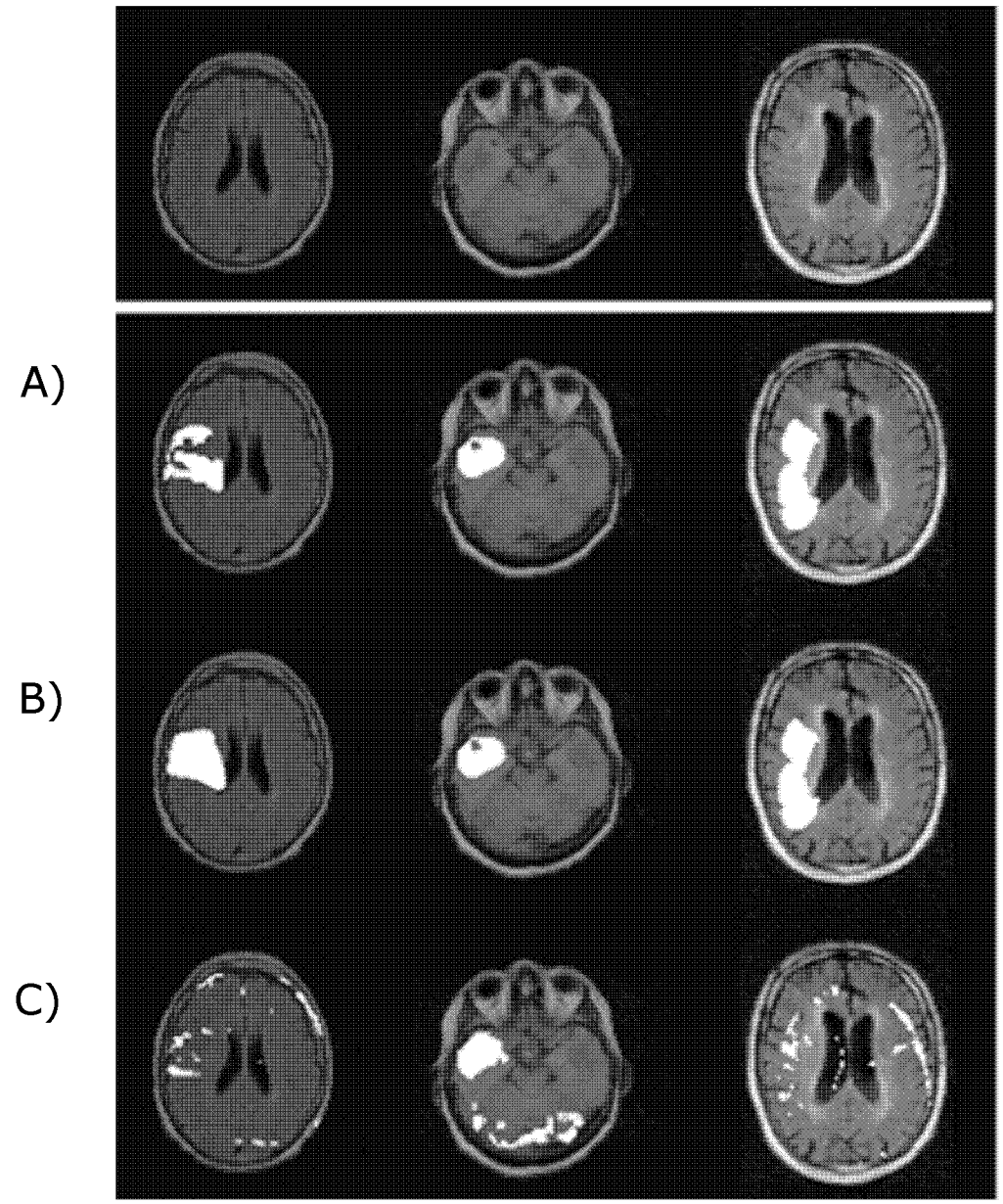
FIG. 25: Examples of penumbra.

FIG. 25: Examples of penumbra outlined by a) experts (inter-rater agreement of 3), b) the algorithms according to Example 4 and Example 5 and c) STM.

Example 6

$2^{nd}$ Alternative Segmentation of an Image Comprising TTP Data

PWI Segmentation

Various PWI metrics (e.g. time-to-peak of the deconvolved curve ($T_{max}$), mean transit time (MTT) and time-to-peak (TTP)) have been proposed to identify the ischemic penumbra and they are falling into two categories; summary maps obtained from the tissue concentration curve (e.g. TTP) and maps generated by deconvolution using arterial input function (e.g. $T_{max}$ and MTT). The deconvolved maps are hypothesized to be physiologically interpretable while the summary maps do not necessarily reflect physiological events. In contrast, the summary maps are less noisy compared with the deconvolved maps due to their more straightforward nature and consequently better for segmentation purpose. In this example we used a normalized version of TTP as the PWI metric. TTP>4 seconds has been evaluated in several studies to identify hypo-perfused tissue, however thresholding TTP maps at 4 seconds will yield numerous scattered false positive lesions e.g. ventricles, eyes and susceptibility artifacts. In this example we present an algorithm for identifying coherent hypo-perfused lesions with cognitive boundaries on TTP maps.

Methods

Morphological Grayscale Reconstruction

As in Example 1.

Morphological Reconstruction

Morphological reconstruction is a binary image transformation technique cf. the reference "Morphological Grayscale Reconstruction in Image Analysis: Applications and Efficient Algorithms", Vincent, L., IEEE Transactions on Image Processing, 1993. 2(2): p. 176-201 which is hereby incorporated by reference in its entirety, and in particular reference is made to section. In this context morphological reconstruction is used to remove false positive TTP lesion. The technique can be thought of conceptually as iterative dilation of the seed point (see FIG. 26, row 4 comprising images labelled J, K, L) constrained by the initial mask obtained by thresholding of TTP map. Clusters of voxels that hadn't contained the seed point are not retained in the reconstructed mask.

Figure 26:
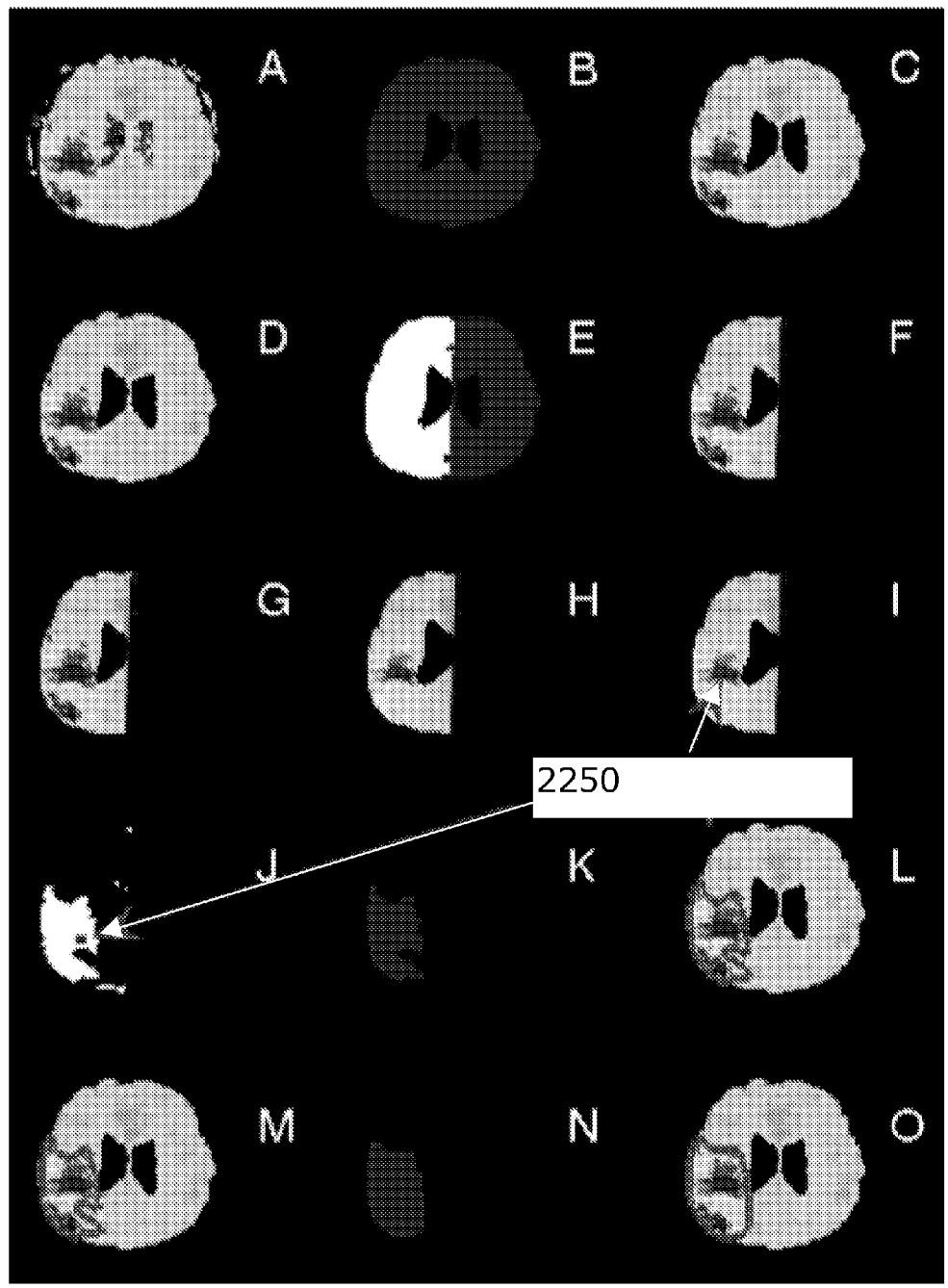
FIG. 26: Schematic illustration of steps in the TTP lesion segmentation.

FIG. 26 gives a schematic illustration of steps in the TTP lesion segmentation algorithm. The rows correspond to removal of non-brain tissue (row 1, with images A, B, C), generating laterality mask (row 2, with images D, E, F), seed point detection (row 3, with images G, H, I), morphological reconstruction (row 4, with images J, K, L) and level-sets (row 5, with images M, N, O). Initially non-brain tissue is removed by applying a whole brain mask (B) on the original TTP map (A) so as to obtain images with non-brain tissue removed (C, D). Subsequently laterality of the lesion (E) is determined by analyzing image intensity values so as to obtain images with only the relevant laterality remaining (F, G). To detect the seed point on the ipsi-lateral hemisphere, the TTP map (G) is filtered by morphological grayscale reconstruction (H) and the seed point is defined as the voxel or the voxels with maximum intensity (I). The initial TTP lesion mask is created by the theshold the original TTP map (J). Reconstructing the seed point constrained by the initial TTP lesion mask retains the TTP lesion mask and excludes the false positive lesions (K). Finally, TTP lesion mask boundary (L, M) is adjusted by applying level-sets algorithm (N) so as to obtain the lesion (O).

Level-Set

Automatically generated TTP lesion may not necessarily have same extent, as the manually outlined lesion and additionally, the borders may be unsmooth compared with the manually outlined cognitive borders. We approximated the cognitive lesion borders indirectly by searching for a smooth curve C, which simultaneously minimizes TTP variation inside and outside the curve. We used the level-set formulation of the Mumford-Shah energy minimization problem proposed by Chan-Vese cf. the reference "An active contour model without edges", Chan, T. and L. Vese, Scale-Space Theories in Computer Vision, 1999. 1682: p. 141-151 which is hereby incorporated by reference in its entirety.

Algorithm

An automatic generated brain mask, composed by whole brain mask and CSF mask, removed non-brain tissue e.g. ventricles, eyes etc. The whole brain mask was obtained by threshold CBV map (CBV>0) and unconnected or sparsely connected components such as eyes and susceptibility artifacts were eradicated by applying morphological operations as thinning and H-break cf. the reference "Digital image processing using Matlab", Gonzalez, R. C., R. E. Woods, and S. L. Eddins, 2004, which is hereby incorporated by reference in entirety, and in particular reference is made to chapter 9. The CSF mask was obtained by histogram separation of voxel intensities on a high contrast CSF-tissue map. The CSF-tissue map was attained by combining a structural image (T2) and diffusion-weighted image (apparent diffusion coefficient, ADC), (see FIG. 26, row 1 comprising images labelled A, B, C). Co-registering a MNI (Montreal Neurological Institute) template to PWI maps automatically generated left and right hemisphere masks (see FIG. 26, row 2 comprising images labelled D, E, F). Non-brain tissue (e.g. eyes, bone, air, etc.) and veins (transverse sinuses and sigmoid sinus) contributes with noise components in the inferior slices in PWI volume and increases the false-positive rate. We therefore, removed the inferior slices by analyzing the variance of the intensities in each slice.

TTP maps were filtered by morphological grayscale reconstruction prior to automatic detection of lesion laterality and seed point. Detection of lesion laterality was based on three features extracted on either hemisphere on the filtered TTP map. For each feature the "winning" hemisphere was assigned 1 and ultimately the hemisphere with at least two positive outcomes was considered as the ipsi-laterale hemisphere (see FIG. 26, row 2 comprising images labelled D, E, F). The features were: 1) mean intensity value of left and right hemisphere, 2) laterality of maximum intensity voxel on TTP map and 3) the amount of ADC voxels with intensity $<600*10^{-6}$ mm$^2$/sec. The seed point was defined as the voxel (or voxels) with the maximum intensity on the ipsi-lateral hemisphere; see FIG. 26, row 3 comprising images labelled G, H, I.

The TTP maps were normalized in order to mean TTP delay in contra-lateral hemisphere. The initial TTP lesion mask was found by thresholding ipsi-lateral TTP map at 4 seconds and the seed point was reconstructed in three-dimensions using the initial TTP lesion as the constrain (see FIG. 26, row 4 comprising images labelled J, K, L). Finally, level-set algorithm was initiated with the reconstructed TTP lesion mask (see FIG. 26, row 5 comprising images labelled M, N, O). The ultimate mask can be considered as a TTP lesion mask soft thresholded at TTP>4 sec.

The automatic TTP lesion segmentation algorithm was implemented in Matlab R2010a (MathWork, Natick, Mass.).

Patients and Image Acquisition

As in example 4.

Comparison of Automatic and Manual TTP Lesion Outlining

Four raters (one neuroradiologist and three radiologists) with extensive clinical experience in neuroradiology manually outlined the TTP lesions using in-house developed software. The raters were blinded to any intensity scale and other brain maps. The automatic determined TTP lesion volumes were compared with manually outlined TTP lesion consensus map at an inter-rater agreement of one, two, three and four. Finally, TTP lesions at >4 seconds were also estimated using STM and compared with manually outlined TTP lesions. In this example we estimated the TTP lesion at TTP>4 seconds and this specific threshold has been evaluated in several studies to be the optimum threshold to identify the tissue at risk of infarction. To quantify the geometric and volumetric similarity between the APS/STM and manually outlined lesions we used volumetric correlation and Dice coefficient (DC). DC (definition: two times the intersection of the two masks over the combined set of masks), which is a number between 0-1, where 1, indicates completely overlap and 0 indicates no overlap. The performance of classification was evaluated en terms of sensitivity and specificity and was determined on the ipsi-lateral hemisphere.

Results

Volumetric Comparison

Figure 27:
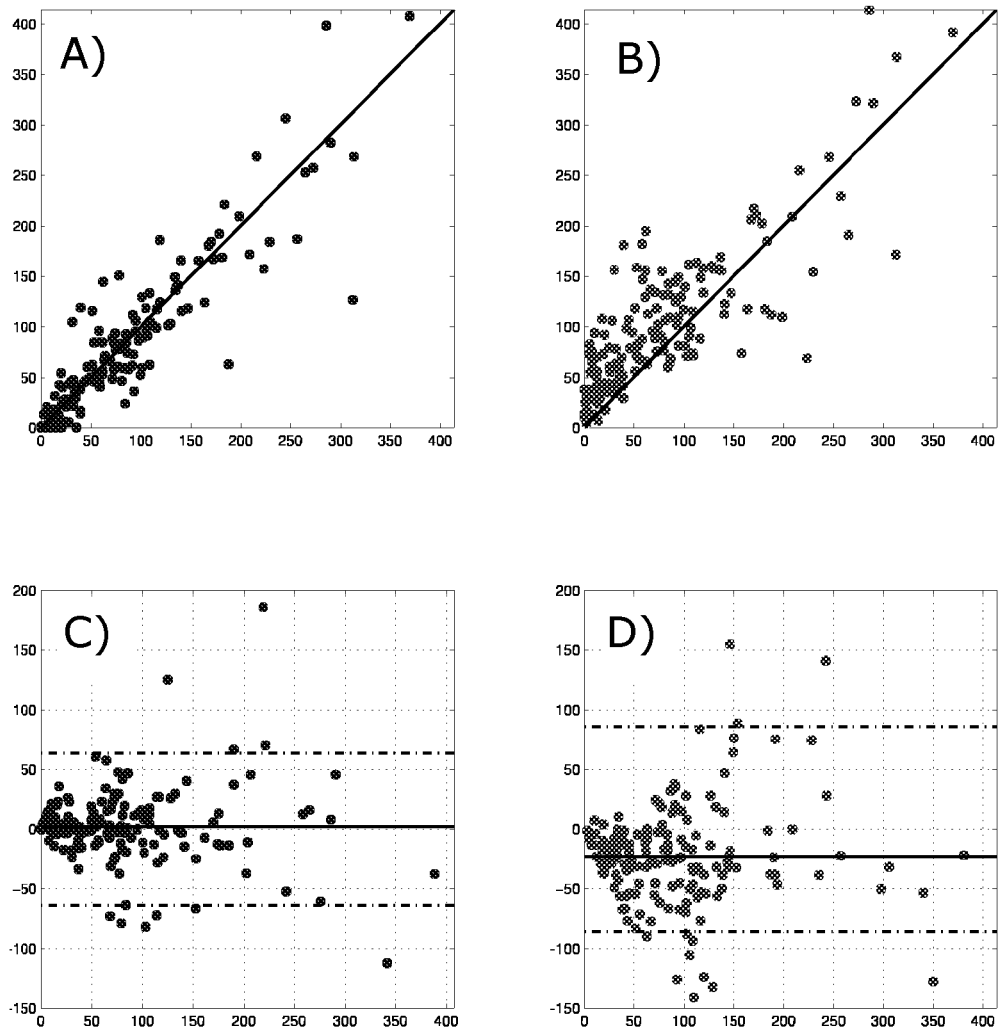
FIG. 27: Volumetric comparisons of TTP lesions.

FIG. 27 shows volumetric comparisons of TTP lesions estimated by algorithm, STM at TTP>4 seconds and manual outlining. A) Volumetric correlation between algorithm and manual outlining ($R^2$=0.92) (the x-axis represents manual mask volume [mL], the y-axis represents algorithm mask volume [mL]). B) Volumetric correlation between STM and manual outlining (R2=0.79) (the x-axis represents manual mask volume [mL], the y-axis represents STM mask volume [mL]). C) Bland-Altman plot for manual outlining compared with algorithm (the x-axis represents mean lesion volume [mL], the y-axis represents the difference) and D) Bland-Altman plot for manual outlining compared with STM (the x-axis represents mean lesion volume [mL], the y-axis represents the difference). The solid lines indicate the mean between the two compared methods and dashed lines indicate mean difference±2 SD.

The best volumetric correlation, dice coefficient (DC) and sensitivity/specificity between manually and automatically outlined TTP lesions were at an inter-rater agreement of three. The Spearman correlation for APS was $R^2$=0.91, see FIG. 27A. At an inter-rater agreement of one and two APS underestimated the true TTP lesion volumes while at an inter-rater agreement of four the APS overestimated the TTP lesion volume compared with manual outlining (data not shown). The mean difference between manual outlining and APS was −2.3 mL and ±2 SD was 63.6 mL (p<0.001), see FIG. 27C.

The Spearman correlation for STM was $R^2$=0.78, see FIG. 27B. The mean difference between manual outlining and STM was −22.6 mL and ±2 SD was 85.8 mL, see FIG. 27D.

Geometric Comparison

The APS outperformed STM in terms of geometrical agreement with manually delineated TTP lesion masks. The median DC for APS was 0.74 with $25^{th}$-$75^{th}$ inter-quartile range of 0.50-0.81 (p<0.001). In contrast, the median DC for S™ was 0.53 with $25^{th}$-$75^{th}$ inter-quartile range of 0.21-0.68, see FIG. 28.

The median processing time was 3.4 seconds (1.9-4.9) per patient and depended exclusively on the volume of TTP lesion.

Figure 28:
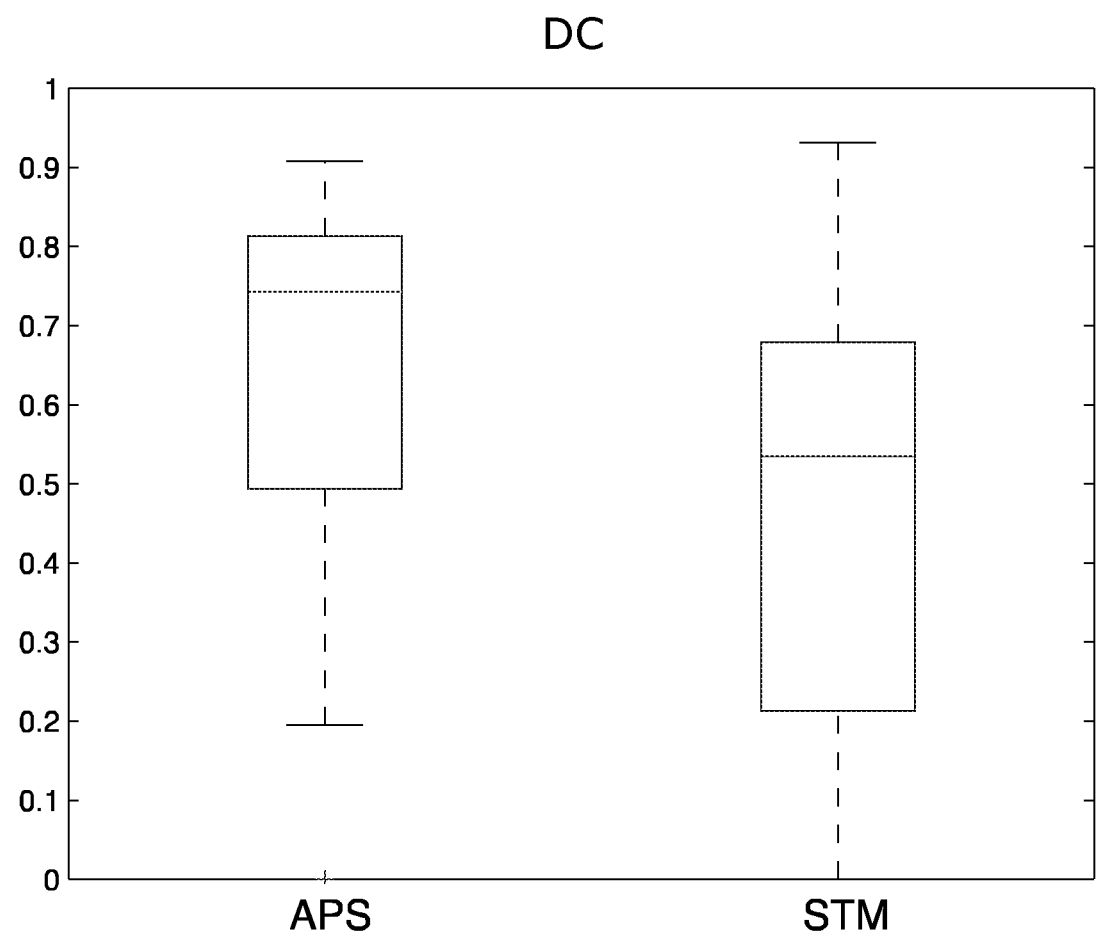
FIG. 28: Boxplot of Dice coefficients.

FIG. 28 shows a boxplot of Dice coefficients (DC) for the APS and STM. The median DC for APS was 0.74 (0.50-0.81) and for S™ the median DC was 0.53 (0.21-0.68).

Performance of Classification

At an inter-rater agreement of three, APS significantly outperformed STM in classification. The median sensitivity for APS was 77% and $25^{th}$-$75^{th}$ inter-quartile range (IQR) of 58-87% (p<0.01) and the median specificity was 97% and $25^{th}$-$75^{th}$ IQR of 95-100% (p<0.05). For S™ the median sensitivity was 65% and $25^{th}$-$75^{th}$ IQR of 38-80% and the median specificity was 95% and $25^{th}$-$75^{th}$ IQR of 92-98%.

TABLE VI shows sensitivity and specificity in percent for the automatic approaches determined on the ipsi-lateral hemisphere. In parentheses the first and third quartile is given and furthermore the statistics from ranksum tests are also given.

Discussion

A possible advantage of the present invention may be that there is provided a time efficient and fully automatic segmentation algorithm to outline TTP lesions on relative TTP maps using connected component labeling algorithm and level-set implementation of Mumford-Shah segmentation. The algorithm for APS demonstrated good agreement with manually outlined lesion and significantly outperformed threshold TTP lesion mask in terms volumetric correlation, DC and sensitivity/specificity.

Figure 29:
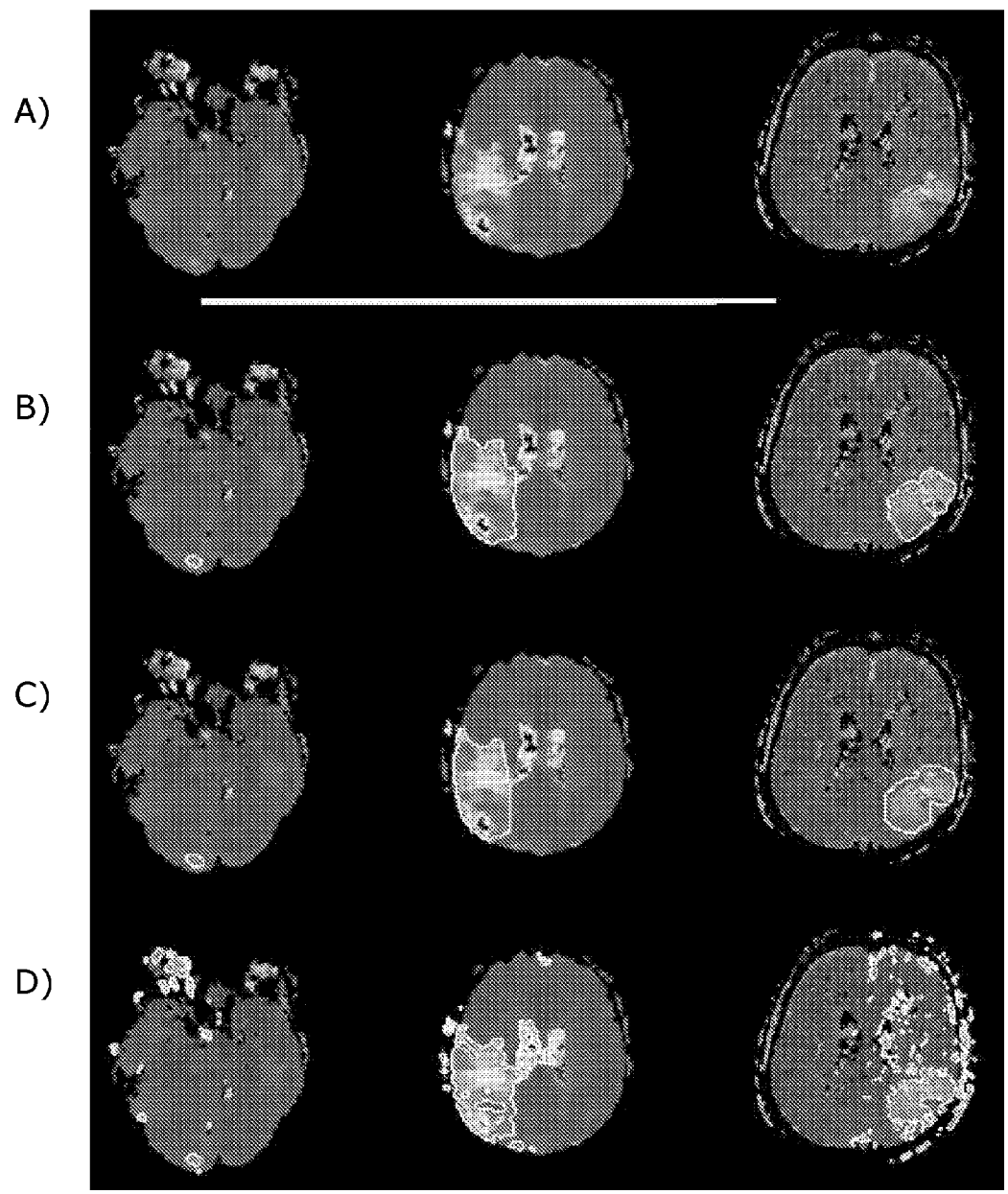
FIG. 29: Examples of TTP lesion masks automatically generated by APS.

FIG. 29 shows examples of TTP lesion masks automatically generated by APS (row C) and STM (row D) and manually outlined by experts (row B) overlayed on TTP maps. Row A) shows the maps with no masks. The three columns correspond to three different images.

A proper brain mask to exclude non-brain tissue may be advantageous for obtaining good agreement between automatic approach and manual delineation. The effect of utilizing good brain-mask is shown in FIG. 29, column 1. The STM lesion mask demonstrates good agreement with manual delineation in identifying hypo-perfused area, however, the false positive rate is higher compared with APS due to lack of proper brain mask. Mainly, noise from the ventricles restricts optimal performance of APS or other automatic approaches. The CSF emits hyper intensities on TTP maps and will be segmented as hypo-perfused area, see FIG. 29, column 2, STM mask (row D). For APS we developed a fast intensity-based ventricles segmentation algorithm that greatly removed the CSF and which may be beneficial in order to avoid overestimation of the TTP lesion. Template-based registered ventricle masks may be an alternative method to the intensity-based approach, but at the expense of time efficiency.

Identifying small TTP lesions (<3 mL) is challenging since noise components such as eyes extend the volume of small lesions FIG. 29, column 1. Removing components less than a certain threshold has been proposed, although this method removes some noise components and concurrently removes hypo-perfused voxels too and hereby raises the false negative rate. An advantage of using the noise rejecting properties of CCL and level-set, may be that we overcome the concerns of identifying small TTP lesion.

Here we introduced the Dice coefficient as an additional measure for evaluation of performance of automatic segmentation approaches. Previously, volumetric correlation and sensitivity/specificity has been used as evaluation measures, however these measures suffer under different pitfalls. The volumetric correlation coefficient gives a fine summary of the association between the estimated mask volumes and the manually obtained mask volumes, however, it does not reflect the geometrical agreement between the masks. E.g. in the case shown in FIG. 29 and column 2 the volumes are very similar for the three approaches (manual: 16.5 mL, APS: 15 mL and STM 17 mL) though the lesion volume for STM is containing many false positive voxels.

The classification measure sensitivity can in small lesions be sensitive to false negatives and could be down played, while the specificity is artificially boosted due to the area where it is determined, usually the ipsi-laterale hemisphere e.g. FIG. 29 and column 1 (specificity APS and STM: 0.99 and 0.99). The DC is not the ultimate measure for assessing performance of automatic segmentation procedures, since it is sensitive to small lesions e.g. FIG. 29, and column 1 (DC for APS and STM: 0.70 and 0.19), for this reason we suggest to at least report volumetric correlation (association measure), sensitivity/specificity (classification measure) and DC (agreement measure) in related studies for the sake of reproducibility and standard of reference until we have one measure to cover the different aspects performance in automatic segmentation algorithms.

In this example we used TTP maps as the PWI metric but it is contemplated that different PWI metrics may be applicable for optimally identifying tissue at risk of infarction, and it is contemplated to extend the methods proposed in this example to e.g. $T_{max}$, MTT and First moment maps.

Physiologically true TTP threshold to identify tissue at risk of infarction across patients has been evaluated in several studies. TTP>4 seconds has been validated in MRI-PET studies of acute ischemic stroke and has found general acceptance in clinical practice.

In conclusion, the algorithm according to example 6 is able to detect smooth boundaries around hypo-perfused areas and demonstrated good agreement with the expert outlining.

Example 7

$2^{nd}$ Alternative Segmentation of an Image Obtained by DWI

In this example there is presented an algorithm to automatically segment the DWI lesion on DWI images using the concurrent information form ADC maps. Combining the automatic algorithm to segment DWI lesion with the automatic algorithm to segment PWI lesions there is provided a method which is capable of presenting a fully automatic penumbra segmentation tool, such as a tool for clinical use.

Morphological Grayscale Reconstruction

As in Example 3.

Morphological Reconstruction

Morphological reconstruction is a binary image transformation technique [10], which is in this context is used to remove false positive DWI lesion on DWI image. The technique can be thought of conceptually as iterative dilation of the seed point (see FIG. 30, $5^{th}$ row 3060) constrained by the initial mask obtained by thresholding of DWI map. Clusters of voxels that hadn't contained the seed points are not retained in the reconstructed mask.

Algorithm

Figure 30:
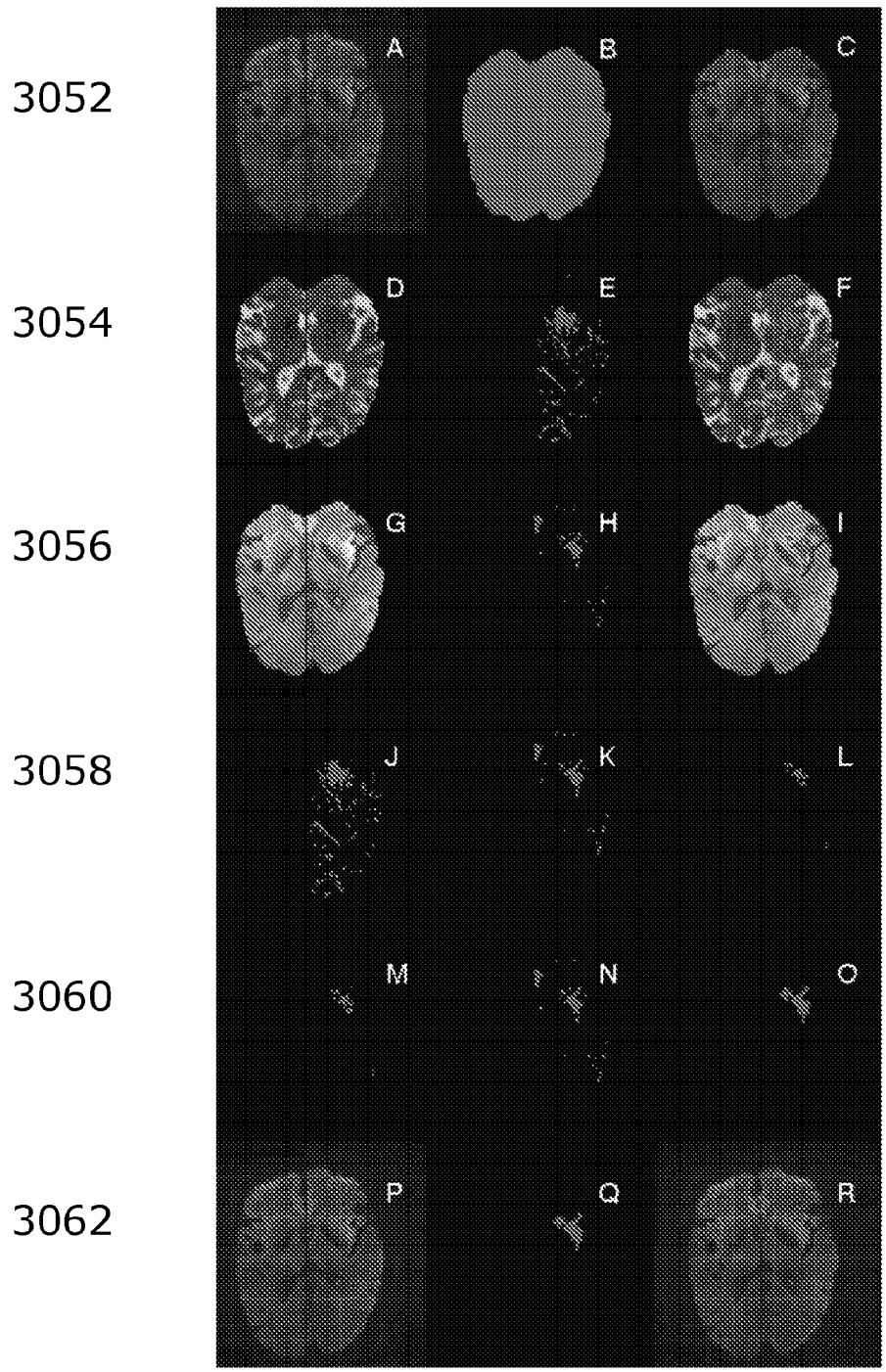
FIG. 30: Schematic illustration of steps in the DWI lesion segmentation algorithm.

An automatic generated brain mask, composed by whole brain mask and CSF mask, removed non-brain tissue e.g. ventricles, skull etc, see FIG. 30 and $1^{st}$ row 3052. The whole brain mask was obtained by threshold CBV map (CBV>0) and unconnected or sparsely connected components such as eyes and susceptibility artifacts were eradicated by applying morphological operations as thinning and H-break cf. the reference "Digital image processing using Matlab", Gonzalez, R. C., R. E. Woods, and S. L. Eddins, 2004, which is hereby incorporated by reference in entirety. The CSF mask was obtained by histogram separation of voxel intensities on a high contrast CSF-tissue map, attained by combining a structural image (T2) and ADC. Co-registering a MNI (Montreal Neurological Institute) template to PWI maps automatically generated left and right hemisphere masks. Non-brain tissue in the inferior slices in DWI volume (e.g. eyes, bone, air, etc.) contributes with noise components and increases the false-positive rate. We therefore, used the automatically generated TTP lesion mask, described in Example 6, to identify DWI slices-of-interest. Initial ADC and DWI mask were created by thresholding the ADC map at $600*10^{-6}$ mm$^2$/sec and DWI image at contra-laterale mean intensity+two standard deviation, see FIG. 30 and $2^{nd}$-$3^{rd}$ row 3045-3056. Multiplying the initial masks retains the core of the DWI lesion and eradicates the false positive lesions (marker image) see FGI 30 and $4^{th}$ row 3058. By reconstructing the marker image constrained by the initial DWI lesion mask yields the final DWI lesion mask see FIG. 30 and $5^{th}$ row 3060. The PWI-DWI mismatch is defined as the TTP lesion minus the intersection of DWI and TTP lesion. The automatic penumbra segmentation algorithm was implemented in Matlab R2010a (Math Work, Natick, Mass.).

FIG. 30 gives a schematic illustration of steps in the DWI lesion segmentation algorithm. Initially non-brain tissue is removed by applying a whole brain mask (B) on the original DWI image (A) to obtain image (C). Subsequently the ADC mask (E) is created by thresholding ADC map (D) at 600*10−6 mm2/sec. Image (F) shows image (D) overlaid with ADC mask (E). The DWI mask (H) is generated by thresholding the morphological grayscale reconstructed DWI image (G) at contra-laterale mean intensity+two standard deviation. Image (I) shows image (G) overlaid with mask (H). The marker image (L) is constructed by multiplying ADC mask (J) and DWI mask (K) and the resulting mask indicates area in the brain with low ADC intensity and high DWI intensity. Reconstructing the marker image (M) constrained by the initial DWI mask (N) yields the definitive DWI lesion mask (O). (R) Overlay of DWI lesion mask (Q) on original DWI image (P, A).

Patients and Image Acquisition

As in Example 5.

Comparison of Automatic and Manual DWI Lesion and Penumbra Outlining

Four raters (one neuroradiologist and three radiologists) with extensive clinical experience in neuroradiology manually outlined the DWI lesions on DWI images using in-house developed software. The raters were blinded to any intensity scale and other brain maps. The automatic determined DWI lesion volumes and were compared with manually outlined DWI lesion consensus map at an inter-rater agreement of three. To quantify the geometric and volumetric similarity between the automatic approaches and manually outlined lesions we used volumetric correlation and Dice coefficient (DC). DC (definition: two times the intersection of the two masks over the combined set of masks), which is a number between 0-1, where 1, indicates complete overlap between two identical shapes and 0 indicates no overlap. The volumetric and geometric comparisons of DWI lesions were performed within the manually outlined PWI lesion. The performance of classification was evaluated in terms of sensitivity and specificity and was determined on the ipsi-lateral hemisphere Results Volumetric Comparison FIG. 31 shows volumetric comparison of DWI lesions estimated by the automatic approaches and manual outlining.

Figure 32:
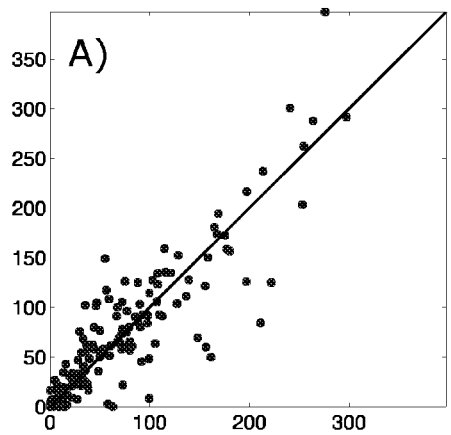
FIG. 32: Volumetric comparison of penumbras estimated by the automatic approaches and manual outlining.
Figure 32:
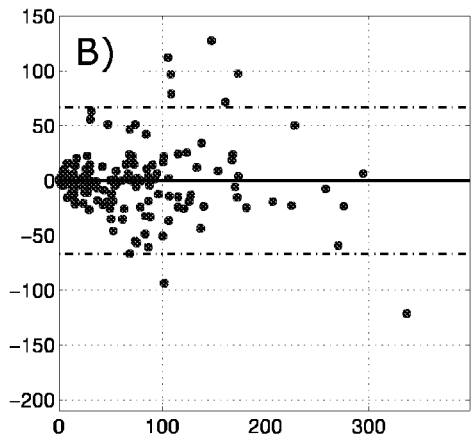
Figure 32:
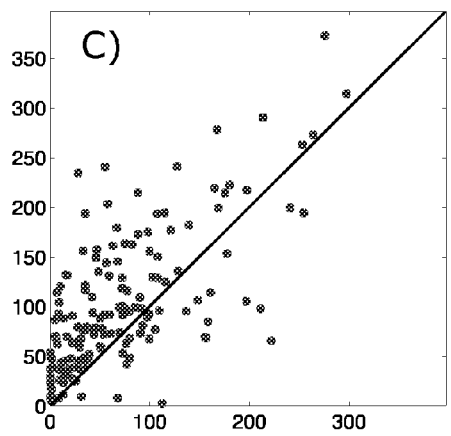
Figure 32:
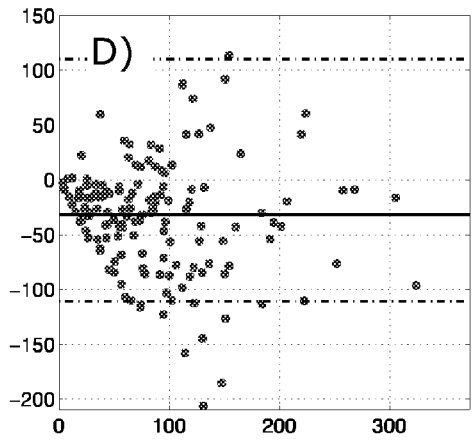

FIG. 32 shows volumetric comparison of penumbras estimated by the automatic approaches and manual outlining.

Figure 31:
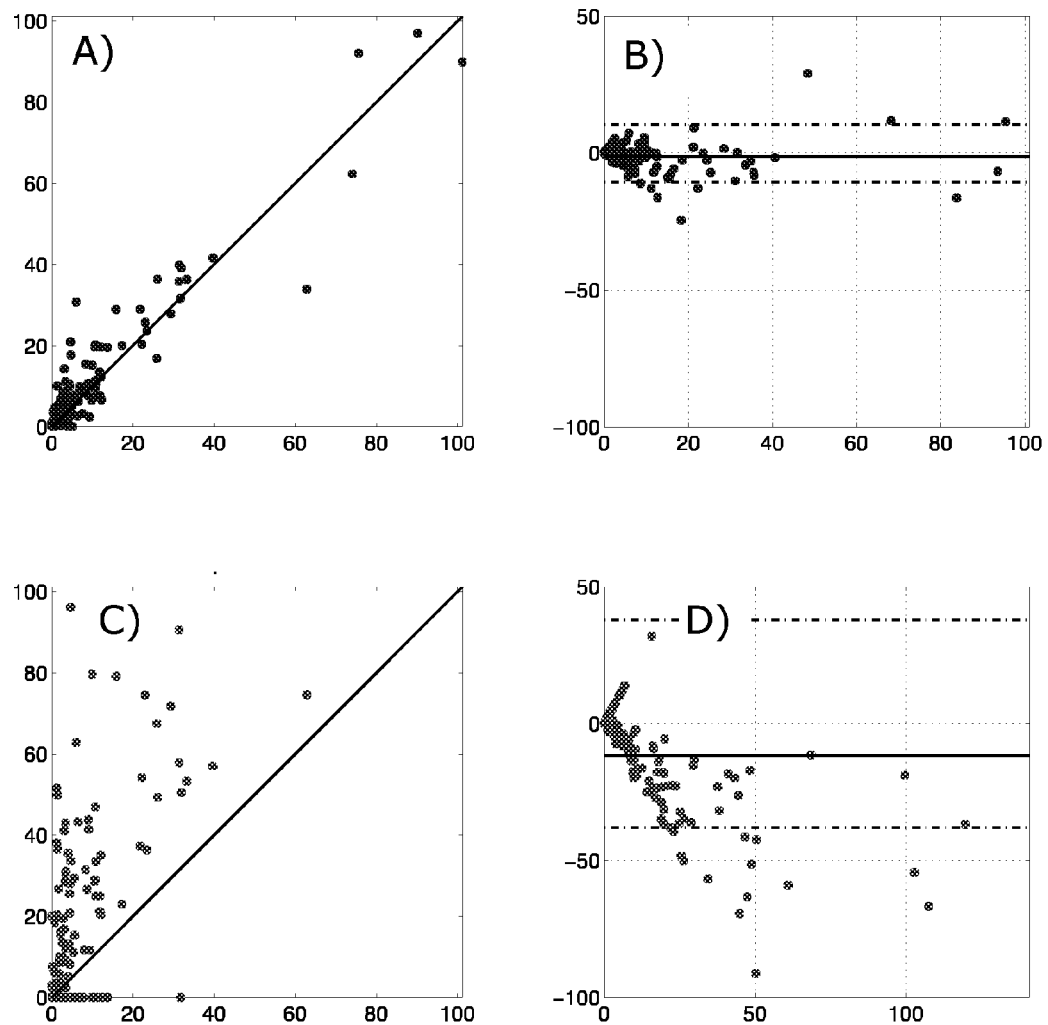
FIG. 31: Volumetric comparison of DWI lesions estimated by the automatic approaches and manual outlining.

For both FIGS. 31-32, the respective subfigures A-D shows: A) Volumetric correlation between APS mask and manual outlining (the x-axis represents manual mask volume [mL], the y-axis represents APS mask volume [mL]), B) Bland-Altman plot for manual outlining compared with APS (the x-axis represents mean lesion volume [mL], the y-axis represents the difference), C) Volumetric correlation between STM and manual outlining (the x-axis represents manual mask volume [mL], the y-axis represents STM mask volume [mL]), and D) Bland-Altman plot for manual outlining compared with STM (the x-axis represents mean lesion volume [mL], the y-axis represents the difference). Solid line indicates the mean between the two compared methods and dashed lines indicate mean difference±2 SD.

Regarding the volumetric comparison of DWI lesions estimated by the automatic approaches and manual outlining (cf., FIG. 31), the Spearman correlation was $R^2=0.95$ for APS compared with the manual outlining. The mean difference between manual and APS outlining was −1.2 mL (±2 SD: 10.3 mL) indicating a slight overestimation by APS, see FIG. 31 and upper row (subfigures A-B). For STM technique $R^2=0.80$, the mean difference between manual and STM outlining was −11.6 mL (±2 SD: 37.1 mL) indicating an overestimation by STM, see FIG. 31 and lower row (subfigures C-D).

Regarding the volumetric comparison of penumbras estimated by the automatic approaches and manual outlining (cf., FIG. 32), the Spearman correlation was $R^2=0.88$ (see FIG. 32 and upper row (subfigures A-B)) for APS compared with the manual outlining. The mean difference between manual and APS outlining was −0.2 mL (±2 SD: 65.5 mL) indicating a minor overestimation by APS. For STM technique $R^2=0.67$ (see FIG. 32 and lower row (subfigures C-D)), the mean difference between manual and STM outlining was −31.6 mL (±2 SD: 108.2 mL), indicating a significant overestimation by STM.

Dice Coefficient and Performance of Classification

The median DC for the APS generated DWI mask was 0.65 ($25^{th}$-$75^{th}$ quartile: 0.44-0.79), the median sensitivity was 0.83 ($25^{th}$-$75^{th}$ quartile: 0.53-0.95) and the median specificity was 1 ($25^{th}$-$75^{th}$ quartile: 100-1).

The median DC for the STM generated DWI mask was 0.24 ($25^{th}$-$75^{th}$ quartile: 0-0.51), the median sensitivity was 0.96 ($25^{th}$-$75^{th}$ quartile: 0-1) and the median specificity was 1 ($25^{th}$-$75^{th}$ quartile: 1-1).

Figure 33:
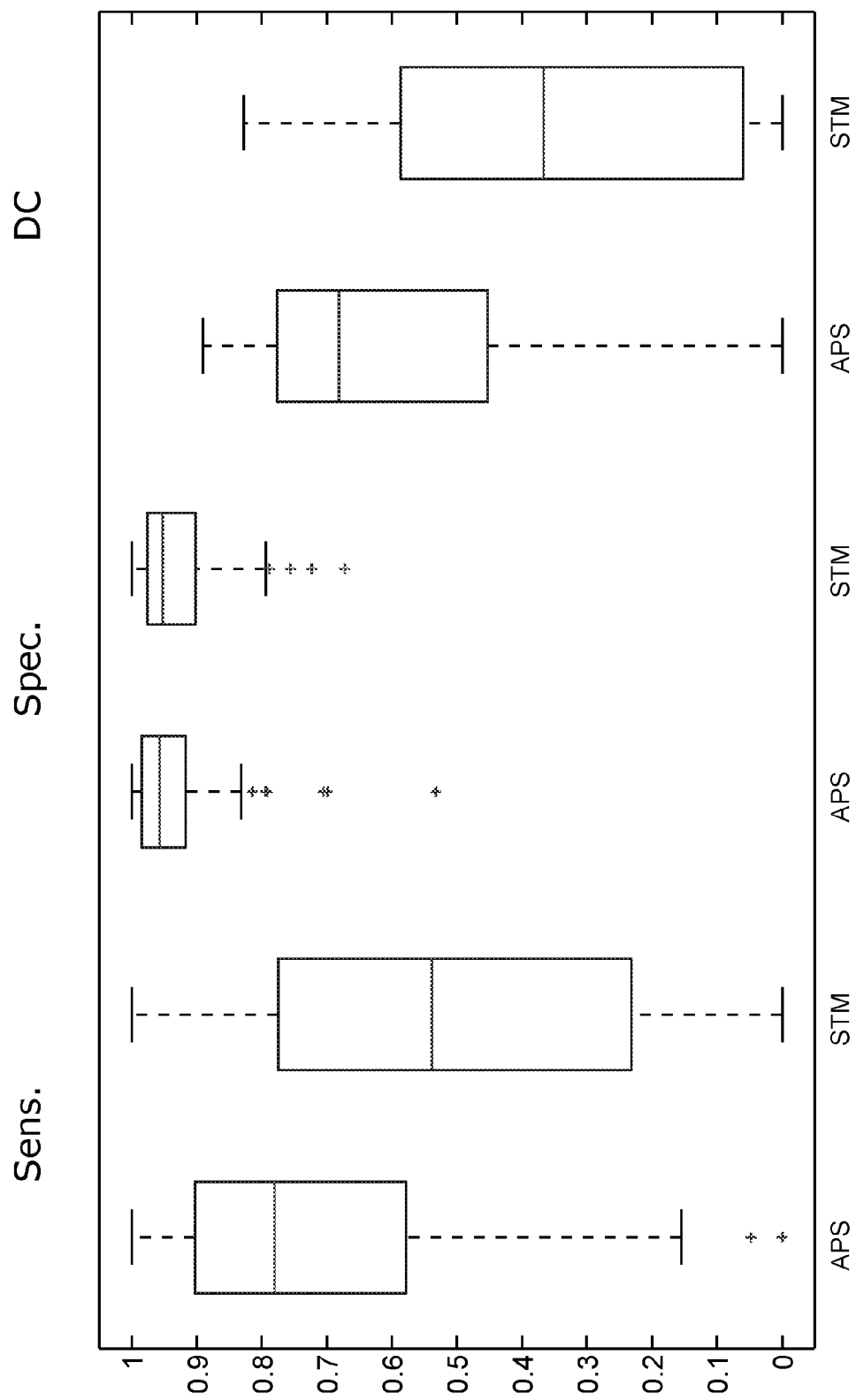
FIG. 33: Summary of the performance measures for penumbra classification.

FIG. 33 shows a summary of the performance measures for penumbra classification. For APS penumbra mask median Dice Coefficient (DC) of 0.68 ($25^{th}$-$75^{th}$ quartile: 0.45-0.78), the median sensitivity (Sens.) was 0.78 ($25^{th}$-$75^{th}$ quartile: 0.58-0.90) and the median specificity (Spec.) was 0.96 ($25^{th}$-$75^{th}$ quartile: 0.92-0.98). For STM penumbra mask median DC of 0.37 ($25^{th}$-$75^{th}$ quartile: 0.06-0.59), the median sensitivity was 0.54 ($25^{th}$-$75^{th}$ quartile: 0.23-0.77) and the median specificity was 0.95 ($25^{th}$-$75^{th}$ quartile: 0.90-0.98). The median processing time per patient was 21.4 seconds (8.9-33.9) mainly depending on penumbra volume and number of slices to be evaluated.

Discussion

A possible advantage of the DWI lesion segmentation algorithm according to Example 7 is that extracting concurrent information from ADC map and DWI image for automatical segmentation of DWI lesion may yield a better segmentation. Only lesions appearing hypo-intense on ADC map and hyper-intense on DWI image were segmented as DWI lesion. By this approach the algorithm avoided to segment "old" lesions, which usually appear hyper-intense on DWI images and white matter structures that typically appear hypo-intense on ADC maps.

To sum up, the present invention relates to a method for estimating a measure of a penumbra size of a penumbra in biological tissue wherein first and second images obtained respectively by perfusion weighted imaging (PWI) and diffusion weighted imaging (DWI) are analyzed, and wherein the analysis of the first image includes application of a level set method, and the analysis of the second image includes application of a grayscale morphological operation. In a further embodiment of the invention, a connected component labeling algorithm may be applied on any one of the first and second image. The invention further relates to a, system, a computer program product and use of a corresponding method.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

ANNEX 1

TABLE I

|  | Median (Range) | n |
|---|---|---|
| Patients |  | 120 (♀ = 49) |
| Age | 71 (62-78) |  |
| Time, Onset to MRI [min] | 148 (110.25-247) |  |
| TTP Lesion [mL] | 107 (51.5-158) |  |
| NIHSS | 11 (6-16) |  |
| Stroke subtypes: |  |  |
| Cardiac source of emboli |  | 56 |
| Large vessel disease with significant carotid stenosis |  | 23 |
| Large vessel disease, other |  | 10 |
| Small vessel disease (lacunar) |  | 2 |
| Dissection |  | 4 |
| Other/unusual cause |  | 2 |
| Undetermined |  | 23 |

TABLE II

| | Sensitivity % | | | Specificity % | | |
|---|---|---|---|---|---|---|
| TTP | Algorithm | STM | p-value | Algorithm | STM | p-value |
| >2.8 | 80 (64-88) | 76 (63-86) | =0.22 | 95 (92-98) | 91 (88-95) | <0.001 |

TABLE III

| | Level Sets | | Thresholding | |
|---|---|---|---|---|
| Consensus degree | Average difference | Std of difference | Average difference | Std of difference |
| 1 | 49.3 | 57.5 | −23.9 | 89.2 |
| 2 | 13.7 | 48.7 | −59.5 | 75.6 |
| 3 | −9.3 | 45.2 | −82.5 | 69.2 |
| 4 | −37.4 | 45.1 | −110.7 | 62.6 |

ANNEX 2

TABLE IV

| | Sensitivity % | | | Specificity % | | |
|---|---|---|---|---|---|---|
| TTP | Algorithm | STM | p-value | Algorithm | STM | p-value |
| >4 | 79 (39-87) | 72 (40-85) | =0.22 | 95 (90-98) | 94 (87-96) | <0.001 |

TABLE V

|  | Median (Range) | n |
|---|---|---|
| Patients |  | 168 (♀ = 70) |
| Age | 70 (25-90) |  |
| Time, Onset to MRI [min] | 152 (41-375) |  |
| TTP Lesion [mL] | 58.2 (0-369.6) |  |
| DWI Lesion [mL] | 2.4 (0-101.2) |  |
| NIHSS | 10 (0-26) |  |
| Stroke subtypes: |  |  |
| Cardiac source of emboli |  | 73 |
| Large vessel disease with significant carotid stenosis |  | 26 |
| Large vessel disease, other |  | 26 |

TABLE V-continued

|  | Median (Range) | n |
|---|---|---|
| Small vessel disease (lacunar) |  | 4 |
| Dissection |  | 4 |
| Other/unusual cause |  | 4 |
| Undetermined |  | 31 |

TABLE VI

| | Sensitivity % | | | Specificity % | | |
|---|---|---|---|---|---|---|
| TTP | APS | STM | p-value | APS | STM | p-value |
| >4 | 77 (58-87) | 65 (38-80) | <0.01 | 97 (95-100) | 95 (92-98) | <0.05 |

The invention claimed is:

1. A method for estimating a measure of a penumbra size of a penumbra in biological tissue, the method comprising:
   receiving a first image, the first image comprising data representative of a spatially resolved perfusion parameter,
   receiving a second image, the second image comprising data representative of a spatially resolved diffusion parameter,
   identifying a first area on the first image, which first area corresponds to a perfusion lesion,
   identifying a second area on the second image, which second area corresponds to a diffusion lesion,
   estimating the measure of the penumbra size based on the first and second area,
   applying a first image processing method on the first image, the first image processing method comprising a level set method, and
   applying a second image processing method on the second image, the second image processing method comprising a grayscale morphological reconstruction.

2. The method according to claim 1, further comprising applying connected-component-labeling on an image selected from the group consisting of: the first image and the second image.

3. The method according to claim 1, further comprising applying a morphological binary reconstruction on an image selected from the group consisting of: the first image and the second image.

4. The method according to claim 1, wherein the second image processing method further comprises:
   receiving a parameter determined by the first image processing method, and
   wherein the step of identifying the second area is based on the parameter, wherein the parameter is a region of interest or a mask.

5. The method according to claim 1, wherein the first image processing method further comprises applying a grayscale morphological operation or wherein the second image processing method further comprises applying a level set method.

6. The method according to claim 1, wherein the level set method of the first image processing method is a level set implementation of Mumford-Shah segmentation.

7. The method according to claim 1, further comprising applying a binary morphological operation on an image selected from the group consisting of: the first image and the second image.

8. The method according to claim 7, wherein the binary morphological operation includes an image processing technique selected from the group consisting of: opening, closing, and filling.

9. The method according to claim 1, further comprising identifying a seed point in an image selected from the group consisting of: the first image and the second image, wherein the seed point in the first image is a data point, which is comprised within the perfusion lesion, and the seed point in the second image is a data point, which is comprised within the diffusion lesion.

10. The method according to claim 9, wherein the step of identifying a first area on the first image or the step of identifying a second area on the second image, comprises implementing the seed point from region growing in connected component labeling (CCL).

11. The method according to claim 10, wherein the step of identifying the seed point comprises identification of a primary point in the image, which primary point corresponds to a point in the image that has a data value, which is higher or lower with respect to other points in the image.

12. The method according to claim 9, wherein the step of identifying the seed point comprises detection of lesion laterality.

13. A method according to claim 12, wherein the step of identifying the lesion laterality comprises extracting one or more features for each hemisphere from a plurality of different imaging modalities.

14. The method according to claim 1, wherein the method further comprises: receiving an apparent diffusion coefficient image, and wherein the first or second image processing further comprises: identifying an apparent diffusion coefficient area above or below a threshold value in the apparent diffusion coefficient image.

15. A non-transitory computer-readable medium having stored thereon instructions that, when executed by a computer system, cause the computer system to carry out the method of claim 1.

16. The method according to claim 1, wherein the first image processing method comprises:
    identifying a primary mask on a primary first image, and
    identifying the first area on the first image as a secondary mask on a secondary first image, wherein the identification is based on the secondary first image and the primary mask, wherein the primary first image is an image comprising data points representative of a spatially resolved perfusion parameter not corrected for arterial input function, and the secondary first image is an image comprising data points representative of a spatially resolved perfusion parameter corrected for arterial input function.

17. The method according to claim 16, wherein the primary mask corresponds to an initial estimate of the perfusion lesion.

18. The method according to claim 17, wherein the step of identifying a primary mask on the primary first image comprises applying a level-set method on the primary first image.

19. A system for estimating a measure of a penumbra size of a penumbra in a subject, comprising:
    an input for receiving a first image, the first image comprising data representative of a spatially resolved perfusion parameter,
    an input for receiving a second image, the second image comprising data representative of a spatially resolved diffusion parameter,
    an image processing unit arranged for identifying a first area on the first image, which first area corresponds to a perfusion lesion,
    an image processing unit arranged for identifying a second area on the second image, which second area corresponds to a diffusion lesion, and estimating the measure of the penumbra size based on the first and the second area,
    an image processing unit arranged for applying a first image processing method on the first image, the first image processing method comprising a level set method, and
    an image processing unit arranged for applying a second image processing method on the second image, the second image processing method comprising a grayscale morphological reconstruction.

20. The system for estimating a measure of a penumbra size of a penumbra in a subject according to claim 19, further comprising an imaging unit.

* * * * *